United States Patent
Ochi et al.

(10) Patent No.: US 7,666,504 B2
(45) Date of Patent: Feb. 23, 2010

(54) NANOPOROUS FIBER WITH UNCONNECTED PORES FOR IMPROVED ADSORPTIVITY

(75) Inventors: Takashi Ochi, Mishima (JP); Akira Kishiro, Mishima (JP); Shuichi Nonaka, Otsu (JP); Takaaki Mihara, Mishima (JP); Norio Suzuki, Shizuoka (JP)

(73) Assignee: TORAY Industries, Inc., Tokyo (JP)

( * ) Notice: Subject to any disclaimer, the term of this patent is extended or adjusted under 35 U.S.C. 154(b) by 170 days.

(21) Appl. No.: 11/489,606

(22) Filed: Jul. 20, 2006

(65) Prior Publication Data

US 2006/0257656 A1   Nov. 16, 2006

Related U.S. Application Data

(62) Division of application No. 10/523,416, filed as application No. PCT/JP03/09532 on Jul. 28, 2003, now Pat. No. 7,097,904.

(30) Foreign Application Priority Data

Aug. 5, 2002  (JP) .............................. 2002-227619
Mar. 10, 2003 (JP) .............................. 2003-62910

(51) Int. Cl.
   *D02G 3/34*   (2006.01)

(52) U.S. Cl. ...................... 428/398; 428/370; 428/373; 428/374; 428/397; 428/394

(58) Field of Classification Search .................. 55/524, 55/528; 264/182, 211, 344, 45.6, 49, 78; 427/385.5, 389.9, 407.1, 412; 428/364, 370, 428/372, 398, 315.5, 373, 374, 395, 397; 442/394, 35, 401, 408, 43, 59
See application file for complete search history.

(56) References Cited

U.S. PATENT DOCUMENTS 3,513,110 A * 5/1970 Noether ...................... 521/182
3,516,239 A * 6/1970 Fukuda et al. .............. 442/193
3,716,614 A   2/1973 Okamoto et al. .............. 264/49
3,957,936 A * 5/1976 Lauchenauer ................ 264/53
4,468,434 A * 8/1984 Sekimoto et al. ............ 428/372
4,515,859 A * 5/1985 De Maria et al. ............ 428/398

(Continued)

FOREIGN PATENT DOCUMENTS

| JP | S60-155770 | * | 5/1985 | .............. 428/315.5 |
| JP | S60-167969 A | * | 8/1985 | ................ 264/45.6 |
| JP | H03-052610 A | * | 3/1991 | .................. 55/524 |
| JP | H08-158251 | * | 6/1996 | |
| JP | H08-296123 | * | 11/1996 | |
| JP | H09-157943 A | * | 6/1997 | |
| JP | 10-183425 A |   | 7/1998 | |
| JP | 2000-154463 A |   | 6/2000 | |

OTHER PUBLICATIONS

Harris, Robert L. (2000). Patty's Industrial Hygiene (5th Edition) vols. 1-4. (pp. 1489-1550 (renumbered 1-28)). John Wiley & Sons. Online version available at: http://www.knovel.com/knovel2/Toc.jsp?bookID=709&VerticalID=0.*

*Primary Examiner*—Jill Gray
(74) *Attorney, Agent, or Firm*—Kubovcik & Kubovcik

(57) ABSTRACT

The present invention provides a nanoporous fiber being substantially free from coarse pores and having homogeneously dispersed nanopores, unlike conventional porous fibers. A porous fiber has pores each having a diameter of 100 nm or less, in which the area ratio of pores each having a diameter of 200 nm or more to the total cross section of the fiber is 1.5% or less, and the pores are unconnected pores, or a porous fiber has pores each having a diameter of 100 nm or less, in which the area ratio of pores each having a diameter of 200 nm or more to the total cross section of the fiber is 1.5% or less, the pores are connected pores, and the fiber has a strength of 1.0 cN/dtex or more.

16 Claims, 34 Drawing Sheets a : OVERVIEW OF MONOFILAMENT
b : ENLARGED VIEW

U.S. PATENT DOCUMENTS

| | | | |
|---|---|---|---|
| 4,686,074 A | 8/1987 | Okamoto | 264/171 |
| 5,022,990 A | 6/1991 | Doi et al. | 210/500.42 |
| 6,989,193 B2 | 1/2006 | Haile et al. | 428/364 |
| 2004/0067711 A1* | 4/2004 | Bliton et al. | 442/394 |

* cited by examiner a : OVERVIEW OF MONOFILAMENT
b : ENLARGED VIEW a : OVERVIEW OF MONOFILAMENT
b : ENLARGED VIEW

NANOPOROUS FIBER WITH UNCONNECTED PORES FOR IMPROVED ADSORPTIVITY

This application is a divisional of U.S. patent application Ser. No. 10/523,416 filed on Mar. 21, 2005, now U.S. Pat. No. 7,097,904 which is a 371 of international application PCT/JP2003/009532 filed Jul. 28, 2003, which claims priority based on Japanese Patent Application Nos. 2002-227619 and 2003-62910 filed Aug. 5, 2002, and Mar. 10, 2003, respectively, which are incorporated herein by reference.

TECHNICAL FIELD

The present invention relates to a porous fiber which has a multitude of fine and even-sized nanopores and is substantially free from coarse pores that reflect visible radiation. It also relates to a polymer alloy fiber serving as a precursor of the porous fiber in the production thereof, and to a method for producing the polymer alloy fiber.

In the following descriptions relating to the present invention, the term "nanopores" means fine pores each having a diameter of 100 nm or less.

The term "nanoporous fiber" used in the present invention refers to a fiber containing one or more pores having a diameter of 100 nm or less per square micrometer at cross section of a fiber perpendicular to the axial direction thereof.

The fiber relating to the present invention has such a multitude of fine pores and thereby exhibits dramatically increased liquid adsorptivity and/or gas adsorptivity.

To achieve these properties satisfactorily, key factors are that the resulting fiber is substantially free from not-fine, i.e., coarse pores and that the fiber contains a multitude of fine pores in even-sized and homogeneously distributed at cross section of a fiber.

The present invention relates to a porous fiber standing at such a higher level than conventional porous fibers. This fiber not only exhibits dramatically increased liquid adsorptivity and/or gas adsorptivity as described above, but is also capable of having a variety of functions by applying the nanoporous structure of the fiber.

Namely, the fiber can be applied not only to the fiber industry but also to a variety of industries and is very revolutionary and useful.

BACKGROUND ART

Fibers of polyamides typified by nylon 6 (hereinafter may be referred to as "N6") and nylon 66 (hereinafter may be referred to as "N66") and fibers of polyesters typified by a polyethylene terephthalate (hereinafter may be referred to as "PET") and a polybutylene terephthalate (hereinafter may be referred to as "PBT") exhibit excellent mechanical properties and/or dimensional stability and are widely used not only for clothing but also for interior decoration, vehicular interior decoration and industrial use.

Fibers of polyolefins typified by a polyethylene (hereinafter may be referred to as "PE") and a polypropylene (hereinafter may be referred to as "PP") are light-weighted and are widely utilized for industrial use.

However, in any kind of fibers, fibers each comprising a single polymer have some limitations in the properties thereof. Attempts have therefore been made to modify such polymers typically by copolymerization or polymer blending or to compound functions typically by multi-component fiber spinning or combined-filament spinning.

Among them, polymer blending has been actively investigated, since this technique does not require new designing of polymers and such a polymer blend can be produced by using a mono-component spinning machine.

Separately, hollow fibers and porous fibers have been investigated in order to reduce the weight of fibers or to impart water-adsorptivity thereto.

Attempts have been made to provide hollow fibers having high hollowness, but such hollow portions may be crushed, for example, as a result of false twisting. To avoid this, multi-islands hollow fibers, wherein a multitude of islands parts constitutes a hollow portion, using a conjugated fiber with a water-soluble polymer have been developed. In such fibers, the hollow portion generally has a diameter of 1 µm or more, the interface between the polymer and the air in the hollow portion significantly reflects visible radiation, and the resulting fiber cannot satisfactorily develop a color.

Porous fibers each having a multitude of pores on the order of sub-micrometers have been investigated. Such porous fibers have generally been produced not by multi-component fiber spinning but by polymer blend spinning.

Japanese Unexamined Patent Publication (Kokai) No. 2-175965, for example, describes a technique of blending a nylon with a PET copolymerized with a hydrophilic group, forming a fiber from the blend, and dissolving off the copolymerized PET from the fiber to thereby obtain a porous nylon fiber. The fiber of the invention has surface depressions and protrusions and/or pores on the order of submicrometers and has pearly luster. However, this fiber shows significantly deteriorated color property. This is because the fiber has a multitude of pores having a size on the order of wavelengths of visible radiation and thereby invites significant scattering of visible radiation even as compared with the multi-islands hollow fiber.

Japanese Unexamined Patent Publication (Kokai) No. 56-107069 (pages 1-3) describes a fiber having pores with a size smaller than visible radiation. In actual fact, however, the resulting fiber also shows significantly deteriorated color property, since the blend fiber contains coarsely aggregated PET particles, and the aggregated particles are dissolved off to form coarse pores each having a size on the order of submicrometers to one micrometer. In fact, above-mentioned Japanese Unexamined Patent Publication (Kokai) No. 56-107069 describes "most of the polyester component exists as lines with a diameter of 0.01 to 0.1 micron and there remain hollows substantially having the above-mentioned size in the polyamide" in line 7, in the left upper column of page 2, suggesting the presence of aggregated PET particles.

In addition, certain porous fibers using a nylon/PET blend fiber are described in Japanese Unexamined Patent Publication (Kokai) Nos. 8-158251 and 8-296123. These fibers, however, show a large variation in size of dispersed particles of PET in the nylon, for example, about 0.1 to 1 µm and cannot improve decreased color property caused by coarse pores. In addition, when the distribution of pore size is large as in the conventional techniques, coarse pores play an extremely increased role in the pores and, in contrast, nanopores do not play such a role. Thus, the porous fiber does not sufficiently exhibits advantages of the pores.

Demands have therefore been made to provide porous fibers substantially free from such coarse pores.

Separately, a variety of polymer alloy fibers serving as precursors for porous fibers and ultrafine yarns have been investigated.

U.S. Pat. No. 4,686,074 (page 28), for example, describes that an ultrafine PET fiber having a size of $9.4 \times 10^{-5}$ deniers is obtained using a static mixer according to calculations and discloses a polymer alloy fiber having an islands-in-sea structure and comprising a polystyrene (hereinafter may be referred to as "PS") as a sea part and PET as islands parts.

This document, however, mentions that an actually measured mono-filament fineness of the ultrafine PET fiber varies from $1\times10^{-4}$ deniers to $1\times10^{-2}$ deniers, showing that the resulting polymer alloy fiber includes dispersed particles of the islands parts PET with a diameter of 100 to 1000 nm and thus contains many coarse islands.

Japanese Unexamined Patent Publication (Kokai) No. 8-113829 (pages 1-12) discloses a very special polymer alloy fiber comprising a copolyester blended with 30% by weight of a polyether imide (hereinafter may be referred to as "PEI"), which copolyester comprises PET copolymerized with 10% by mole of an ethylene naphthalate component. In this fiber, PEI is dispersed as particles with a size on the order of 2 to 80 nm. The fiber, however, invites unstable spinning to thereby obtain yarns with large unevenness and lacks practical utility, because PEI is dispersed as particles in the fiber.

According to the invention disclosed in above-mentioned Japanese Unexamined Patent Publication (Kokai) No. 8-113829, spinning is carried out at a temperature of 320° C. in accordance with the melting point of PEI, which is excessively high for the copolyester, to thereby cause remarkable thermal decomposition. In an experiment for corroboration, the resulting polymer alloy fiber has a strength less than 1.5 cN/dtex and is not usable in practice. The invention disclosed in Japanese Unexamined Patent Publication (Kokai) No. 8-113829 also provides a spongy fiber having pores connected with each other by treating the polymer alloy fiber with a base in a 6% NaOH solution at 90° C. for 2 hours. The resulting yarn, however, has a strength less than 0.5 cN/dtex and is not practically usable from this viewpoint of strength, because both PEI and the copolyester have been hydrolyzed in the fiber.

DISCLOSURE OF INVENTION

Under these circumstances, a first object of the present invention is to provide a nanoporous fiber having a multitude of nanopores which are very homogeneously dispersed and are substantially free from coarse pores, in contrast to conventionally investigated porous fibers.

To achieve the first object, the present invention provides, in an aspect, a porous fiber containing pores each having a diameter of 100 nm or less, in which the area ratio of pores each having a diameter of 200 nm or more to the total cross section of the fiber is 1.5% or less, and the pores are unconnected pores.

Alternatively, the present invention provides, in another aspect to achieve the first object, a porous fiber containing pores each having a diameter of 100 nm or less, in which the area ratio of pores each having a diameter of 200 nm or more to the total cross section of the fiber is 1.5% or less, the pores are connected pores, and the fiber has a strength of 1.0 cN/dtex or more.

A second object of the present invention is to provide a yarn, cut fiber, felt, package, woven fabric, knitted fabric or nonwoven fabric using the nanoporous fiber having a multitude of nanopores which are very homogeneously dispersed and are substantially free from coarse pores, in contrast to conventionally investigated porous fibers as mentioned above, or to provide various applied products using these, such as clothing, clothing materials, products for interior, products for vehicle interior, livingwares, industrial materials and medical devices (hereinafter these are generically referred to as "fibrous articles").

To achieve the second object, the present invention provides, in an aspect, a fibrous article containing the porous fiber in the first aspect of the present invention which has pores each having a diameter of 100 nm or less, in which the area ratio of pores each having a diameter of 200 nm or more to the total cross section of the fiber is 1.5% or less and the pores are unconnected pores, alone or in combination with one or more other fibers.

Alternatively, the present invention provides, in another aspect to achieve the second object, a fibrous article containing the porous fiber in the second aspect of the present invention which has pores each having a diameter of 100 nm or less, in which the area ratio of pores each having a diameter of 200 nm or more to the total cross section of the fiber is 1.5% or less, the pores are connected pores and the fiber has a strength of 1.0 cN/dtex or more, alone or in combination with one or more other fibers.

The porous fibers according to the present invention are substantially free from coarse pores that cannot be avoided in conventional porous fibers. In other words, the porous fibers of the present invention are nanoporous fibers having very homogeneously dispersed nanopores. These nanoporous fibers serve to significantly improve color property as compared with conventional porous fibers to thereby obtain high-value added fibrous articles utilizing excellent moisture adsorption and adsorption properties.

A third object of the present invention is to provide a novel polymer alloy fiber which serves as a material fiber for the production of the porous fibers of the present invention.

To achieve the third object, the present invention provides a polymer alloy fiber having an islands-in-sea structure and comprising a lower soluble polymer as a sea part, and a higher soluble polymer as islands parts, the islands constituting a lined structure, in which the area ratio of islands each having a diameter of 200 nm or more to the total islands is 3% or less.

A fourth object of the present invention is to provide pellets that is suitably used for the production of the novel polymer alloy fiber which is, in turn, used for the production of the porous fibers of the present invention.

To achieve the fourth object, the present invention provides pellets of a polymer alloy comprising a polyamide and a polyester, in which a dispersed polymer component is dispersed in an average diameter of 1 to 50 nm.

Alternatively, the present invention provides, in another aspect to achieve the fourth object, pellets of a polymer alloy comprising a polyamide and a polyester, containing 30 to 90% by weight of a polyester copolymerized with 1.5 to 15% by mole of a sulfonate and having an average weight per pellet of 2 to 15 mg.

In addition, the present invention provides, yet another aspect to achieve the fourth object, pellets of a polymer alloy, comprising a polymer selected from polyamides, polyesters and polyolefins; and a polyetherester being soluble in hot water, in which the content of the polyetherester is 10 to 30% by weight, and the pellets have a b* value as an indicator of coloring of 10 or less.

A fifth object of the present invention is to provide a method for melt-spinning the novel polymer alloy fiber that serves as a material fiber for the production of the porous fibers of the present invention.

To achieve the fifth object, the present invention provides, in an aspect, a method for melt-spinning a polymer alloy fiber, comprising the steps of weighing and feeding a lower soluble polymer and a higher soluble polymer independently to a twin-screw extrusion-kneader, melting and blending the polymers in the twin-screw extrusion-kneader to form a polymer alloy, and melt-spinning the polymer alloy, in which the spinning is carried out so as to satisfy the following conditions (1) to (3):

(1) the content of the higher soluble polymer in the polymer alloy is 5 to 60% by weight;

(2) the ratio in melt viscosity of the lower soluble polymer to the higher soluble polymer is 0.1 to 2; and (3) the length of a kneading section of the twin-screw extrusion-kneader is 20 to 40% of the effective length of screws.

Alternatively, the present invention provides, in another aspect to achieve the fifth object, a method for melt-spinning a polymer alloy fiber, comprising the steps of weighing and feeding a lower soluble polymer and a higher soluble polymer independently to a static mixer having a number of splits of $100 \times 10^4$ or more, melting and blending the polymers in the static mixer to form a polymer alloy, and melt-spinning the polymer alloy, wherein the spinning is carried out so as to satisfy the following conditions (4) and (5):

(4) the content of the higher soluble polymer in the polymer alloy is 5 to 60% by weight; and (5) the ratio in melt viscosity of the lower soluble polymer to the higher soluble polymer is 0.1 to 2.

In addition, the present invention provides, in yet another aspect to achieve the fifth object, a method for melt-spinning a polymer alloy fiber, comprising storing and dry-blending two or more different pellets comprising a lower soluble polymer and a higher soluble polymer, respectively, in a blending tank before melting of the pellets, feeding the dry-blended pellets to a melting section, and blending and melt-spinning the dry-blended pellets, wherein the spinning is carried out so as to satisfy the following conditions (6) to (8):

(6) the content of the higher soluble polymer in the fiber is 5 to 60% by weight;

(7) the ratio in melt viscosity of the lower soluble polymer to the higher soluble polymer is 0.1 to 2; and (8) the blending tank can contain 5 to 20 kg of pellets.

The attached drawings will be described below.

REFERENCE NUMERALS

Figure 1:
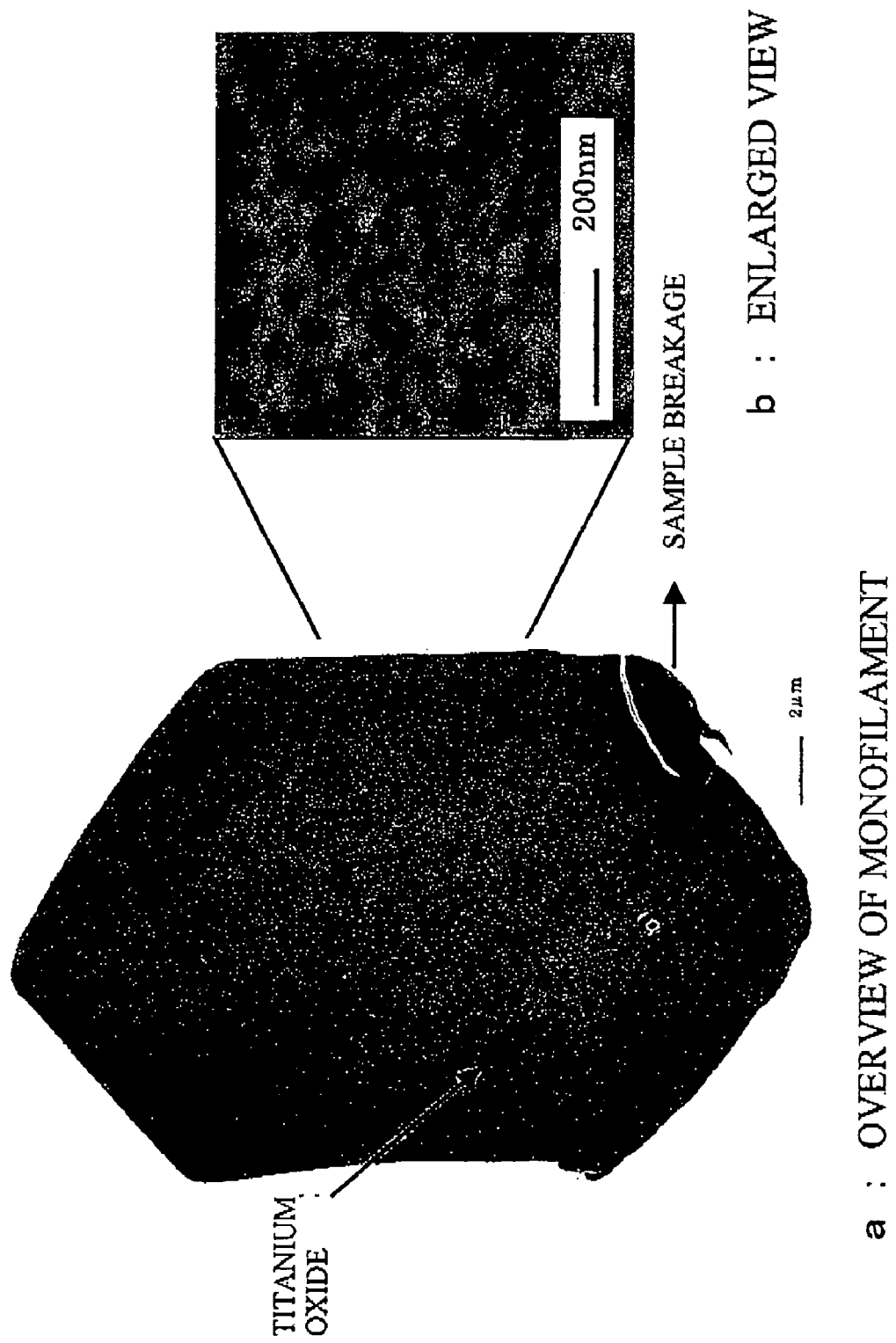
FIG. 1 is a transmission electron micrograph showing a cross section of a nanoporous fiber according to after-mentioned Example 1 of the present invention.
Figure 2:
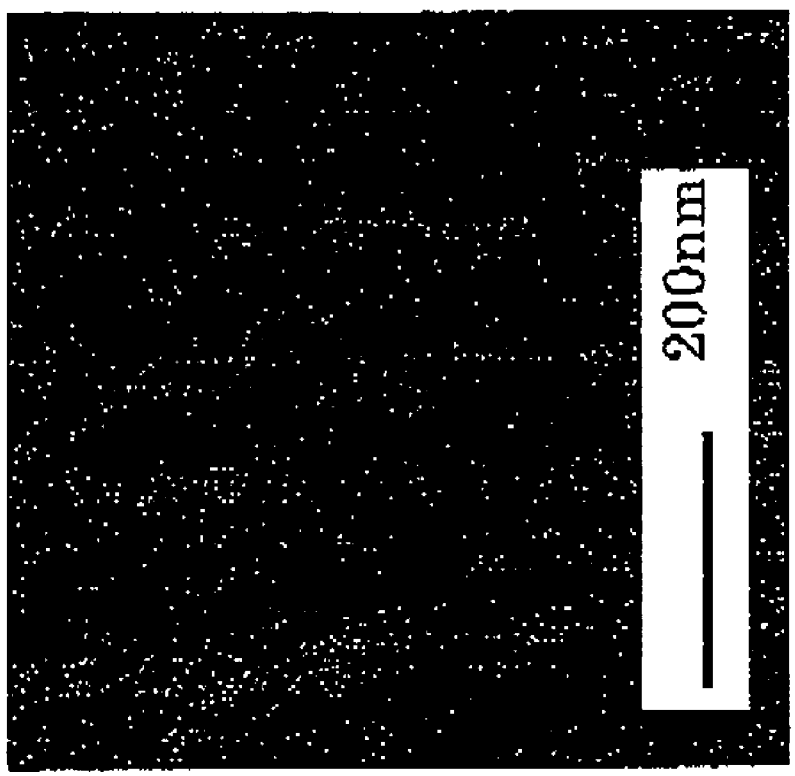
FIG. 2 is a transmission electron micrograph showing a longitudinal section of the nanoporous fiber according to after-mentioned Example 1 of the present invention.

1: hopper
2: melting section
3: spinning pack
4: spinneret
5: cooling equipment
6: line of thread
7: thread-collecting finishing guide
8: first take-up roller
9: second take-up roller
10: wound yarn
11: undrawn yarn
12: feed roller
13: heater
14: cooling plate
15: twister
16: delivery roller
17: false-twisted yarn
18: weighing section
19: orifice length
20: orifice diameter
21: static mixer
22: undrawn yarn
23: feed roller
24: first hot roller
25: second hot roller
26: delivery roller (room temperature)
27: drawn yarn
28: metering device
29: blending tank
30: extrusion-kneader
31: first hot roller
32: second hot roller

BEST MODE FOR CARRYING OUT THE INVENTION

The nanoporous fibers according to the present invention will be described below.

Examples of polymers for constituting the nanoporous fibers of the present invention are thermoplastic polymers such as polyesters, polyamides and polyolefins; thermosetting polymers such as phenol resins; polymers with poor thermoplasticity, such as polyvinyl alcohols and polyacrylonitriles; and biopolymers, of which thermoplastic polymers are preferred for their satisfactory moldability.

Among them, most of polyesters and polyamides have a high melting point and are more preferred. The melting point of the material polymer is preferably 165° C. or higher for satisfactory thermal stability. In general, for example, a polylactic acid (hereinafter may be referred to as "PLA"), PET and N6 have melting points of around 170° C., around 255° C. and around 220° C., respectively, and are preferred.

The polymer may further comprise additives such as particles, flame retardants and antistatics. In addition, the polymer may further comprise other copolymerized components within ranges not deteriorating the properties of the polymers. For retaining inherent thermal stability and mechanical properties of the polymers, the degree of copolymerization is preferably 5% by mole or less, or 5% by weight or less.

For use in, for example, clothing, interior decoration and vehicle interior decoration, polyesters and polyamides are preferred for their melting points, mechanical properties and hands. Among them, nylon 6 and nylon 66 each having a degree of copolymerization of 5% by mole or less or 5% by weight or less and having a relative viscosity of 2 or more; PETs, polytrimethylene terephthalates and polybutylene terephthalates each having an intrinsic viscosity of 0.50 or more; and PLAs each having a weight-average molecular weight of $7\times10^4$ or more are specifically preferred. The content of these polymers in the porous fiber is preferably 80% by weight or more.

An essential feature of the porous fibers of the present invention is that the porous fibers have pores each having a diameter of 100 nm or less.

As is mentioned at the outset, the term "porous fiber" used in the present invention means a fiber containing pores each having a diameter of 100 nm or less in a number of one or more per square micrometer at cross section of a fiber and is referred to as "nanoporous fiber" in the present invention. Such a fiber having nanopores as in the present invention can have dramatically increased liquid adsorptivity and/or gas adsorptivity.

Another essential feature is that the area ratio of pores each having a diameter of 200 nm or more to the total cross section of the fiber is 1.5% or less. The visible radiation has a wavelength of about 400 to 800 nm. Thus, by substantially eliminating coarse pores each having a diameter of 200 nm or more, the nanoporous fiber is prevented from decreasing in color property. The diameters and areas of the pores can be estimated by cutting the nanoporous fiber into ultrathin peaces and observing the ultrathin peaces under a transmission electron microscope (TEM). These parameters are determined in this manner in the present invention.

The pores may have irregular profiles such as oval profiles and do not always have perfect circular profiles. The diameters of the pores herein are therefore determined from the areas of the pores, assuming that the pores have perfect circular profiles.

The phrase "total cross section of the fiber" refers to the area of a cross section of a mono-filament and means a total area of polymer sections and pore sections. Such areas can be relatively easily determined by using an image processing software such as WINROOF. The area ratio of pores each having a diameter of 50 nm or more to the total cross section of the fiber is preferably 1.5% or less, and more preferably 0.1% or less in the porous fibers of the present invention.

The pores preferably have an average diameter of 0.1 to 50 nm. This substantially prevents the visible radiation from scattering, and the resulting fiber is optically transparent to the visible radiation but exhibits a new function of blocking harmful ultraviolet rays, since the pores each have a diameter near to the wavelengths of ultraviolet rays. In addition, the resulting fiber has a dramatically increased surface area and thereby exhibits high hygroscopicity and/or adsorptivity unexpectable in conventional porous fibers.

Such a multitude of fine pores serve to dramatically improve the capability of adsorbing various liquids (fluids) such as organic solvents in addition to water. However, an excessively small average diameter of the pores may cause filling of the pores as a result of, for example, heat treatment. Thus, the present inventors have found that the pores more preferably have an average diameter of 5 to 30 nm.

An example of the nanoporous fibers of the present invention is shown in FIG. 1 as a transmission electron micrograph of a cross section of a nanoporous N6 fiber. The figure shows minute shades of gray by metal staining, in which dark regions are regions at high density of N6, and bright regions are regions at low density of N6. The bright regions are considered to correspond to pores. The pores may be connected pores being connected with each other or unconnected pores substantially without being connected with each other.

In the present invention, the term "connected pores" refers to pores which are connected with each other and substantially extend from a surface top layer to an inner layer of the fiber. The term "unconnected pores" refers to pores which are not substantially connected with each other, in which pores in a surface layer of the fiber are substantially isolated from pores in an inner layer thereof.

These pores are capable of taking various molecules therein, as mentioned later. For satisfactory washing resistance and sustained releasability of such molecules, the pores are preferably unconnected pores, since such unconnected pores can trap or encapsulate the taken molecules to some extent.

When the fiber has connected pores, the polymer constituting the fiber has reduced continuity and may often have a decreased strength. The porous fiber according to the present invention should essentially have a strength of 1.0 cN/dtex or more when the fiber has connected pores.

Whether the nanopores in the present invention are formed as unconnected pores or as connected pores can be controlled by appropriately selecting blending and dissolving-off conditions of the islands-part polymer in the polymer alloy fiber serving as a raw yarn.

The porous fiber having connected pores can have a strength of 1.0 cN/dtex or more by controlling the average diameter of the pores to 50 nm or less.

As is described above, the nanoporous fibers according to the present invention have myriad nanopores and thereby have increased specific surface areas to show excellent hygroscopicity and/or adsorptivity.

The present inventors have had the following findings. Specifically, the ratio of moisture adsorption ($\Delta MR$) of the nanoporous fibers is preferably 4% or more. The ratio of moisture adsorption ($\Delta MR$) may be controlled to 4% or more according to, but not limited to, a procedure of forming the nanoporous fibers according to the present invention using a hydrophilic polymer inherently having some hygroscopicity. Examples of the hydrophilic polymer are polyamides such as N6 and N66. Even when the nanoporous fibers comprise a not-hydrophilic polymer such as a polyester, they can have a ratio of moisture adsorption ($\Delta MR$) of 4% or more by incorporating a hygroscopic material into the nanopores. Examples of the hygroscopic material are polyalkylene oxides and modified products thereof. Such deodorant fibers preferably have an ammonia adsorbing rate, for example, of 50% or more, and the porous fibers of the present invention satisfy this requirement. The nanoporous fibers according to the present invention can have an ammonia adsorbing rate of 50% or more according to any suitable procedure, such as by using a polymer inherently having some odor adsorbing capability to constitute the nanoporous fibers. Needless to say, any of deodorizers may be incorporated into the nanopores.

The ammonia adsorbing rate can be determined by the following method. Specifically, 1 g of a fabric comprising 100% of the nanoporous fiber is placed in a 5-liter Tedlar bag, and 3 liters of a gas containing ammonia is introduced into the bag to adjust the initial concentration ($C_0$) to 40 ppm. The gas is sampled from the Tedlar bag 2 hours later, and the ammonia concentration ($C_1$) is determined. Separately, a blank test without using a fabric sample is carried out, and the ammonia concentration ($C_B$) is determined 2 hours later. The ammonia adsorbing rate is determined by calculation according to the following equation.

$$\text{Ammonia adsorbing rate (\%)} = \{(C_B - C_1)/C_B\} \times 100 (\%)$$

The porous fibers according to the present invention can adsorb not only gases but also liquids, may exhibit water retention capability equivalent to cotton to have a percentage of water retention of 60% or more. The nanoporous fibers according to the present invention can have a percentage of water retention of 60% or more according to any suitable procedure, for example, by using a polymer inherently having some water retention capability to constitute the nanoporous fibers. Examples of the polymer inherently having some water retention capability are polyamides such as N6 and N66. As a matter of course, a water-absorbing material such as a polyalkylene oxide may be incorporated into the nanopores.

The percentage of water retention can be determined in the following manner. Initially, a fabric comprising 100% of the nanoporous fiber is allowed to adsorb water sufficiently by immersing in water for one hour, is hanged on a hanger for one minute, is dewatered in a domestic washing machine (manufacturer: SANYO, Model: SW150P (A)) for 3 minutes to remove excess water on the surface of the fiber or in cavities between fibers.

In this procedure, the weight of the fabric sample ($W_1$) is determined, and, after drying at 60° C. for one hour, the dry weight ($W_0$) of the sample fabric is determined. Based on these parameters, the percentage of water retention is determined by calculation according to the following equation. In this connection, regular nylons have a percentage of water retention of about 20 to 30%.

$$\text{Percentage of water retention (\%)} = \{(W_1 - W_0)/W_0\} \times 100 (\%)$$

Some of the nanoporous fibers of the present invention exhibit reversible liquid-swelling property in a longitudinal direction of the yarn as wool and can exhibit functions as in naturally-occurring fibers, although they are synthetic fibers. The phrase "exhibit reversible liquid-swelling property" means that, when immersed therein, the nanoporous fiber adsorbs a liquid and swells or elongates in a longitudinal direction of the yarn, and, when the liquid is removed typically by drying, the nanoporous fiber shrinks in the longitudinal direction of the yarn to have the original length, and this behavior of the fiber is reversibly repeatable. The degree of reversible liquid swelling in a longitudinal direction of the yarn is preferably 6% or more.

Such nanoporous fibers having reversible liquid-swelling property in a longitudinal direction of the yarn can be produced according to any suitable procedure, such as by dispersing nanopores homogeneously in an total cross section of the fiber. The degree of reversible liquid swelling in a longitudinal direction of the yarn can be controlled to 6% or more by rendering the nanopores to have an average diameter of 30 nm or less.

The features and advantages mentioned above are essential features and advantages of the nanoporous fibers according to the present invention.

In addition, the fibers can have functions more easily than conventional fibers, since the nanopores easily take a variety of functional materials therein.

If a fabric made from a regular polyester fiber, for example, is mixed with a moisture absorbent containing a polyethylene glycol (hereinafter may be referred to as "PEG") having a molecular weight of 1000 or more in order to impart hygroscopicity thereto, the fiber cannot significantly take the moisture absorbent therein. In contrast, a nanoporous fiber of the present invention comprising PET can take a large quantity of the moisture absorbent therein, if imparted.

Squalanes are natural-occurring oil components extracted from shark liver and receive attentions as a substance having skin-care functions by the action of moisturizing. If a fabric made from a regular polyester fiber is mixed with such a squalane, the fiber cannot significantly take the squalane therein. In contrast, a fabric comprising the nanoporous fiber of the present invention can take a large quantity of a squalane therein and shows significantly improved washing resistance. This is surprising for those familiar with regular polyester fibers.

Examples of functional agents to be taken in are, in addition to such moisture absorbents and humectants, flame retardants, water repellents, cold insulators, heat insulators and lubricating agents. Such agents can have any shape in addition to such a fine-particle shape. The agents also include health-beauty promoting agents such as polyphenols, amino acids, proteins, capsaicin and vitamins; agents for dermatoses such as dermatophytosis; and medicaments such as antiseptics, anti-inflammatory agents and analgesics. In addition, agents for adsorbing and/or decomposing harmful substances, such as polyamines and photocatalytic nanoparticles, can also be used. If desired, it is also possible to allow the fiber to take one or more monomers capable of forming an organic or inorganic polymer therein and to allow them to be polymerized to form a hybrid material. The fiber can also have selective adsorptivity and/or catalytic activity by activating walls of the pores by chemical processing utilizing their large specific surface area. It is also surprising that the fiber can have any optional function with any optional effect.

The strength of the nanoporous fibers of the present invention is preferably 1.5 cN/dtex or more for higher tear strength and/or durability of the resulting fibrous article, and is more preferably 2 cN/dtex or more, and further preferably 2.5 cN/dtex or more.

The elongation percentage is preferably 20% or more for higher durability of the fibrous article.

To control the strength to 1.5 cN/dtex or more and the elongation percentage to 20% or more, the nanoporous fiber is preferably formed by using a polymer that can satisfy these requirements even if the polymer alone is made into yarns. For further improving the strength, it is important to use a polymer such as a polyamide or polyester which can yield a high strength when the polymer alone is made into yarns, or to reduce the area ratio of coarse pores and to reduce the average diameter of pores. The selection of a higher soluble polymer for use in the polymer alloy fiber serving as a precursor is also important. The higher soluble polymer preferably does not comprise such a substance as to inhibit the developing of a fiber structure, such as a pseudocrosslinking component.

The nanoporous fibers of the present invention may have a variety of profiles (cross sections) such as a trefoil, cross or hollow profile. Such nanoporous fibers having a modified profile can be prepared by using a conventional spinneret for fibers having an irregular profile.

The nanoporous region may spread overall at cross section of the fiber or may be unevenly located, for example, in a surface layer or an inner layer of the fiber or be located eccentrically.

The "nanoporous region" herein refers to a region containing pores each having a diameter of 100 nm or less in a number of one or more per square micrometer.

When the inner layer part of the fiber comprises a nanoporous region and the surface layer part of the fiber comprises a regular polymer, the resulting fiber has improved wear resistance, dimensional stability and/or strength.

In contrast, when the surface layer part of the fiber comprises a nanoporous region and the inner layer part of the fiber comprises a regular polymer, the fiber has improved dimensional stability and/or strength.

When the nanoporous region is eccentrically unevenly located, the fiber adsorbs water, swells in a longitudinal direction of the yarn and is further highly crimped.

When the nanoporous region is located in an outer area of crimps and the fiber swells as a result of water adsorption, the fiber is further highly crimped to thereby improve stretchability and/or bulkiness.

In contrast, when the nanoporous region is located in an inner area of crimps, the crimps elongate as a result of water adsorption, and the yarn elongates as wool. Thus, the entanglement of the fabric structure is loosened, and/or the stitches or weaves are enlarged to thereby improve air permeability.

When the nanoporous region is eccentrically located at cross section of a fiber as in the above examples, a fabric capable of breathing as a result of water adsorption can be provided. When the nanoporous region is unevenly located as described above, the area ratio of the nanoporous region is preferably 5 to 95%, more preferably 30 to 80%, and further preferably 40 to 60% of the total cross section of the fiber, for yielding satisfactory advantages of the nanoporous region and those of the other region. Such a nanoporous fiber having a located nanoporous region can be prepared by stopping dissolving off the higher soluble component from the polymer alloy fiber in the midway to thereby allow the higher soluble component to remain in the fiber, or by subjecting a polymer alloy and a regular polymer to multi-component fiber spinning to form a conjugated fiber and dissolving off the higher soluble component from the conjugated fiber.

Some of the nanoporous fibers of the present invention may be easily fibrillated by physical napping, such as buffing or water punching and are useful as fibrillated fibers or fibrous articles derived therefrom.

The diameter of the fibril can be controlled within a range of 0.001 to 5 μm, by selecting, for example, the combination of polymers in the polymer alloy fiber serving as a precursor, physical properties of the polymer alloy fiber, shape or configuration of pores in the nanoporous fiber, or napping conditions. Among them, the configuration of the pores are important, and the fiber is increasingly fibrillated with a reducing size of pores and an increasing number of the pores. This is also affected by the size and proportion of the higher soluble polymer blended in the polymer alloy fiber serving as a precursor. Such a fibrillated fiber has not been achieved in fibers having an excessively high wear resistance, such as polyamides, and is very useful.

The nanoporous fibers of the present invention can be used alone or in combination with one or more regular synthetic fibers, regenerated fibers or naturally-occurring fibers, for example, by mixing yarns, spinning of mixed cut fibers, mixing of cut fibers, combined weaving or combined knitting. When used in combination with a synthetic fiber having excellent dimensional stability and/or durability, the resulting fabric can have improved dimensional stability, durability and/or chemical resistance. When used in combination with a regenerated fiber or a naturally-occurring fiber, the fabric can have further improved hygroscopicity, water adsorptivity and/or hands.

When the nanoporous fibers of the present invention are yarns, they may be flat yarns without crimp, crimped yarns or yarns having any other configuration. The nanoporous fibers are preferably crimped yarns, since the resulting fabric can have bulkiness and/or stretchability and can be used in a wider range of applications. They can be formed into various fibrous articles such as continuous fibers, staples, woven fabrics, knitted fabrics, nonwoven fabrics, felts, synthetic leather and thermally molded articles. The fibers are preferably formed into woven fabrics or knitted fabrics for use as general clothing or products for interior. Alternatively, the fibers are preferably formed into nonwoven fabrics for use as functional products such as synthetic leather or filters, adsorptive materials, wiping cloths and abrasive cloths.

As is described above, the nanoporous fibers according to the present invention can yield high-quality dyed fabrics that are substantially free from decrease in color property and exhibit excellent hygroscopicity and/or adsorptivity, as compared with conventional porous fibers.

The nanoporous fibers can thereby provide comfortable clothing such as panty hoses, tights, underwear, shirts, blousons, pants or trousers, and coats. In addition, they can also be advantageously used for clothing materials such as cups and pads; for interior decoration that can control indoor environments, such as curtains, carpets, mats and furniture; for livingwares such as wiping cloths; for industrial materials such as filters and abrasive cloths; and for vehicle interior such as car seats and ceiling materials.

The nanoporous fibers, if adsorbing any functional molecule, can also be used as most advanced materials typically in the fields of environment, medical and information technology, such as health-cosmetic-related goods, base fabrics for medicaments, and electrodes of fuel cells.

The nanoporous fibers of the present invention can be produced by any suitable method, such as the following method in which a nanoporous fiber is produced by dissolving off a higher soluble polymer from a polymer alloy fiber comprising a lower soluble polymer and the higher soluble polymer. The method will be described below.

In the following description, a polymer alloy fiber having an islands-in-sea structure and comprising a lower soluble polymer as a sea part and a higher soluble polymer as islands parts is taken as an example. In this case, the abundance ratio of islands each having a diameter of 200 nm or more, namely the abundance ratio of coarsely aggregated polymer particles is 3% or less in terms of area ratio of the total islands. This significantly avoid decrease in color property in the resulting nanoporous fibers. The islands may have somewhat deformed elliptic shapes and do not always have perfect circular shapes. The diameters thereof are determined from the areas of the islands in terms of circle. The area of the total islands is a total area of all the islands present at cross section of a fiber and can be estimated based on the observation of the cross section of the fiber or the polymer blending ratio. The area ratio of islands each having a diameter of 200 nm or more is preferably 1% or less. More preferably, the area ratio of islands each having a diameter of 100 nm or more is 3% or less. The area ratio of islands each having a diameter of 100 nm or more is further preferably 1% or less.

The islands preferably have an average diameter of 1 to 100 nm, since such a polymer alloy fiber can yield, by removing the islands, a nanoporous fiber containing pores with smaller sizes than conventional porous fibers. The resulting nanoporous fiber containing pores with sizes on the order of nanometers is substantially free from scattering of visible radiation, exhibits markedly improved color property. In addition, it can scatter harmful ultraviolet rays and thereby gains a novel function of ultraviolet ray blocking. Furthermore, the fiber has a dramatically increased surface area and can thereby exhibit excellent hygroscopicity and/or adsorptivity unexpectable in conventional porous fibers.

The less the average diameter of the islands is, the more advantageous is from the viewpoints of color property and adsorptivity. However, an excessively small average diameter may cause excessively large interactions due to excessively large interfaces between the polymers and may lead to unstable thinning of the fiber in spinning. Accordingly, the average diameter of islands is more preferably from 10 to 50 nm.

The islands preferably have a lined structure. Thus, the islands-part polymer supports the polymer alloy upon thinning like reinforcing reinforcing bars and thereby stabilizes the thinning in spinning. The "lined structure" herein refers to a structure in which the ratio of the length to the diameter of the islands in an axial direction of the fiber is 4 or more. In general, the ratio of the length to the diameter of the islands in an axial direction of the fiber often stands at 10 or more, and such islands often become out of a field of view of a TEM.

To obtain such a polymer alloy fiber which is substantially free from coarse islands and contains the homogeneously dispersed nano-sized islands-part polymer, a key factor is the selection of a combination of polymers in consideration of affinity for each other and/or of a kneading procedure so as to knead the polymers highly, as mentioned later.

In another production method, an alloy fiber having the following special layered structure can be used instead of the polymer alloy having an islands-in-sea structure.

The "special layered structure" herein refers to a structure in which the following condition is observed on TEM observation of a cross section of the fiber.

Figure 8:
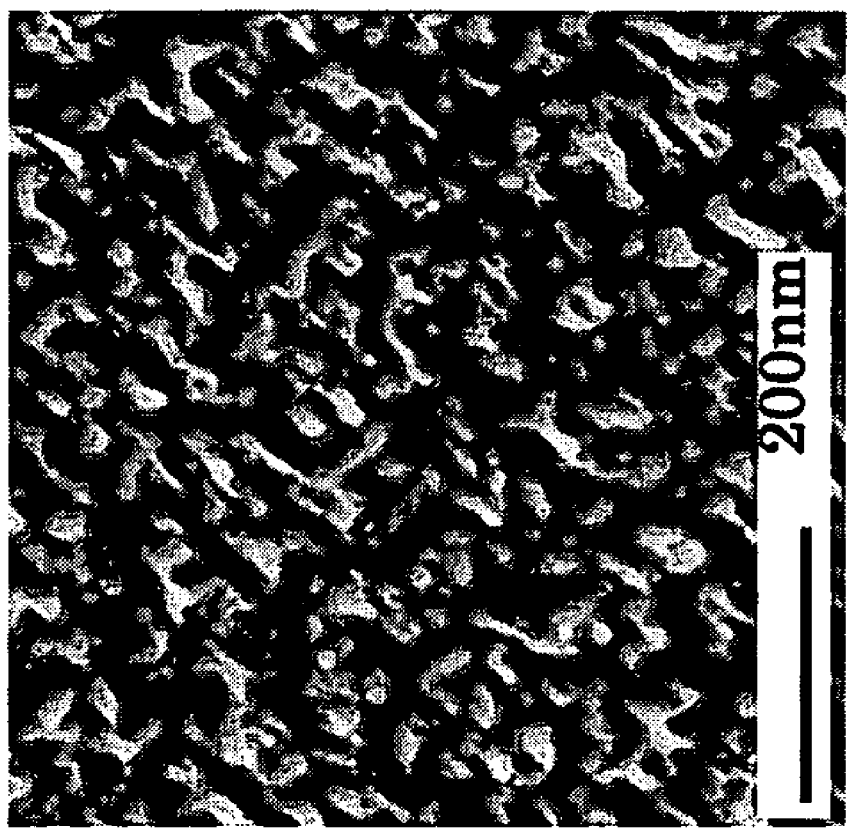
FIG. 8 is a transmission electron micrograph showing an example of a cross section of a polymer alloy fiber according to after-mentioned Example 8 of the present invention.

Specifically, blended different polymers constitute layers and are tangled with each other in the special layered structure (FIG. 8, a transmission electron micrograph of a cross section of the fiber). Thus, the interface between the different polymers is markedly larger than that in the islands-in-sea structure (FIGS. 3 and 16, transmission electron micrographs of a cross section of the fiber). This structure is a very unique structure in which the compatibility is higher than that in the islands-in-sea structure but is lower than that in a homogenous structure such as PET/PBT. However, the layered structure is distinguished from a modulated structure caused by "spinodal decomposition", since the structure does not show a clear periodicity of layers. The samples for TEM observation herein are dyed with a metal, and dark regions are the lower soluble polymer, and bright regions are the higher soluble polymer. The structure in question is a layered structure and is structurally apparently distinguished from a "sea-and-sea structure" in which islands parts are not clearly identified. The sea-and-sea structure is a very unstable structure which is formed at a blending ratio near to that where sea/islands are reversed in a polymer blend, and the spinning cannot be significantly stably carried out in this region. The average thickness of one layer of the higher soluble component in a cross sectional direction of the fiber should be preferably 1 to 100 nm. In the resulting fiber, the different polymers are sufficiently homogeneously dispersed with size on the order of nanometers and can satisfactorily exhibit properties as a blended polymer even if a small amount of one polymer is blended. The average thickness of one layer of the higher soluble component is preferably 1 to 50 nm. The layer observed at cross section of a fiber extends as a line in a longitudinal direction of the fiber (FIG. 10, a transmission electron micrograph of a longitudinal section of the fiber).

The polymer alloy fiber having the special layered structure shown typically in the figures can be prepared by a combination of specific polymers and spinning conditions. It can be prepared, for example, by kneading a polyamide (70 to 85% by weight) and a copolymerized PET (15 to 30% by weight) copolymerized with 4 to 6% by mole of a sulfonate component in a static mixer (having a number of splits of $100 \times 10^4$ or more) arranged in a spinning pack, and spinning the kneaded product.

As is described above, the nanoporous fibers of the present invention can be prepared by removing a higher soluble polymer from a polymer alloy fiber in which the higher soluble polymer is homogenously dispersed with size on the order of nanometers in a lower soluble polymer. According to conventional techniques, when a polymer having a low melting point or low softening point is used as the higher soluble polymer, the polymer is dispersed in large diameter, and the resulting fiber cannot satisfactorily pass through processes such as yarn treatment and fabric treatment, in which a high-temperature treatment is carried out, such as crimping and throwing. Thus, textured yarns or fabrics subjected to crimping or throwing cannot be substantially obtained.

The polymer alloy fiber of the present invention comprises a higher soluble polymer homogenously dispersed with size on the order of nanometers. Thus, even if a polymer having a low melting point or low softening point is used, the polymer alloy fiber can satisfactorily pass through yarn processing and/or fabric processing in which high-temperature treatment is carried out, and the resulting product has higher quality.

The polymers in the polymer alloy fiber has only to be two or more different polymers having different solubilities. Where necessary, the number of types of the lower soluble polymer and/or the higher soluble polymer can be increased, and one or more compatibilizers can be used.

The higher soluble polymer in the polymer alloy fiber is preferably a polymer easily soluble in an alkaline solution, since an alkali treatment process generally used as an after-processing process for regular fibers can be used for removing islands to thereby form a porous fiber. This is a great advantage in consideration that, for example, explosion-proof facilities are required when a polymer soluble in an organic solvent, such as a polystyrene, is used as the higher soluble polymer.

The higher soluble polymer is more preferably a polymer soluble in hot water, since the islands can be removed in a scoring or degumming process of the fiber. Examples of the polymer easily soluble in an alkaline solution are polyesters and polycarbonates. Examples of the polymer soluble in hot water are polyesters copolymerized with a large quantity of hydrophilic groups; alkylene oxides, polyvinyl alcohols, and modified products of these polymers.

The reduction finish for removing the higher soluble polymer is preferably carried out at a rate of 20% by weight or more per hour. This prevents filling of pores upon reduction at high temperatures and improves the productivity. The parameter herein is a reduction speed (rate) of reduction finish, and a process time of reduction finish less than one hour can be employed.

To allow the nanoporous fibers of the present invention to satisfactorily exhibit functions of the nanopores while maintaining the mechanical properties thereof, the content of the islands-part polymer serving as a higher soluble polymer in the blend is preferably 5 to 60% by weight, more preferably 10 to 30% by weight, and further preferably 15 to 25% by weight.

The polymer alloy fiber does not contain coarsely aggregated polymer particles and thereby undergoes the spinning process more stably than conventional equivalents, to obtain a fiber with less yarn unevenness. The yarn unevenness can be evaluated by an Uster unevenness (U %). The polymer alloy fiber for use in the present invention preferably has a U % of 0.1 to 5%, since the resulting fibrous articles typically for use in apparel, interior decoration and vehicle interior decoration show less dyeing speck and have high quality. The U % is more preferably 0.1 to 2%, and further preferably 0.1 to 1.5%. In contrast, a thick-thin yarn having a U % of 3 to 10% can be used for non-linear yarn for use in apparel. The U % can be controlled to a range from 0.1 to 5% by homogeneously dispersing the islands-part polymer to the order of nanometers. The U % can further be controlled by optimizing the combination of polymers, weighing and feeding the polymers independently in kneading, and/or optimizing spinning conditions such as the opening diameter of the spinneret and cooling conditions. The thick-thin yarn having a U % of 3% to 10% for obtaining a non-linear yarn can be prepared by employing conventional technologies used typically in PET.

The polymer alloy fiber preferably has a strength of 2 cN/dtex or more, since the resulting fiber can satisfactorily pass through processes such as throwing and weaving/knitting process. The strength is more preferably 2.5 cN/dtex or more, and further preferably 3 cN/dtex or more.

The strength of the polymer alloy fiber can be controlled to 2 cN/dtex or more by spinning under such conditions that the polymers are prevented from decomposing.

The strength can be controlled to 2.5 cN/dtex or more by optimizing the kneading procedure. A higher strength can be obtained by optimizing polymer conditions such as the blending ratio of the higher soluble polymer, viscosity/concentration of terminal groups of the polymer, and the comonomer component and/or optimizing, for example, spinning/drawing conditions and crimping conditions.

The polymer alloy fiber preferably has an elongation percentage of 15 to 70%. The resulting fiber can satisfactorily pass through processes such as throwing and/or weaving/knitting process. The elongation percentage is preferably 70 to 200% for use as a raw yarn for draw false-twisting. The resulting raw yarn can satisfactorily pass through the false twisting process. The elongation percentage is preferably about 70 to 500% for use as raw yarn for drawing, since the resulting yarn can satisfactorily pass through the drawing process. The elongation percentage of the polymer alloy fiber can be generally controlled by adjusting the spinning rate and/or draw ratio.

A conventional fiber that swells as a result of adsorption of moisture/water, such as a polyamide fiber, cannot significantly yield a "highly oriented undrawn yarn" having an elongation percentage of about 70 to 200%. This is because the fiber swells during spinning/winding, the wound package deforms and the fiber cannot be wound. The polymer alloy fiber mainly comprising such a polymer, however, can yield a highly oriented undrawn yarn by blending a polymer that does not swell as a result of adsorbing moisture/water, such as a polyester, in an amount of 5% by weight or more.

The polymer alloy fiber is preferably crimped, for increased bulkiness of the resulting fabric made from the nanoporous fiber. In the case of a false-twisted yarn, the crimp rigidity (CR) as an indication of crimping property is preferably 20% or more. The CR is more preferably 30% or more, and further preferably 40% or more. In the case of a mechanically crimped yarn or an air-jetted yarn, the number of crimp as an indication of crimping is 5 or more per 25 mm. The polymer alloy fiber can also be crimped by forming into a side-by-side or eccentric core-in-sheath conjugated yarn. In this case, the number of crimp is preferably 10 or more per 25 mm. The CR can be generally controlled by modifying false twisting conditions such as crimping procedure and device, the number of revolutions of twister, and temperature of heater. The CR can be controlled to 20% or more by setting the temperature of the heater at [(the melting point of the polymer)−70] (° C.) or higher. To further increase the CR, increase of the temperature of the heater and/or reduction in blending ratio of the higher soluble polymer blend is effective.

The number of crimp of a mechanically crimped yarn or air-jetted yarn can be easily controlled to 5 or more per 25 mm by appropriately selecting the crimping machine or modifying the conditions such as feeding rate.

The number of crimp of a side-by-side or eccentric core-in-sheath conjugated yarn can be controlled to 10 or more per 25 mm, for example, by setting the difference in melt viscosity between polymers to be conjugated at 2 times or more, or by setting the difference in thermal shrinkage between polymers upon spinning separately to 5% or more.

The polymer alloy fiber can be prepared, for example, by the following method, but the production method is not specifically limited thereto.

Specifically, a lower soluble polymer and a higher soluble polymer are melted and kneaded to obtain a polymer alloy comprising the lower soluble polymer and the higher soluble polymer in which the lower soluble polymer and/or higher soluble polymer is finely dispersed. This is melt spun to obtain the polymer alloy fiber of the present invention.

In this method, the melting and kneading procedure is important. In other words, the polymers are forcedly kneaded by using an extrusion-kneader or a static mixer to thereby significantly reduce coarsely aggregated polymer particles.

The conventional technique (Japanese Unexamined Patent Publication (Kokai) No. 56-107069) employs chip blending (dry blending), thereby invites significant unevenness in blending and fails to prevent the islands-part polymer from aggregating.

For forced kneading, a twin-screw extrusion-kneader is preferably used as the extrusion-kneader, and a static mixer having a number of splits of $100 \times 10^4$ or more is preferably used as the static mixer in the present invention. The polymers to be kneaded are preferably weighed and fed separately for preventing uneven blending and/or variation in blending ratio with time. In this case, the polymers may be separately fed as pellets or as molten polymers. The two or more different polymers may be fed to a bottom portion of the extrusion-kneader. Alternatively, one of these components may be fed in the midway of the extrusion-kneader in a side feed manner.

When a twin-screw extrusion-kneader is used as the kneader, it is preferred that the polymers are highly kneaded while reducing the residence time of the polymers. The screw comprises a feeding section and a kneading section. The length of the kneading section is preferably set at 20% or more of the effective length of the screw for highly kneading the polymers. The length of the kneading section is preferably set at 40% or less of the effective length of the screw. This avoids excessively high shear stress and shortens the residence time, thus preventing thermal degradation of the polymers and/or gelation of the polyamide component. The kneading section is preferably arranged near to the discharge port of the twin-screw extruder to thereby shorten the residence time after kneading and to prevent reaggregation of the islands-part polymer. In addition, a screw having a back-flow function to feed the polymers in a reverse direction may be arranged in the extrusion-kneader, for further higher kneading.

By using a bent-type kneader to aspirate a decomposed gas during kneading and/or to reduce the moisture in the polymers, the polymers are prevented from hydrolyzing, and the amount of terminal amino groups in a polyamide or terminal carboxylic acid groups in a polyester can be reduced.

Polymer alloy pellets can thus be prepared by using a twin-screw extrusion-kneader. Examples of preferred combinations of polymers from the viewpoint of multiplicity of use are:

Combination 1: a polyamide and a polyester; and
Combination 2: a polymer soluble in hot water and a polymer selected from polyamides, polyesters and polyolefins.

The average diameter of dispersed polymer particles in preferred Combination 1 comprising a polyamide and a polyester is preferably 1 to 50 nm. The area ratio of coarsely dispersed polymer particles each having a diameter in terms of circle of 100 nm or more is preferably 3% or less of the total dispersed polymer particles in a cross section of a pellet. Such pellets hardly yield coarse islands in the resulting polymer alloy fiber. The amount of terminal amino groups in the polymer alloy pellets is preferably $6 \times 10^{-5}$ molar equivalent or less per gram of the polyamide, for better spinnability or reduced yarn unevenness.

In preferred Combination 2 comprising a polymer soluble in hot water and a polymer selected from polyamides, polyesters and polyolefins, the blending ratio of the polymer soluble in hot water serving as a higher soluble component is preferably 10 to 30% by weight. Thus, an extruded gut derived from the pellets is satisfactorily spun and cut, whereas the resulting nanoporous fiber exhibits satisfactory functions. The b* value as an indicator of coloring of the polymer alloy pellets is preferably 10 or less, since the resulting fiber can have homogenous hue. Such a polymer soluble in hot water generally has poor thermal stability and is susceptible to coloring due to its molecular structure. However, the coloring can be prevented by shortening the residence time. Examples of the polymer soluble in hot water are polyesters copolymerized with a large quantity of hydrophilic groups, polyalkylene oxides, polyvinyl alcohols, and modified products of these polymers. Among them, polyetheresters, a kind of polyalkylene oxide modified products, are preferred for their dissolution rate and thermal stability.

The kneader may be arranged separately from a spinning machine, in which polymer alloy pellets produced in the kneader is fed to the spinning machine. Alternatively, the kneader is directly connected to a spinning machine, in which kneaded and molten polymers are directly spun. When a static mixer is used as the kneader, it may be placed in a spinning pack.

The chip blending (dry blending) can be carried out in the following manner for reducing cost in spinning.

Initially, polymer pellets to be blended are independently weighed and fed to a blending tank and are chip-blended therein. The blending tank preferably has a capacity of 5 to 20 kg for efficient blending while avoiding uneven blending. The blended pellets are fed from the blending tank to an extrusion-kneader, to obtain a molten polymer. The kneading may be carried out by using a twin-screw extrusion-kneader or by feeding the molten polymer into a static mixer arranged in a piping or a pack. Master pellets containing a larger amount of the higher soluble polymer can be used.

The master pellets in polymer alloy pellets comprising a polyamide and a polyester preferably have the following parameters. Specifically, the polyester is preferably copolymerized with 1.5 to 15% by mole of a sulfonate for better affinity for the polyamide. The blending ratio thereof is preferably 30 to 90% by weight for further efficient dilution of the master pellets. The average weight of the pellets is preferably 2 to 15 mg for matching the weight of the virgin polyamide and reducing uneven blending.

The average weight and shape of the pellets are preferably near to those of polymer pellets to be diluted, for preventing uneven blending. More specifically, the difference in average weight between the polymer alloy pellets and the polymer pellets to be diluted is preferably within a range from −20% to +20%.

The residence time from formation and melting of the polymer alloy to discharge from a spinneret is a key factor for inhibiting reaggregation of the islands-part polymer in spinning to thereby reduce coarsely aggregated polymer particles. Thus, the residence time for the polymer alloy from the tip of a melting section to the spinneret is preferably set within 30 minutes. This requirement must be met particularly in the case of an alloy comprising a nylon and a PET copolymerized with hydrophilic groups, since the PET copolymerized with hydrophilic groups is susceptible to reaggregation.

The combination of polymers is an important factor to disperse the islands-part polymer to the order of nanometers. Specifically, a combination of a lower soluble polymer and a higher soluble polymer with a higher affinity allows the higher soluble polymer to disperse as nano-sized islands more easily. For example, when a nylon and a polyethylene terephthalate (PET) are used as the lower soluble polymer and the higher soluble polymer, respectively, the PET is preferably a PET copolymerized with hydrophilic groups copolymerized with a sulfonate, a hydrophilic component, such as 5-sodiosulfoisophthalic acid (SSIA) for better affinity for the nylon. In particular, a hydrophilized PET having a degree of copolymerization with SSIA of 4% by mole or more is preferred.

The ratio in melt viscosity of the sea-part polymer to the islands-part polymer is also an important factor. Specifically, the islands-part polymer tends to disperse on the order of nanometers more easily due to an increasing shear force with an increasing ratio in melt viscosity of the sea-part polymer to the islands-part polymer. However, an excessively large ratio in viscosity may cause uneven kneading and/or deteriorated spinnability. The viscosity ratio is preferably from about 1/10 to 2. In the combination of a polyester or polyester with a polymer soluble in hot water, the viscosity ratio is considered to play a more important role than the affinity between the polymers and is preferably set at 0.5 to 1.5.

Preferred embodiments of the method for melt-spinning a polymer alloy fiber according to the present invention are as follows.

In a method for melt-spinning a polymer alloy fiber, comprising the steps of weighing and feeding a lower soluble polymer and a higher soluble polymer independently to a twin-screw extrusion-kneader, melting and blending the polymers in the twin-screw extrusion-kneader to form a polymer alloy, and melt-spinning the polymer alloy, the step of spinning is preferably carried out so as to satisfy the following conditions (1) to (3):

(1) the content of the higher soluble polymer in the polymer alloy is 5 to 60% by weight;

(2) the ratio in melt viscosity of the lower soluble polymer to the higher soluble polymer is 0.1 to 2; and (3) the length of a kneading section of the twin-screw extrusion-kneader is 20% to 40% of the effective length of the screws.

Alternatively, in a method for melt-spinning a polymer alloy fiber, comprising the steps of weighing and feeding a lower soluble polymer and a higher soluble polymer independently to a static mixer having a number of splits of $100 \times 10^4$ or more, melting and blending the polymers in the static mixer to form a polymer alloy, and melt-spinning the polymer alloy, the step of spinning is preferably carried out so as to satisfy the following conditions (4) and (5):

(4) the content of the higher soluble polymer in the polymer alloy is 5 to 60% by weight; and (5) the ratio in melt viscosity of the lower soluble polymer to the higher soluble polymer is 0.1 to 2.

Further alternatively, in a method for melt-spinning a polymer alloy fiber, comprising storing and dry-blending two or more different pellets comprising a lower soluble polymer and a higher soluble polymer, respectively, in a blending tank before melting of the pellets, feeding the dry-blended pellets to a melting section, and blending and melt-spinning the dry-blended pellets, the step of spinning is preferably carried out so as to satisfy the following conditions (6) to (8):

(6) the content of the higher soluble polymer in the fiber is 5 to 60% by weight;

(7) the ratio in melt viscosity of the lower soluble polymer to the higher soluble polymer is 0.1 to 2; and (8) the blending tank can contain 5 to 20 kg of pellets.

Namely, it is important to set the blending ratio of the higher soluble polymer at 5 to 60% by weight and to set the melt viscosity ratio of the lower soluble polymer to the higher soluble polymer in a range from 0.1 to 2. In addition, important factors are to set the length of a kneading section in a twin-screw extrusion-kneader, if used, at 20 to 40% of the effective length of the screws in melt-blending and melt-spinning using such a twin-screw extrusion-kneader, or to use a static mixer having a number of splits of $100 \times 10^4$ or more in melt-blending and melt-spinning using such a static mixer, or to use a blending tank for pellets having a capacity of 5 to 20 kg in dry blending and melt-spinning. The dry blending is inferior in blending uniformity but superior in cost to the melt-blending, since the former comprises a simpler process. In the case of dry blending, the above-mentioned master pellets are preferably used to prevent uneven blending to some extent.

The production methods according to the present invention have the above-mentioned features, thereby prevent the formation of coarsely aggregated polymer particles, keep good balance in viscoelasticity of the polymer alloy, achieve stable spinning and discharging, significantly improve stringiness or spinnability and markedly reduce yarn unevenness, as compared with conventional equivalents.

For higher spinning stability, the polymers preferably have low concentrations of terminal groups. In the case of polyamides, the amount of terminal amino groups is preferably $5.5 \times 10^{-5}$ molar equivalent or less per gram. Such polyamides have less thermal stability than polyesters and are susceptible to gelation as a result of thermal degradation. In addition, the present inventors have found in the investigations for the present invention that a polymer alloy comprising a polyamide and a polyester is further more susceptible to gelation than a polyamide alone. This is probably because the molecular chain terminal of the polyester plays a catalytic role. Such a gelated polyamide invites yarn breaking and/or yarn unevenness, leads to increased process pressures such as filtration pressure of the polymer and back pressure of the spinneret to thereby lower the upper limit of the discharge rate or shorten the pack life. The productivity per unit time is markedly decreased and yarn breaking frequently occurs. Accordingly, such a polyamide/polyester alloy must be avoided from gelation. Thus, the amount of terminal amino groups should preferably be $5.5 \times 10^{-5}$ molar equivalent or less per gram by, for example, blocking the amine terminals of the polyamide to be used in the polymer alloy typically with acetic acid. When the polyamide/polyester alloy is once pelletized, the amount of terminal amino groups is preferably set at $6\times10^{-5}$ molar equivalent or less per gram of the weight of the polyamide in the polymer alloy pellets.

The spinning is preferably carried out at temperatures of 300° C. or lower for preventing thermal decomposition and gelation of the polymers.

The spinneret preferably has a diameter larger than regular one. This reduces the shear stress on the polymer alloy in a spinneret nozzle to keep well-balanced viscoelasticity to thereby improve the spinning stability. More specifically, the spinneret is preferably so configured as to discharge the polymer alloy at a linear velocity of 15 m or less per minute. In addition, cooling of the line of thread is also important. The distance from the spinneret to a position at which positive cooling starts is preferably set at 1 to 15 cm. Thus, the polymer alloy that tends to be unstable in elongational flow is rapidly solidified to thereby stabilize the spinning.

The spinning draft is preferably set at 100 or more for further finely dispersing the islands-part polymer. The spinning rate is preferably set at 800 meters or more per minute for reducing yarn unevenness during spinning of the undrawn yarn. The spinning rate is more preferably set at 2500 meters or more per minute to thereby develop the fiber structure, for reducing change in dimensions and physical properties of the yarn with time.

The prepared polymer alloy fiber may be subjected to draw thermal treatment or draw false twisting after being wound or may be directly subjected to drawing or air-jetting without being wound.

The thermal treatment temperature in crimping is preferably set lower than [(the melting point of the lower soluble polymer)–50° C.] for preventing fusion in the crimping process and improving the quality of crimps. The fiber may be converted into short staples and then converted into a nonwoven fabric or a spun yarn.

The resulting yarn can be subjected to yarn mixing such as air yarn mixing or combined false-twisting, to mixing and twisting with another yarn, or to mixing of cut fibers or spinning of mixed cut fibers. The polymer alloy fiber alone or in combination with another yarn can be formed into a woven or knitted fabric or a nonwoven fabric or can be formed into a nonwoven fabric by spun bond or melt blow.

A fabric at least partially comprising a nanoporous fiber can be obtained by dissolving off the higher soluble polymer from the resulting fabric at least partially comprising the polymer alloy fiber.

The fabric can be naturally used as a fabric at least partially comprising the polymer alloy fiber without dissolving off the higher soluble polymer. In particular, a highly oriented undrawn yarn can be prepared from a polyamide as described above, which cannot be achieved by conventional equivalents. Thus, a fabric comprising a crimped yarn or a combined filament yarn, such as a combined false twisted yarn, prepared by utilizing this highly oriented undrawn yarn has an excellent hands with further more bulkiness and softness than conventional equivalents and is of high value even used as intact. Some fabrics comprising 100% of the polymer alloy fiber, other than a combined filament yarn, may exhibit improved thermal stability and/or mechanical properties by the action of the nanosized polymer alloy and are of high value as intact.

If a fabric comprising 100% of the nanoporous fiber has insufficient dimensional stability and/or wear resistance, these requirements may be satisfied by using another yarn in combination, as mentioned above. In this case, the polymer alloy fiber serving as a precursor of the nanoporous fiber is subjected to reduction finish preferably at a rate of 20% by weight or more per hour on the weight basis of the polymer alloy in dissolution off of the higher soluble polymer.

As is described above, the nanoporous fibers of the present invention can be prepared by using the polymer alloy fiber which is prepared by a method unlike conventional equivalents. They have pores with less dimensions than conventional equivalents, are substantially free from coarse pores, can yield excellent materials usable in clothing and other various fields and are epoch-making.

EXAMPLES

The present invention will now be described in detail by way of the following examples. The physical properties in the examples were determined by the following methods.

A. Melt Viscosity of Polymer:

The melt viscosity of a sample polymer was determined using Capillograph 1B available from Toyo Seiki Seisaku-Sho, Ltd. The residence time of the sample polymer from charging of the sample to the beginning of determination was set at 10 minutes.

B. Relative Viscosity of Nylon:

Sample nylon pellets were dissolved in a 98% sulfuric acid solution to a concentration of 0.01 mg/ml, and the relative viscosity was determined at 25° C.

C. Intrinsic Viscosity [η] of Polyester:

The intrinsic viscosity was determined in o-chlorophenol at 25° C.

D. Melting Point:

The melting point was defined as the peak top temperature at which a sample polymer melted in a second run as determined using Perkin Elmaer DSC-7 at a temperature elevation rate of 16° C. per minute ad an amount of the sample of 10 mg.

E. Mechanical Properties:

A load-elongation curve was determined at room temperature (25° C.) and a tension speed of 100% per minute under conditions shown in Japanese Industrial Standards (JIS) L1013. In this procedure, the strength was defined by dividing the load at break by the initial fineness, and the elongation was defied by dividing elongation at break by the initial length of the sample. From these parameters, a strength elongation percentage curve was determined.

F. Uster Unevenness (U %) of Polymer Alloy Fiber:

The Uster unevenness was determined using USTER TESTER 4 available from Zellweger Uster in a normal mode at a yarn feed speed of 200 m per minute.

G. Thermal Shrinkage:

Thermal shrinkage (%)=[($L0$–$L1$)/$L0$)]×100(%)

L0: The original length of a skein wound from drawn yarn as determined at an initial tension of 0.09 cN/dtex L1: The length of the skein at an initial tension of 0.09 cN/dtex after determination of L0, treatment in boiled water for fifteen minutes under substantially no load and air-drying.

H. TEM Observation of Cross Section of Fiber:

Ultrathin peaces of a sample fiber in a cross-sectional direction or a longitudinal sectional direction were prepared, and the cross sections of the fiber were observed using a transmission electron microscope (TEM). Where necessary, the sections were subjected to metal staining.

TEM device: Model H-7100FA available from Hitachi Ltd.

I. Diameters of Pores or Island-Component Polymer:

The diameter of pores was determined in the following manner. The diameters of islands in terms of circle were determined from TEM photographs of the cross section of the fiber using an image processing software (WINROOF). If the shapes of the islands were excessively fine or complicated and the analyses thereof by WINROOF was difficult, the shapes were analyzed by visual observation manually. The average diameter was determined as a simple number-average of the determined diameters.

The average diameter was determined by using 300 or more pores selected at random in one cross section. The diameter determination was carried out carefully in consideration of the condition of the sample, because such ultrathin samples for TEM observation often cause breakage. Inorganic fine particles and voids therearound were not included in the pores. The diameter of the islands-part polymer was determined in accordance with the determination of the diameters of the pores.

J. Evaluation of Color Property:

A prepared sample was dyed according to a conventional procedure, and the color property was compared with that of a comparative sample dyed under the same conditions. The comparative sample was prepared by spinning polymers constituting a nanoporous fiber according to a conventional procedure in the following manner.

In the case of a nylon, a sample fibrous article was dyed with a stain solution containing a dye "Nylosan Blue N-GFL" available from Clariant Japan Co., Ltd. at pH 5 in a concentration of 0.8% by weight of the fibrous article at a liquor-goods ratio of 100 at 90° C. for 40 minutes.

In the case of a polyester, a sample fibrous article was dyed with a stain solution containing a dye "Foron Navy S-2GL" available from Clariant Japan Co., Ltd. at pH 5 in a concentration of 0.8% by weight of the fibrous article at a liquor-goods ratio of 100 at 130° C. (110° C. in the case of polylactic acid) for 40 minutes.

The color property of the sample was determined according to the following four criteria. "Excellent" and "Good" were passed the test, and "Fair" and "Failure" were not passed the test.

Excellent: almost equal to or high than that of the comparative sample

Good: somewhat lower than that of the comparative sample but enough for use in clothing Fair: somewhat lower than that of the comparative sample Failure: significantly lower than that of the comparative sample K. Ratio of Moisture Adsorption ($\Delta MR$):

About 1 to 2 g of a sample was weighed in a weighing bottle, dried at 110° C. for 2 hours, and the weight of the dried sample ($W0$) was determined. Next, the sample substance was held to 20° C. at relative humidity of 65% for 24 hours, whose weight was then determined ($W65$), and the sample substance was then held to 30° C. at relative humidity of 90% for 24 hours, whose weight was then determined ($W90$). The ratio of moisture adsorption ($\Delta MR$) was determined by calculation according to the following equations.

$$MR65=[(W65-W0)/W0]\times 100\% \quad (1)$$

$$MR90=[(W90-W0)/W0]\times 100\% \quad (2)$$

$$\Delta MR=MR90-MR65 \quad (3)$$

L. Reversible Water Swelling and Percentage of Swelling in Longitudinal Direction of Yarn:

The original length ($L0'$) of a sample fiber was determined after drying the fiber at 60° C. for 4 hours. The fiber was immersed in water at 25° C. for 10 minutes and was taken out, and the length of the fiber after treatment ($L1'$) was determined immediately thereafter. The length of the fiber after drying ($L2'$) was then determined after drying the fiber at 60° C. for 4 hours.

The procedure of drying and immersion in water was repeated a total of three times. The sample was evaluated to have reversible water swelling when it showed a percentage of swelling in a longitudinal direction of the yarn in the third procedure of 50% or more of that in the first procedure. The percentage of swelling in a longitudinal direction of the yarn was determined by calculation according to the following equation. The length of the fiber was determined by binding the sample fiber with two colored yarns at an interval of about 100 mm, and measuring the length between the two yarns.

Percentage of swelling (%) in longitudinal direction of the yarn=$((L1'-L0')/L0')\times 100(\%)$ M. Percentage of Water Retention:

The percentage of water retention was determined in the following manner. Initially, a sample was allowed to adsorb water sufficiently by immersing in water at 25° C. for one hour, hanged on a hanger for one minute, and dewatered in a domestic washing machine for 3 minutes to remove excess water on the surface of the fiber or in cavities between fibers. In this procedure, the weight of the fabric sample ($W_1$) was determined, and, after drying at 60° C. for one hour, the dry weight ($W_0$) of the sample fabric was determined.

Percentage of water retention (%)=$\{(W_1-W_0)/W_0\}\times 100(\%)$

N. Ammonia Adsorbing Rate 1 g of a sample fabric comprising 100% of a nanoporous fiber was placed in a 5-liter Tedlar bag, and 3 liters of a gas containing ammonia was introduced into the bag to adjust the initial concentration ($C_0$) at 40 ppm. The gas was sampled from the Tedlar bag 2 hours later, and the ammonia concentration ($C_1$) was determined. Separately, a blank test without using a fabric sample is carried out, and the ammonia concentration 2 hours later ($C_B$) was determined. The ammonia adsorbing rate was determined by calculation according to the following equation.

Ammonia adsorbing rate (%)=$\{(C_B-C_1)/C_B\}\times 100(\%)$

O. Crimping Property CR of False-Twisted Yarn:

A sample false-twisted yarn was wound, treated in boiling water for 15 minutes under substantially no load and air-dried for 24 hours. The sample was immersed in water under a load of 0.088 cN/dtex (0.1 gf/d), and the length of the skein 2 minutes later ($L0''$) was determined. Then the load of 0.088 cN/dtex was replaced with a slight load of 0.0018 cN/dtex (2 mgf/d) in water, and the length of the skein 2 minutes later ($L1''$) was determined. CR was determined by calculation according to the following equation.

CR (%)=$[(L0''-L1'')/L0'']\times 100(\%)$

P. Number of Crimps:

A sample fiber 50 mm long was sampled, the number of crimp (peaks) per 25 mm was determined, and the number of crimp was defined as the half of the above-determined value.

Q. Color Tone (b*):

The color tone b* was determined using a MINOLTA SPECTROPHOTOMETER CM-3700d with a light source of D65 (color temperature of 6504K) in a visual field of 10 degrees.

Example 1

A N6 (80% by weight) and a copolymerized PET (20% by weight) were melted and kneaded in a twin-screw extrusion-kneader at 260° C. to obtain polymer alloy pellets. The N6 had a relative viscosity of 2.15, a melt viscosity of 274 poises (280° C. at a rate of shear of 2432 sec$^{-1}$), a melting point of 220° C., and an amount of terminal amino groups of $5.0\times10^{-5}$ molar equivalent per gram as a result of blocking amine terminals with acetic acid. The copolymerized PET had an intrinsic viscosity of 0.60, a melt viscosity of 1400 poises (280° C. at a rate of shear of 2432 sec$^{-1}$) and a melting point of 250° C., had been copolymerized with 5% by mole of 5-sodiosulfoisophthalic acid and contained 0.05% by weight of titanium oxide.

Figure 5:
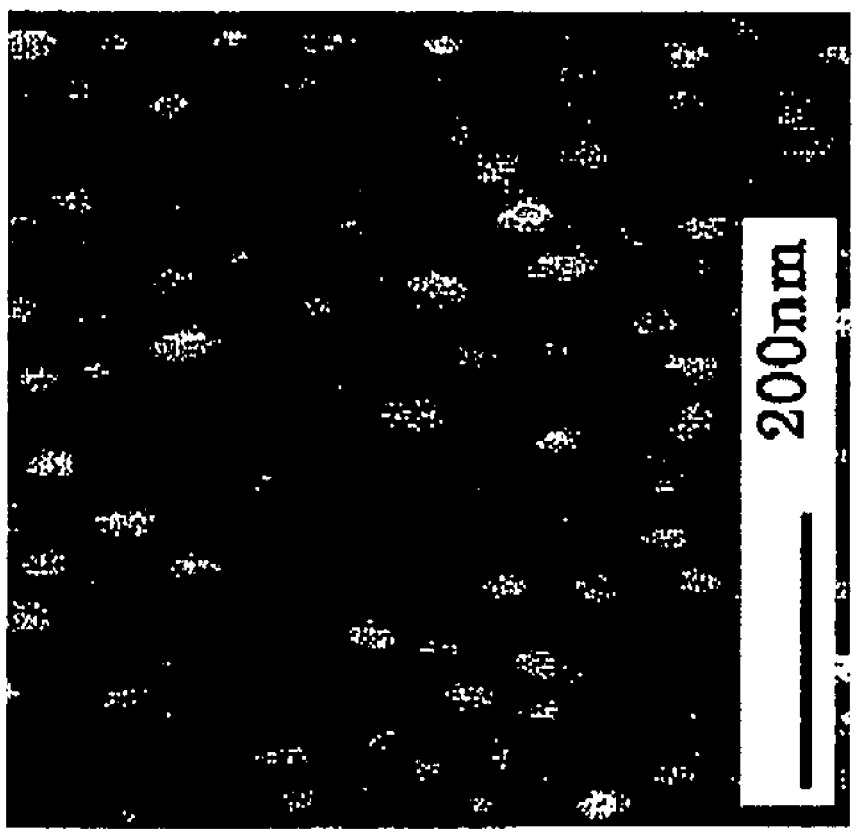
FIG. 5 is a transmission electron micrograph showing an example of a cross section of pellets of a polymer alloy according to after-mentioned Example 1 of the present invention.

The transmission electron micrograph of a cross section of the polymer alloy pellets is shown in FIG. 5. The copolymerized PET as islands had diameters in terms of circle of 20 to 30 nm (average diameter of dispersed particles of 26 nm) and were substantially free from coarse islands each having a diameter in terms of circle of 100 nm or more. Thus, the copolymerized PET was homogeneously dispersed with size on the order of nanometers in N6.

The average weight of the pellets was 3 mg, and the amount of terminal amino groups is $3.3\times10^{-5}$ molar equivalent per gram of the weight of N6. The kneading conditions are as follows.

Figure 28:
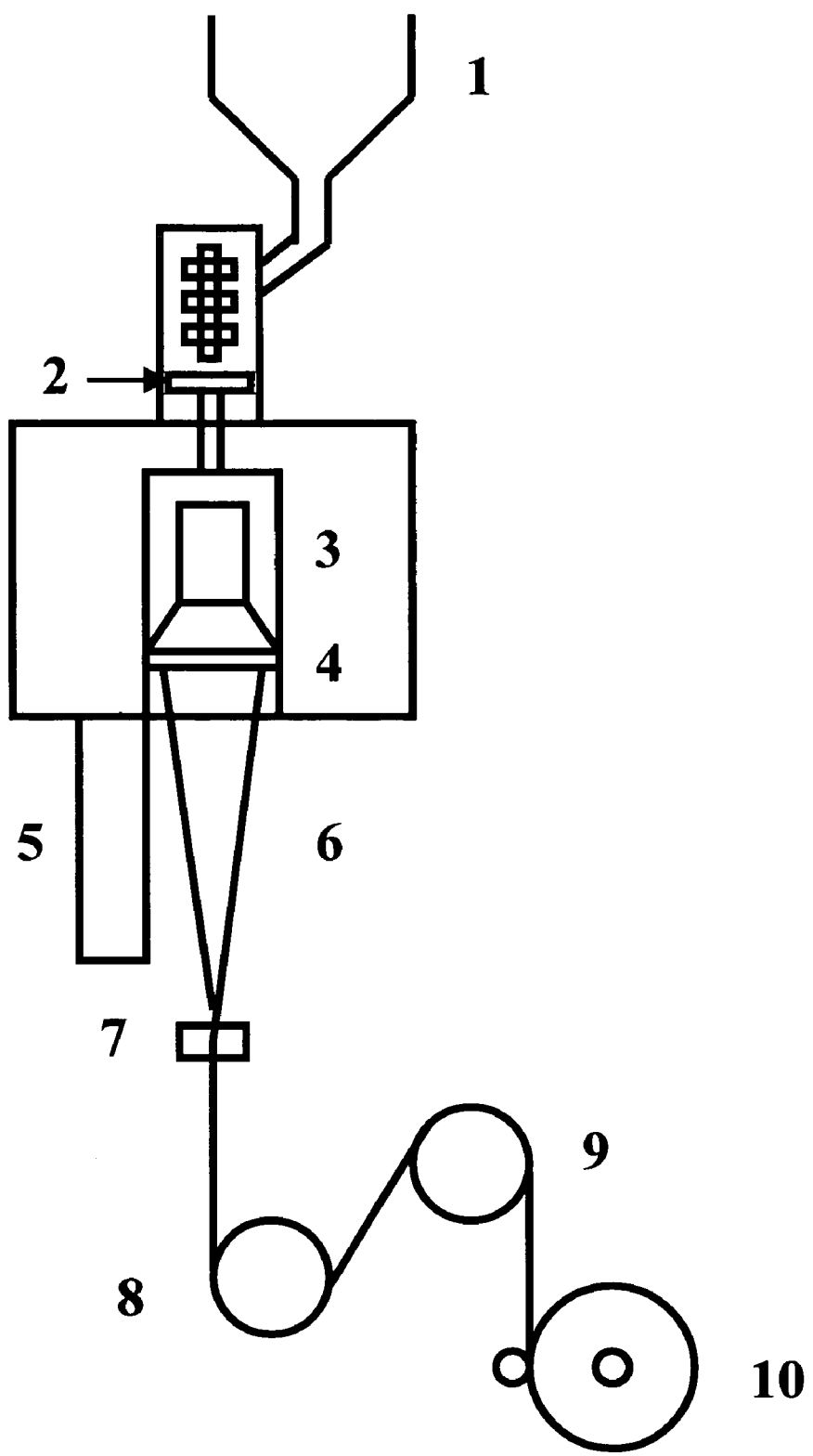
FIG. 28 is a diagram showing an example of a spinning machine.

Screw type: one-direction fully interlocking double shred
Screw: diameter of 37 mm, effective length of 1670 mm, L/D=45.1
The length of the kneading section was 28% of the effective length of the screw.
The kneading section was arranged on the discharge side from one-thirds of the effective length of the screw.
Having three back flow sections in the midway
Feed of polymer: N6 and the copolymerized PET were independently weighed and were separately fed to the kneader.
Temperature: 260° C.
Vent: 2 points The polymer alloy was melted in a melting section 2 at 270° C. and introduced to a spin block at a spinning temperature of 275° C. The molten polymer alloy was filtrated through a metallic nonwoven fabric having a diameter of ultrafiltration of 15 µm and subjected to melt spinning (FIG. 28). The residence time from the melting section 2 to discharge was 10 minutes. In this procedure, a spinneret having an orifice diameter of 0.3 mm and an orifice length of 0.65 mm was used, at a discharge rate per orifice of 2.1 g per minute and a linear velocity of the discharged polymer alloy in the spinneret of 28 meters per minute. The distance between the lower end of the spinneret to the start point of cooling (upper end of a cooling equipment 5) was 9 cm. The discharged thread was cooled and solidified by a cooling air at 20° C. over one meter, fed with an oil by an finishing guide 7 arranged 1.8 meter down the spinneret 4 and wound through a first take-up roller 8 and a second take-up roller 9 not heated at a rate of 3800 meters per minute.

In this procedure, the fiber showed good spinnability and was free from, for example, Barus phenomenon in which the discharged polymer swells directly below the spinneret, or end breakage due to insufficient stringiness or spinnability. The fiber invited no yarn breaking during continuous spinning for 24 hours. The yarn did not cause deformation of the wound package due to swelling with time, which constitutes a problem in regular nylon yarns, and showed good handleability.

Figure 29:
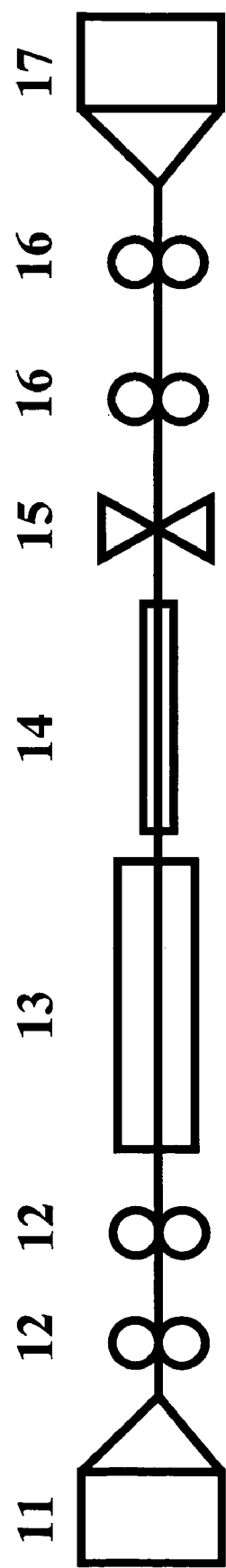
FIG. 29 is a diagram showing an example of a false-twist texturing machine.

The undrawn polymer alloy yarn had satisfactory physical properties such as a strength of 2.6 cN/dtex, an elongation percentage of 138% and a U % of 0.9%. This undrawn yarn was subjected to draw false-twisting using a device shown in FIG. 29, to obtain a false-twisted polymer alloy yarn with false-twisting directions of S and Z. This procedure was carried out at a draw ratio of 1.5, a temperature of a heater 13 of 165° C., using a friction type false twisting machine with three-axes-urethane-disk as a twister 15. The ratio of the surface velocity of rotated disks to the speed of texturing (D/Y ratio) was set at 1.65. The yarn was satisfactorily processed without end breakage and winding around the roller and twister.

The resulting 87 dtex, 24-filament false-twisted yarn had excellent physical properties including a strength of 2.7 cN/dtex, an elongation percentage of 21%, a thermal shrinkage of 8%, a U % of 1.0% and a CR of 38% (Table 2) and showed good crimping quality without not-untwisted portions.

The cross section of a mono-filament of the resulting crimped polymer alloy yarn was observed under a TEM and was found to have an islands-in-sea structure comprising N6 as a sea (dark region) and the copolymerized PET as islands (bright region) (FIG. 3) with an average diameter of the islands of 25 nm. Thus, a polymer alloy fiber comprising the copolymerized PET homogeneously dispersed with size on the order of nanometers was prepared.

Figure 3:
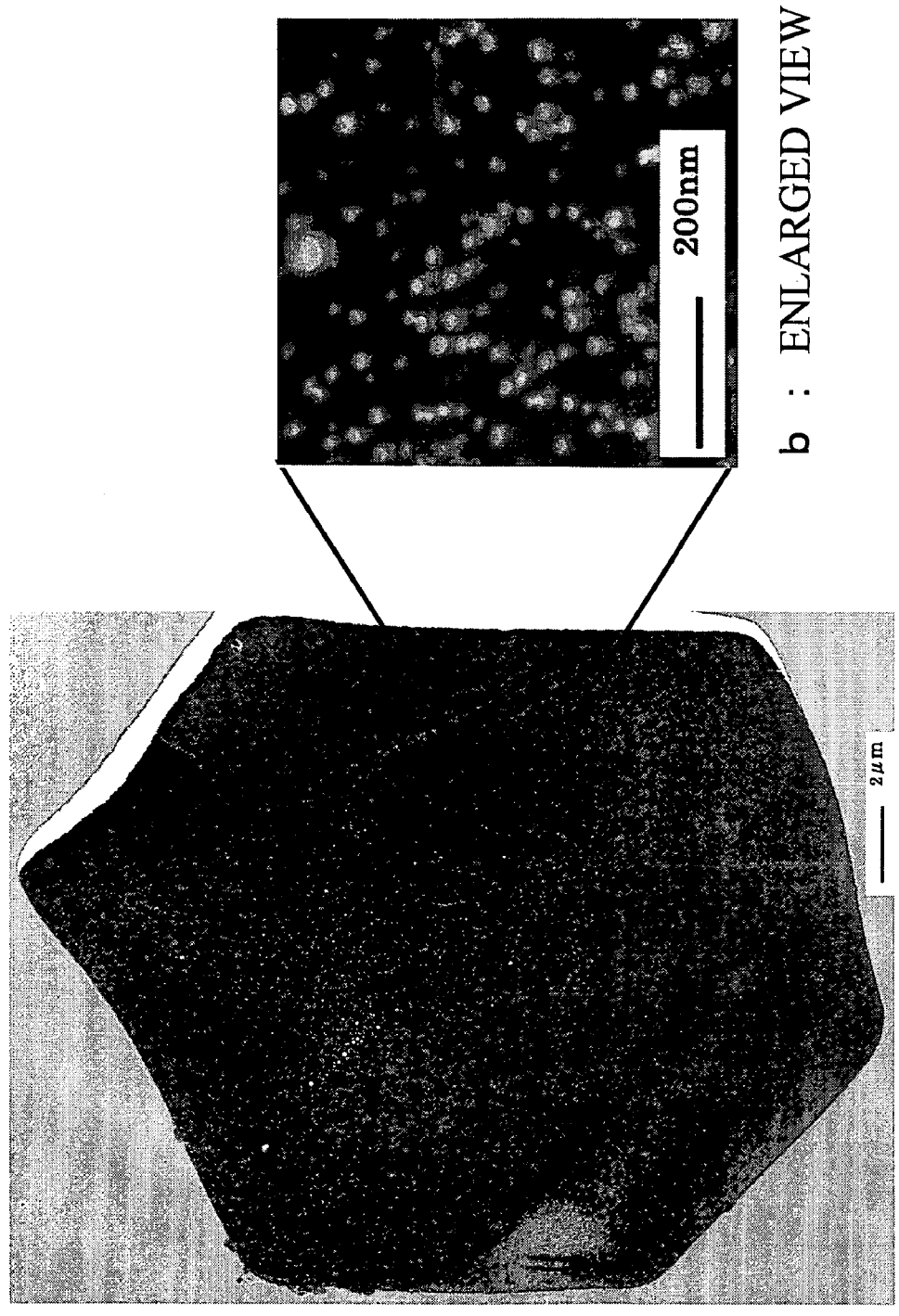
FIG. 3 is a transmission electron micrograph showing an example of a cross section of a polymer alloy fiber according to after-mentioned Example 1 of the present invention.
Figure 4:
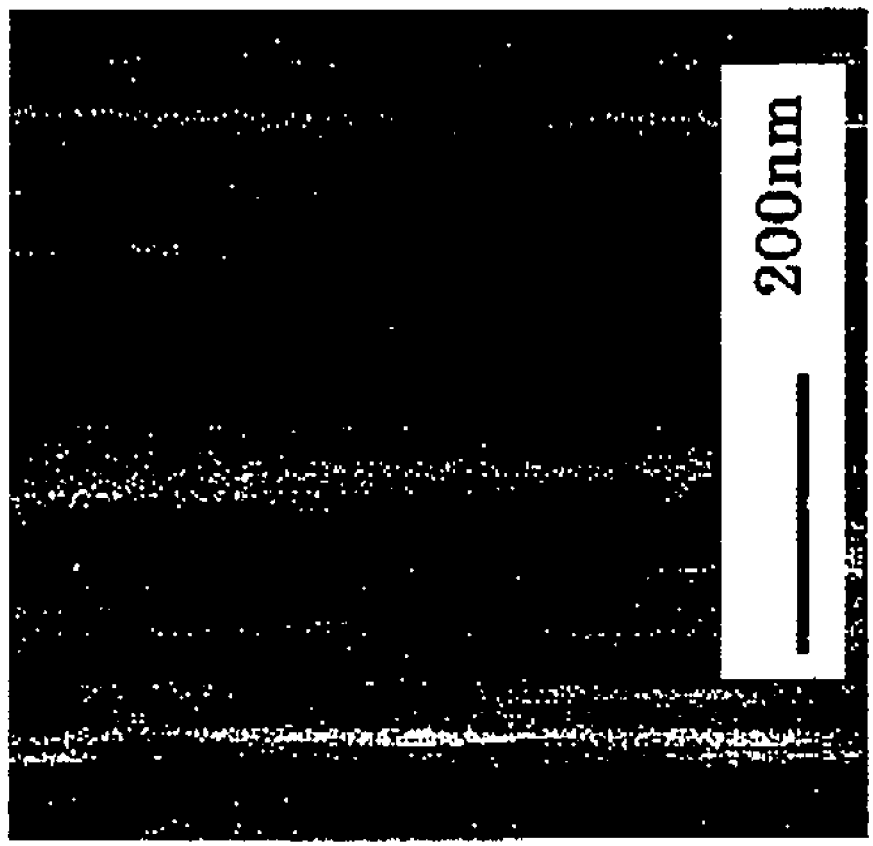
FIG. 4 is a transmission electron micrograph showing an example of a longitudinal section of the polymer alloy fiber according to after-mentioned Example 1 of the present invention.

The area ratio of islands each having a diameter of 200 nm or more to the total islands was 0.1% or less, and the area ratio of islands each having a diameter of 100 nm or more was 0.9%. The "area ratio to the total islands" refers to the area ratio to the total area of the islands parts and serves as an indicator of coarse polymer aggregates. The TEM observation of the longitudinal section of the fiber shows that the islands constitute a lined structure (FIG. 4). The transmission electron micrograph of a cross section of the melt-kneaded polymer alloy chip is shown in FIG. 5, showing that the islands-part polymer is ultrafinely dispersed with a particle diameter of 20 to 30 nm, being equivalent to the diameter of the islands-part polymer at cross section of a fiber (FIG. 3). The polymer was elongated by a factor of about 200 times from discharge from the spinneret through draw false-twisting. Thus, the diameter of the islands-part polymer of the fiber in a cross section should be one-fourteenths or less that in the material polymer alloy. However, the diameter of the islands-part polymer at cross section of a fiber is substantially equal to that in the material chip. This indicates that the islands-part polymer reaggregated between melting of the polymer alloy and discharging from the spinneret. To allow the islands-part polymer to disperse homogeneously with size on the order of nanometers while preventing the reaggregation, the spinning conditions should be essentially chosen appropriately, as in the present example.

The false-twisted polymer alloy yarns with false-twisting directions of S and Z were aligned and knitted into a round braid of 20 G. The round braid was treated with a 3% by weight aqueous sodium hydroxide solution (95° C., liquor ratio of 1:50) for one hour to dissolve off 99% or more of the copolymerized PET from the false-twisted polymer alloy yarn to thereby obtain a fibrous article comprising a nanoporous N6 fiber and having a bulkiness of 63 cm$^3$/g.

The round braid comprising the nanoporous N6 fiber was dyed and was found to have excellent color property without dyeing speck. This article had a ratio of moisture adsorption (ΔMR) of 5.6% and exhibited much higher hygroscopicity than cotton.

The side of the nanoporous N6 fiber sampled from the round braid was observed under a SEM to find that the fiber had a smooth surface without unevenness at a magnification of about 2000 times. The cross section of the nanoporous N6 fiber was observed under a TEM (FIG. 1) to find pores each having a diameter of about 20 to 30 nm. The pores had an average of 25 nm and were substantially free from coarse pores each having a diameter of 50 nm or more.

This fiber had unconnected pores as shown in FIG. 1 and had a strength of 2.0 cN/dtex and an elongation percentage of 25%, showing that the fiber had sufficient mechanical properties as a fibrous article. This exhibited reversible water swelling, and the yarn sampled from the round braid comprising the nanoporous N6 fiber after setting at 180° C. for one minute had a percentage of swelling in a longitudinal direction of the yarn of 7.3%. The physical properties of the nanoporous N6 fiber are shown in Table 1.

Example 2

The N6 and the copolymerized PET were subjected to melt-kneading by the procedure of Example 1, except for blending 95% by weight of N6 and 5% by weight of the copolymerized PET. The kneaded product was subjected to melt spinning and draw false-twisting by the procedure of Example 1, except for changing the discharge rate per one orifice and the number of spinneret orifices, to obtain a 90 dtex, 34-filament crimped polymer alloy yarn. The yarn could be satisfactorily spun without any yarn breaking during continuous spinning for 24 hours.

The resulting highly oriented undrawn yarn had excellent properties including a strength of 2.7 cN/dtex and a U % of 0.8%. The yarn showed good processability without any yarn breaking in the draw false-twisting process. The crimped yarn had a high bulkiness in terms of a CR of 45% and exhibited excellent crimping quality with satisfactory untwisting. The cross section of the resulting crimped polymer alloy yarn was observed under a TEM and was found to have an islands-in-sea structure. The resulting polymer alloy fiber comprises the copolymerized PET homogeneously dispersed with size on the order of nanometers. The islands had an average diameter of 20 nm. The area ratio of islands each having a diameter of 200 nm or more to the total islands was 0.1% or less, and the area ratio of islands each having a diameter of 100 nm or more was 1% or less. The observation of a cross section of the fiber shows that the islands-part polymer has a lined structure. The physical properties of the false-twisted yarn are shown in Table 2.

The crimped polymer alloy yarn was subjected to soft-twisting of 300 T/m, and a plain woven fabric was formed by using the soft-twisted yarn as a warp and a weft, from which 99% or more of the copolymerized PET was removed by an alkali treatment by the procedure of Example 1, to thereby obtain a woven fabric comprising a nanoporous N6 fiber.

The woven fabric comprising the nanoporous N6 fiber was dyed and was found to have excellent color property without dyeing speck. The cross section of the nanoporous N6 fiber sampled from the woven fabric was observed under a TEM, to find that holes from which the islands-part polymer was removed constitute unconnected pores having an average diameter of 25 nm without coarse pores having a diameter of 50 nm or more. The nanoporous N6 fiber has excellent physical properties as shown in Table 1.

Example 3

The N6 and the copolymerized PET were subjected to melt-kneading by the procedure of Example 1, except for blending 90% by weight of N6 and 10% by weight of the copolymerized PET. The kneaded product was subjected to melt spinning and draw false-twisting by the procedure of Example 1, except for changing the discharge rate per one orifice and the number of spinneret orifices, to obtain a 90 dtex, 34-filament crimped polymer alloy yarn. The yarn could be satisfactorily spun without any yarn breaking during continuous spinning for 24 hours. The resulting highly oriented undrawn yarn showed excellent properties including a strength of 2.7 cN/dtex and a U % of 0.8%. The yarn showed good processability without any yarn breaking in the draw false-twisting process. The crimped yarn had a high bulkiness in terms of a CR of 40% and exhibited excellent crimping quality with satisfactory untwisting.

The cross section of the crimped polymer alloy yarn was observed under a TEM and was found to have an islands-in-sea structure. The islands had an average diameter of 25 nm, showing that the polymer alloy fiber comprises the copolymerized PET homogeneously dispersed with size on the order of nanometers. The area ratio of islands each having a diameter of 200 nm or more to the total islands was 0.1% or less, and the area ratio of islands each having a diameter of 100 nm or more was 1% or less. The observation of a cross section of the fiber shows that the islands-part polymer has a lined structure. The physical properties of the false-twisted yarn are shown in Table 2.

The crimped polymer alloy yarn was subjected to soft-twisting of 300 T/m, and a plain woven fabric was formed by using the soft-twisted yarn as a warp and a weft, from which 99% or more of the copolymerized PET was removed by an alkali treatment by the procedure of Example 1, to thereby obtain a woven fabric comprising a nanoporous N6 fiber. The woven fabric comprising the nanoporous N6 fiber was dyed and was found to have excellent color property without dyeing speck. The cross section of the nanoporous N6 fiber sampled from the woven fabric was observed under a TEM, to find that holes from which the islands-part polymer was dissolved off constitute unconnected pores having a diameter of 20 nm or less without coarse pores having a diameter of 50 nm or more. The nanoporous N6 fiber has excellent physical properties as shown in Table 1

Example 4

The N6 and the copolymerized PET were subjected to melt-kneading by the procedure of Example 1, except for blending 50% by weight of N6 and 50% by weight of the copolymerized PET. The kneaded product was subjected to melt spinning and draw false-twisting by the procedure of Example 1, except for changing the discharge rate per one orifice and the number of spinneret orifices, to obtain a 150 dtex, 34-filament crimped polymer alloy yarn. The yarn could be satisfactorily spun without any yarn breaking during continuous spinning for 24 hours.

Figure 6:
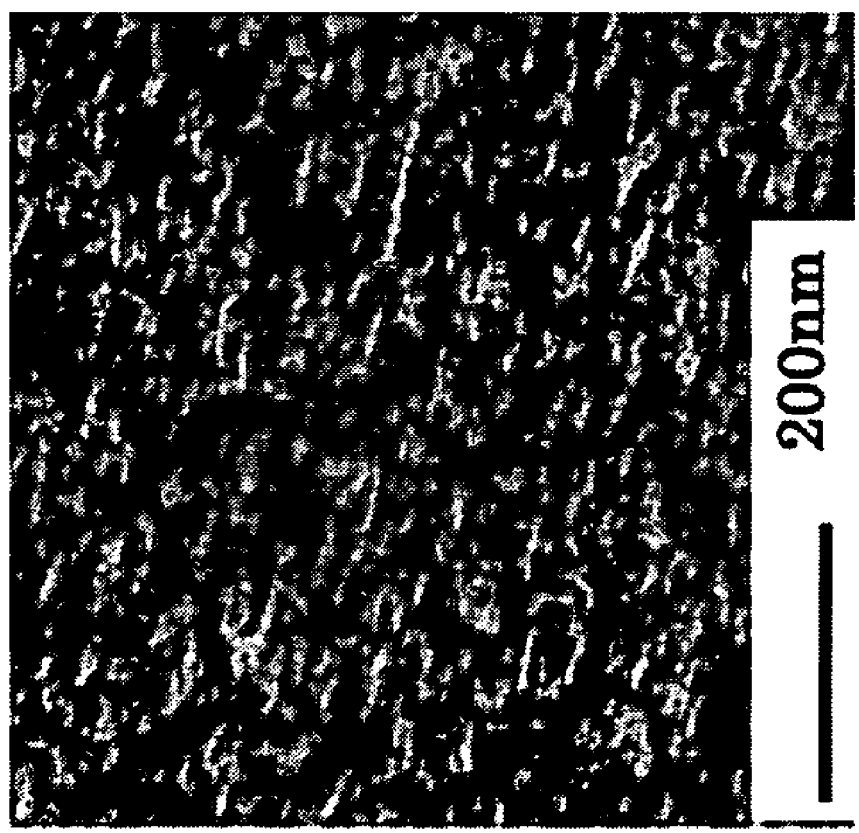
FIG. 6 is a transmission electron micrograph showing an example of a cross section of a polymer alloy fiber according to after-mentioned Example 4 of the present invention.

The resulting highly oriented undrawn yarn showed excellent properties of a strength of 2.5 cN/dtex and a U % of 1.0%. The yarn showed good processability without any yarn breaking in the draw false-twisting process. The crimped yarn exhibited excellent crimping quality with satisfactory untwisting. A transmission electron micrograph of a cross section of the crimped polymer alloy yarn is shown in FIG. 6, showing that the copolymerized PET constitutes beaded islands each having a diameter of 10 to 20 nm and is free from coarsely aggregated polymer particles. The area ratio of islands each having a diameter of 200 nm or more to the total islands was 0.1% or less, and the area ratio of islands each having a diameter of 100 nm or more was 1% or less. The observation of a cross section of the fiber shows that the islands-part polymer has a lined structure. The physical properties of the false-twisted yarn are shown in Table 2.

Figure 7:
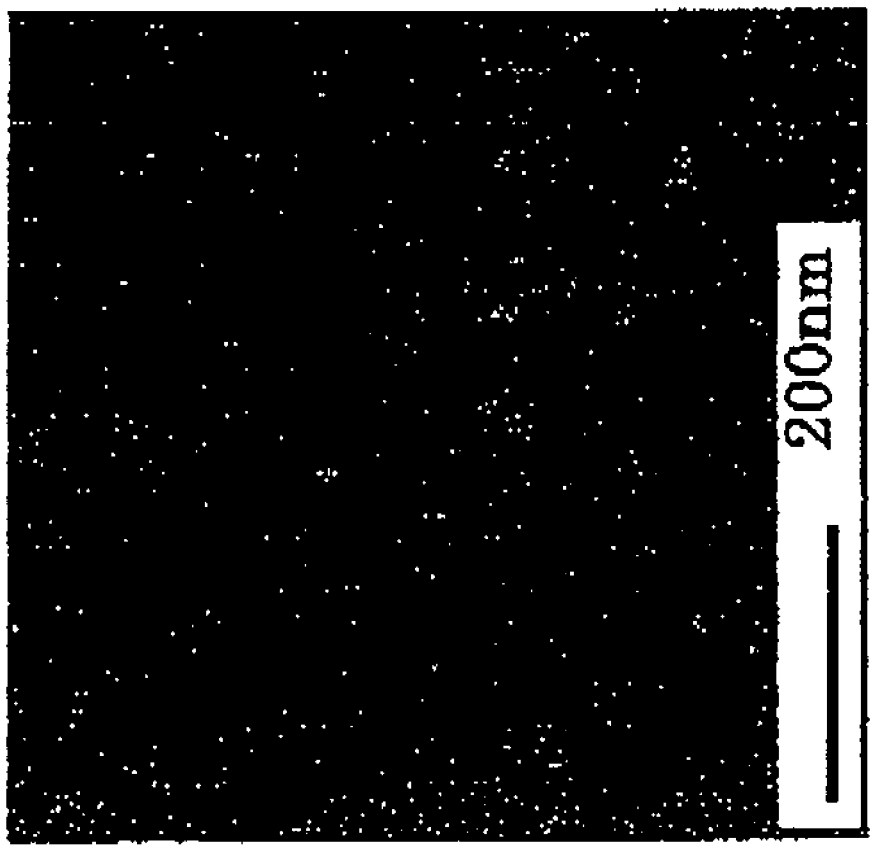
FIG. 7 is a transmission electron micrograph showing an example of a cross section of a nanoporous fiber according to after-mentioned Example 4 of the present invention.

The crimped polymer alloy yarn was subjected to soft-twisting of 300 T/m, and a plain woven fabric was formed by using the soft-twisted yarn as a warp and a weft, from which 99% or more of the copolymerized PET was removed by an alkali treatment by the procedure of Example 1, to thereby obtain a woven fabric comprising a nanoporous N6 fiber. The woven fabric comprising the nanoporous N6 fiber was dyed and was found to have excellent color property without dyeing speck. The cross section of the nanoporous N6 fiber sampled from the woven fabric was observed under a TEM, to find that holes from which the islands-part polymer was dissolved off constitute unconnected pores having an average diameter of 25 nm without coarse pores having a diameter of 50 nm or more (FIG. 7). The nanoporous N6 fiber has excellent physical properties as shown in Table 1.

Example 5

The N6 and the copolymerized PET were subjected to melt kneading, melt spinning and draw false-twisting by the procedure of Example 1, except for setting the ratio in melt viscosity of N6 to the copolymerized PET at 0.9 and the amount of terminal amino groups at $6.5 \times 10^{-3}$ molar equivalent per gram of N6. The N6 in the polymer alloy contained a large amount of terminal amino groups ($6.2 \times 10^{-3}$ molar equivalent per gram). Thus, the fiber showed somewhat lower spinnability than that in Example 1, although it is trivial as showing two yarn breakings during continuous spinning for 24 hours. The resulting highly oriented undrawn yarn exhibited somewhat large yarn unevenness and had a U % of 2%. The highly oriented undrawn yarn had a strength of 2.5 cN/dtex. Untwisting in the draw false-twisting process was somewhat unstable and the resulting yarn showed some not-untwisted portions as compared with Example 1.

The resulting crimped polymer alloy yarns were free from coarsely aggregated polymer particles. The area ratio of islands each having a diameter of 200 nm or more to the total islands was 0.1% or less, and the area ratio of islands each having a diameter of 100 nm or more was 1% or less. The islands-part polymer constituted a lined structure. The crimped yarn had a CR of 32% but exhibited somewhat large yarn unevenness of a U % of 2.2% due to large yarn unevenness during spinning, as compared with Example 1. The physical properties of the false-twisted yarn are shown in Table 2.

The crimped polymer alloy yarn was subjected to circular knitting by the procedure of Example 1, and 99% or more of the copolymerized PET was removed from the resulting round braid by an alkali treatment, to thereby obtain a round braid comprising a nanoporous N6 fiber having unconnected pores each having a diameter of 100 nm or less. The round braid comprising the nanoporous N6 fiber was dyed and was found to have excellent color property but exhibit some dyeing speck. The nanoporous N6 fiber had excellent physical properties as shown in Table 2.

Example 6

Figure 30:
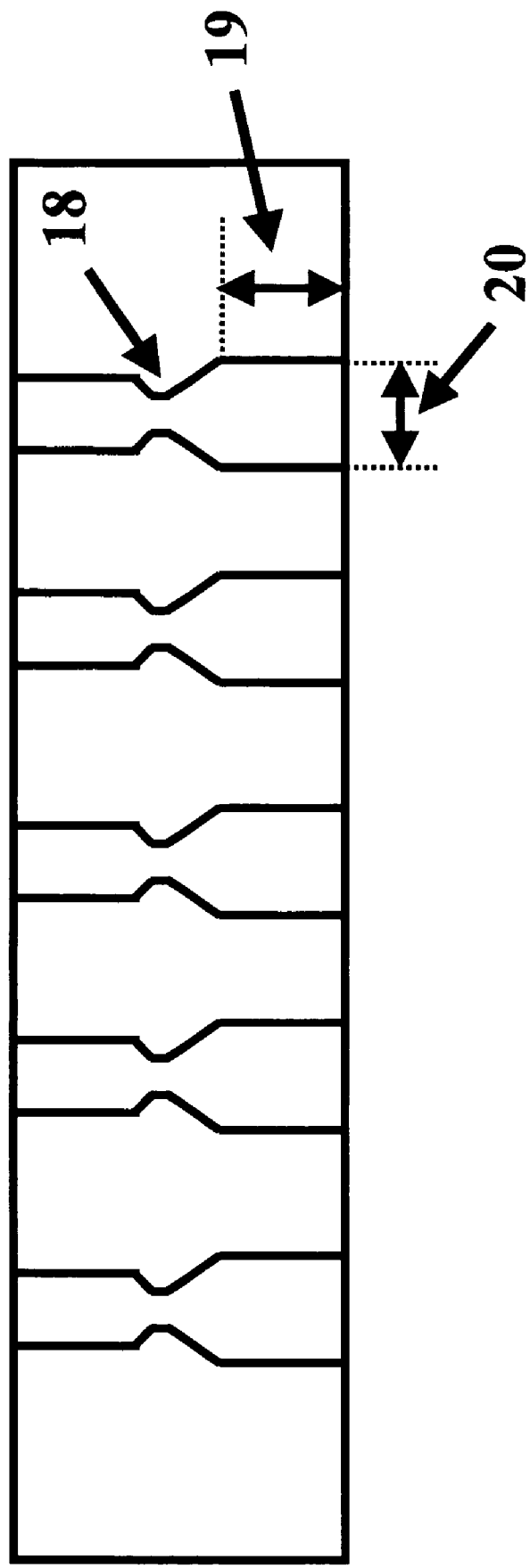
FIG. 30 is a diagram showing an example of a spinneret.

The polymer alloy prepared according to Example 1 was subjected to melt spinning in the same way as Example 1. A spinneret used in this procedure contained a weighing section 18 having a diameter of 0.2 mm on the top of a discharge orifice as shown in FIG. 30 and had an orifice diameter 20 of 0.5 mm and an orifice length 19 of 1.25 mm. The discharge rate per one orifice was set at 2.1 g per minute, and the linear velocity of the discharged polymer alloy in the spinneret was set at 10 meters per minute. The yarn could be satisfactorily spun without any yarn breaking during continuous spinning for 24 hours. The yarn did not cause deformation of the wound package due to swelling with time, which constitutes a problem in regular nylon yarns, and showed good handleability. This was then subjected to draw false-twisting by the procedure of Example 1, except for setting the draw ratio at 1.3.

The resulting 50 dtex, 12-filament false-twisted yarn exhibited excellent physical properties including a strength of 3.5 cN/dtex, an elongation percentage of 29%, a thermal shrinkage of 8% and a CR of 38% (Table 2). The cross section of the crimped polymer alloy yarn was observed under a TEM and was found that the yarn had an islands-in-sea structure comprising N6 as a sea (dark region) and the copolymerized PET as islands (bright regions). The islands had an average diameter of 25 nm, showing that the polymer alloy fiber comprises the copolymerized PET homogeneously dispersed with size on the order of nanometers. The area ratio of islands each having a diameter of 200 nm or more to the total islands was 1% or less. The TEM observation of the longitudinal section of the fiber shows that the islands has a lined structure. The physical properties of the false-twisted yarn are shown in Table 2.

A round braid was prepared by using the crimped polymer alloy yarn as an S-twist/Z-twist two ply yarn and was immersed in a 3% aqueous sodium hydroxide solution (90° C., liquor ratio of 1:100) for one hour to thereby remove 99% or more of the copolymerized PET in the polymer alloy fiber upon hydrolysis. After washing with water and drying, a round braid comprising a nanoporous N6 fiber was obtained.

The cross section of the nanoporous N6 fiber was observed under a TEM to find that the fiber contained no coarse pores each having a diameter of 50 nm or more and had an average diameter of pores of 25 nm. In the TEM observation, the dark region corresponds to the N6 polymer, and the bright regions correspond to the pores, showing that the pores are unconnected pores.

The round braid comprising the nanoporous N6 fiber was dyed and was found to have excellent color property. In addition, this article had a ratio of moisture adsorption ($\Delta$MR) of 5.6% and showed much higher hygroscopicity than cotton. The article had a strength of 2.6 cN/dtex and an elongation percentage of 30%, showing to have sufficient mechanical properties as a fibrous article. This exhibited reversible water swelling, and the yarn sampled from the round braid comprising the nanoporous N6 fiber after setting at 180° C. for one minute had a percentage of swelling in a longitudinal direction of the yarn of 7%. The physical properties of the nanoporous N6 fiber are shown in Table 1.

Example 7

Materials were subjected to melt kneading, melt spinning and draw false-twisting by the procedure of Example 6, except for using a N6 having a melt viscosity of 1260 poises (280° C. at a rate of shear of 2432 sec$^{-1}$) and containing terminal amino groups in an amount of $5.0 \times 10^{-5}$ molar equivalent per gram of N6, setting the ratio in melt viscosity at 0.9 and changing the discharge rate per one orifice and the number of spinneret orifices. The resulting 105 dtex, 96-filament crimped polymer alloy yarn had a strength of 3.8 cN/dtex, an elongation percentage of 29%, a thermal shrinkage of 8% and a CR of 35% (Table 2). The cross section of the fiber of the crimped polymer alloy yarn was observed under a TEM, to find that the yarn was free from coarsely aggregated polymer particles, that the area ratio of islands each having a diameter of 200 nm or more to the total islands was 0.1% or less, and that the area ratio of islands each having a diameter of 100 nm or more was 1% or less. The TEM observation of the longitudinal section of the fiber shows that the islands has a lined structure.

A round braid was prepared by using the crimped polymer alloy yarn as an S-twist/Z-twist two ply yarn by the procedure of Example 1, from which 99% or more of the copolymerized PET was removed by an alkali treatment, to thereby obtain a round braid comprising a nanoporous N6 fiber.

The cross section of the nanoporous N6 fiber was observed under a TEM, to find that pores from which the islands-part polymer had been removed had an average diameter of 20 nm and were free from coarse pores each having a diameter of 50 nm or more. The pores were unconnected pores.

The round braid comprising the nanoporous N6 fiber was dyed and was found to have excellent color property. The nanoporous N6 fiber has excellent physical properties as shown in Table 1.

TABLE 1

|  | Average pore diameter (nm) | Area ratio 1 (%) | Area ratio 2 (%) | Strength (cN/dtex) | ΔMR (%) | Color property | Adsorbing rate (%) | Percentage of water retention (%) |
|---|---|---|---|---|---|---|---|---|
| Example 1 | 25 | 0 | 0 | 2.0 | 5.6 | Excellent | 60 | 85 |
| Example 2 | 25 | 0 | 0 | 3.8 | 3.6 | Excellent | 45 | 67 |
| Example 3 | 25 | 0 | 0 | 3.0 | 4.2 | Excellent | 52 | 76 |
| Example 4 | 25 | 0 | 0 | 2.0 | 6.0 | Excellent | 62 | 90 |
| Example 5 | 20 | 0 | 0 | 1.8 | 5.0 | Good | 55 | 80 |
| Example 6 | 25 | 0 | 0 | 2.6 | 5.6 | Excellent | 60 | 82 |
| Example 7 | 20 | 0 | 0 | 3.0 | 5.5 | Excellent | 60 | 82 |

Average pore diameter: Average pore diameter estimated based on TEM observation
Area ratio 1: Area ratio of pores having a diameter of 200 nm or more to the total fiber
Area ratio 2: Area ratio of pores having a diameter of 50 nm or more to the total fiber
Adsorbing rate: Ammonia adsorbing rate

TABLE 2

|  | N6 polymer | | | Average diameter of islands (nm) | Spinnability | Strength (cN/dtex) | CR (%) | U % (%) | Thermal shrinkage (%) |
|---|---|---|---|---|---|---|---|---|---|
|  | $NH_2$ concentration (mol/g) | wt % | Area ratio (%) | | | | | | |
| Example 1 | $5.0 \times 10^{-5}$ | 80 | 0.1 or less | 25 | Good | 2.7 | 38 | 1.0 | 8 |
| Example 2 | $5.0 \times 10^{-5}$ | 95 | 0.1 or less | 20 | Good | 4.0 | 45 | 0.8 | 12 |
| Example 3 | $5.0 \times 10^{-5}$ | 90 | 0.1 or less | 25 | Good | 3.5 | 40 | 0.9 | 11 |
| Example 4 | $5.0 \times 10^{-5}$ | 50 | 0.1 or less | 18 | Good | 2.5 | 35 | 1.2 | 8 |
| Example 5 | $6.5 \times 10^{-5}$ | 80 | 0.1 or less | 20 | Fair | 2.5 | 32 | 2.2 | 9 |
| Example 6 | $5.0 \times 10^{-5}$ | 80 | 0.1 or less | 25 | Good | 3.5 | 38 | 1.5 | 8 |
| Example 7 | $5.0 \times 10^{-5}$ | 80 | 0.1 or less | 20 | Good | 3.8 | 35 | 1.5 | 8 |

Area ratio: Area ratio of pores having a diameter of 200 nm or more to the total islands Example 8

Figure 31:
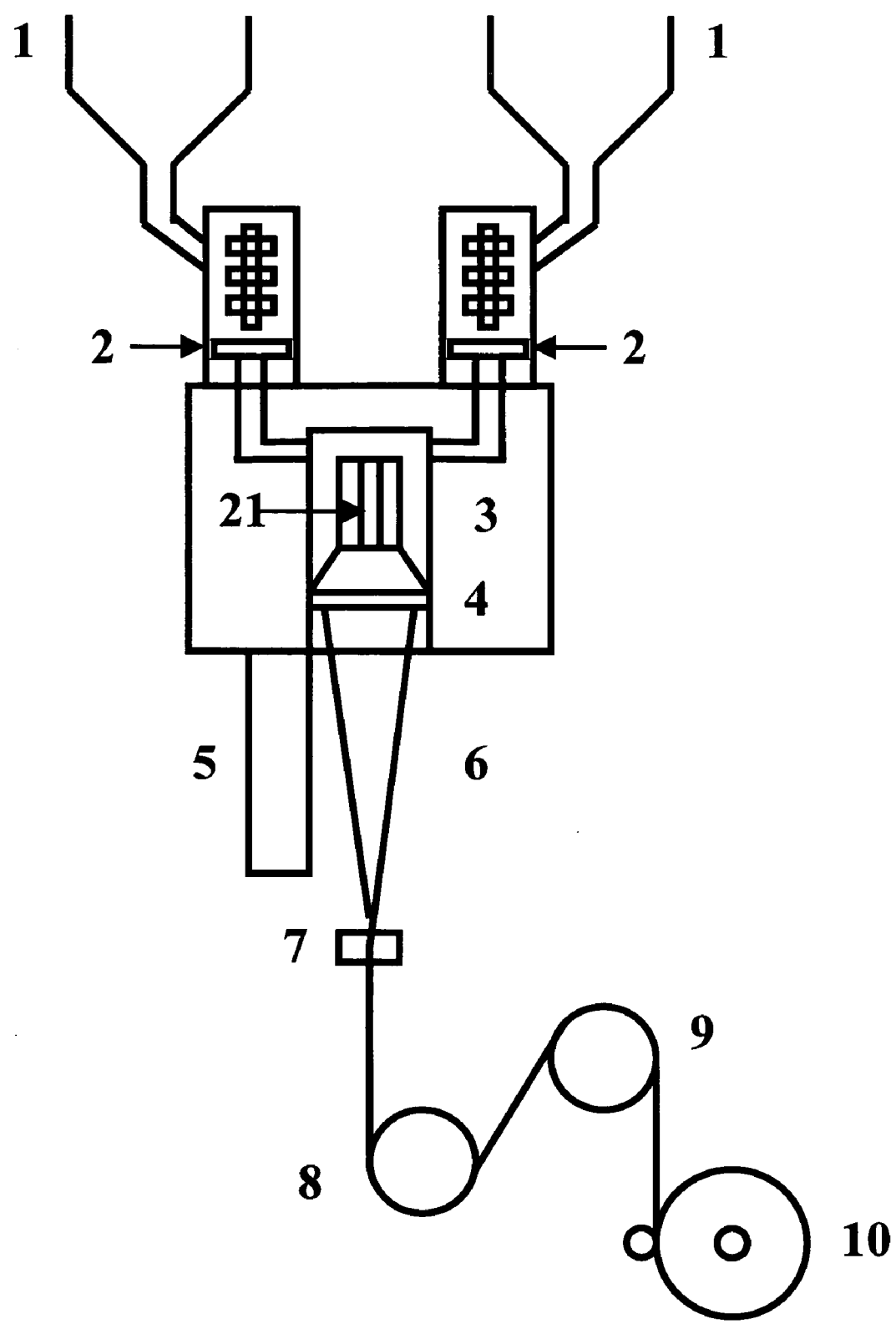
FIG. 31 is a diagram showing an example of a spinning machine.

The N6 and the copolymerized PET used in Example 1 were melted at 270° C. and 290° C., respectively using an apparatus shown in FIG. 31 and were divided and mixed at $104 \times 10^4$ splits by a static mixer 21 ("Hi-Mixer", available from Toray Engineering Co., Ltd., 10 steps) arranged in a pack 3. The mixture was filtrated through a metallic non-woven fabric filter having an absolute filtration diameter of 20 μm and was discharged from spinneret orifices each having a diameter of 0.35 mm at a spinning temperature of 280° C. and a distance from the spinneret 4 to the top of the cooling equipment 5 of 7 cm. The resulting article was drawn at a spinning rate of 900 meters per minute and was wound via a second take-up roller 9. The fiber showed good spinnability without any yarn breaking during continuous spinning for 24 hours. This article was then subjected to draw thermal treatment using a device shown in FIG. 32 at a draw ratio of 3.2, a temperature of a first hot roller 24 of 70° C. and a temperature of a second hot roller 25 of 130° C. The fiber showed good drawability without any yarn breaking during the draw thermal treatment.

Figure 9:
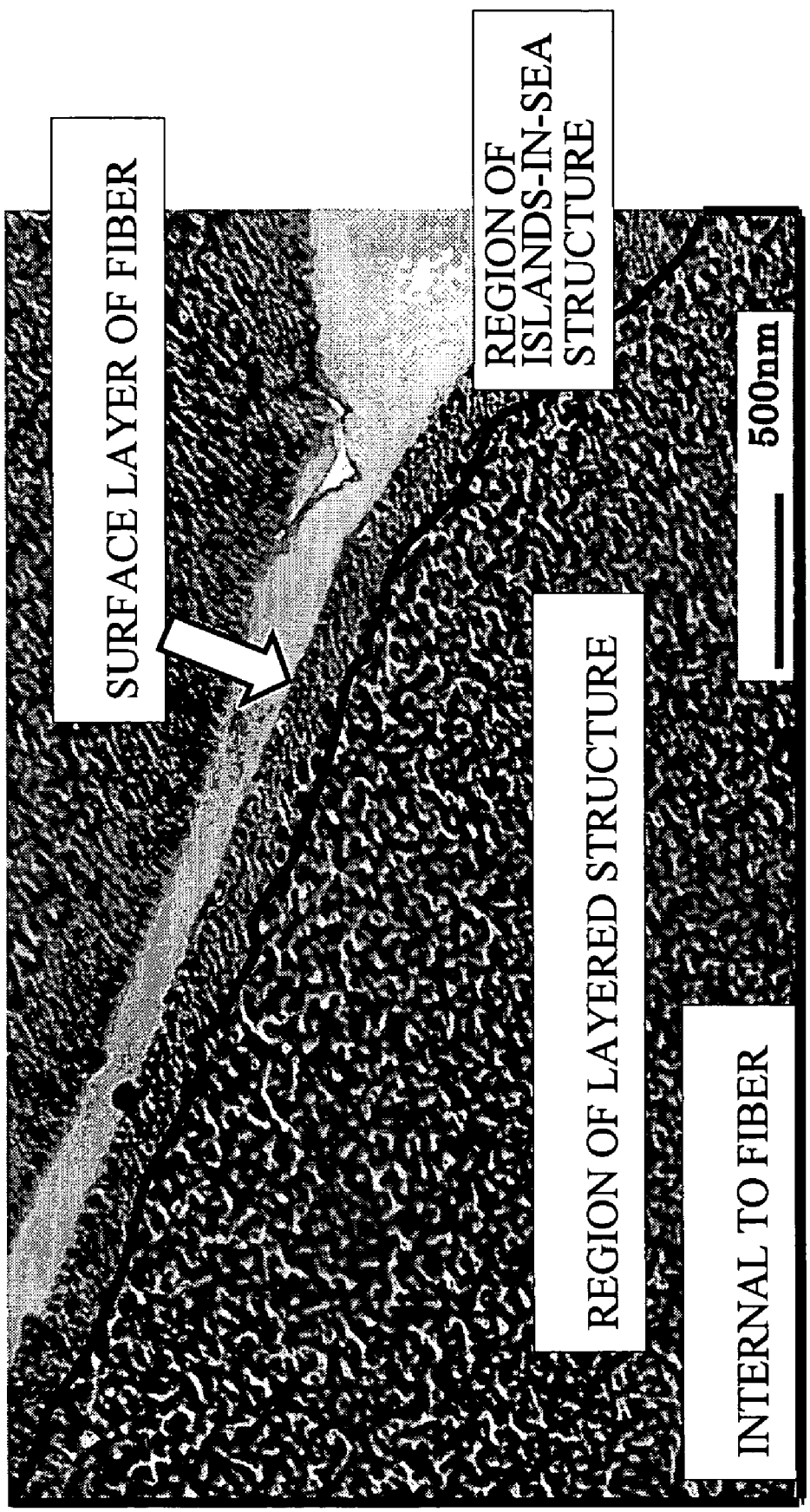
FIG. 9 is a transmission electron micrograph showing an example of a cross section of the polymer alloy fiber according to after-mentioned Example 8 of the present invention.
Figure 10:
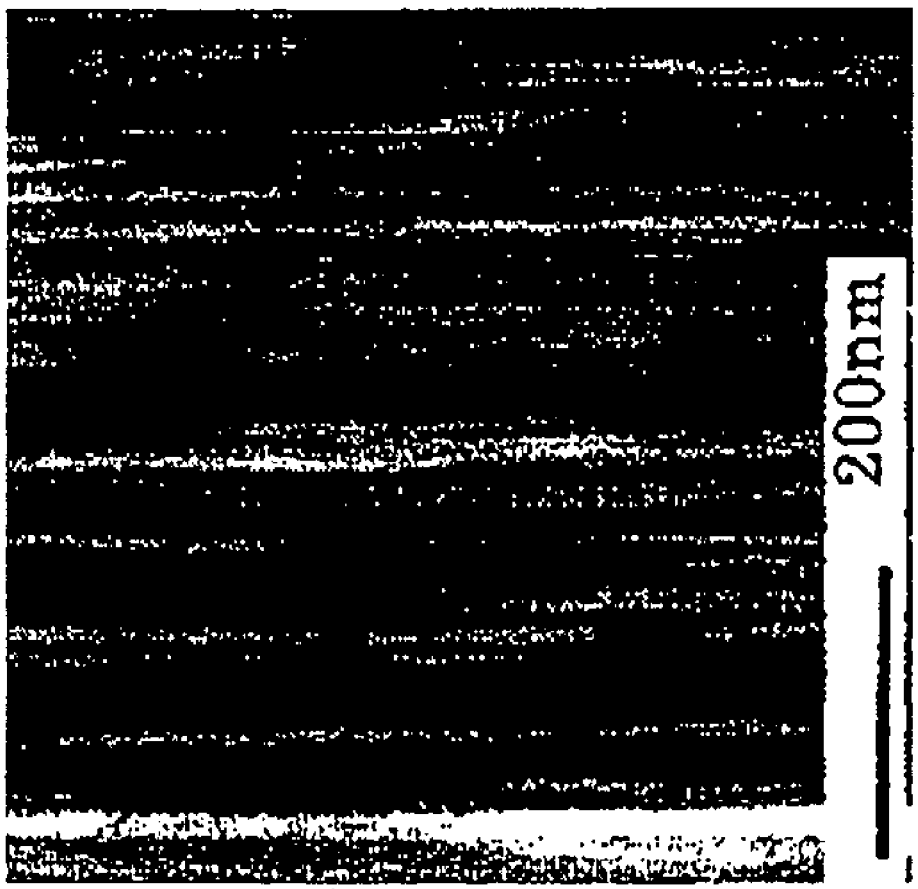
FIG. 10 is a transmission electron micrograph showing an example of a longitudinal section of the polymer alloy fiber according to after-mentioned Example 8 of the present invention.

Thus, a 56 dtex, 12-filament polymer alloy fiber having a U % of 1.5% was prepared. The cross section of the fiber was observed under a TEM to find that an N6 portion dyed thick and a PET portion dyed thin by metal staining constituted a special layered structure, and the PET layer had a thickness of about 20 nm (FIG. 8). In a portion about 150 nm deep from the fiber surface layer, the special layered structure broken and was converted into an islands-in-sea structure. However, the area ratio of the special layered structure to the total cross section of the fiber was 98%, showing that the special layered structure occupied almost all of the fiber section (FIG. 9). The longitudinal section of the polymer alloy fiber was observed under a TEM to find that layers extended as lines (FIG. 10). The physical properties of the polymer alloy fiber are shown in Table 4.

The polymer alloy fiber was formed into a round braid with good processability without any trouble in the knitting process. The round braid was immersed in a 3% aqueous sodium hydroxide solution at 95° C. for one hour, to completely remove the PET from the polymer alloy fiber, to thereby obtain a round braid comprising a nanoporous N6 fiber.

The round braid showed hygroscopicity in terms of ΔMR of 5.7%, much higher than that of cotton.

Figure 11:
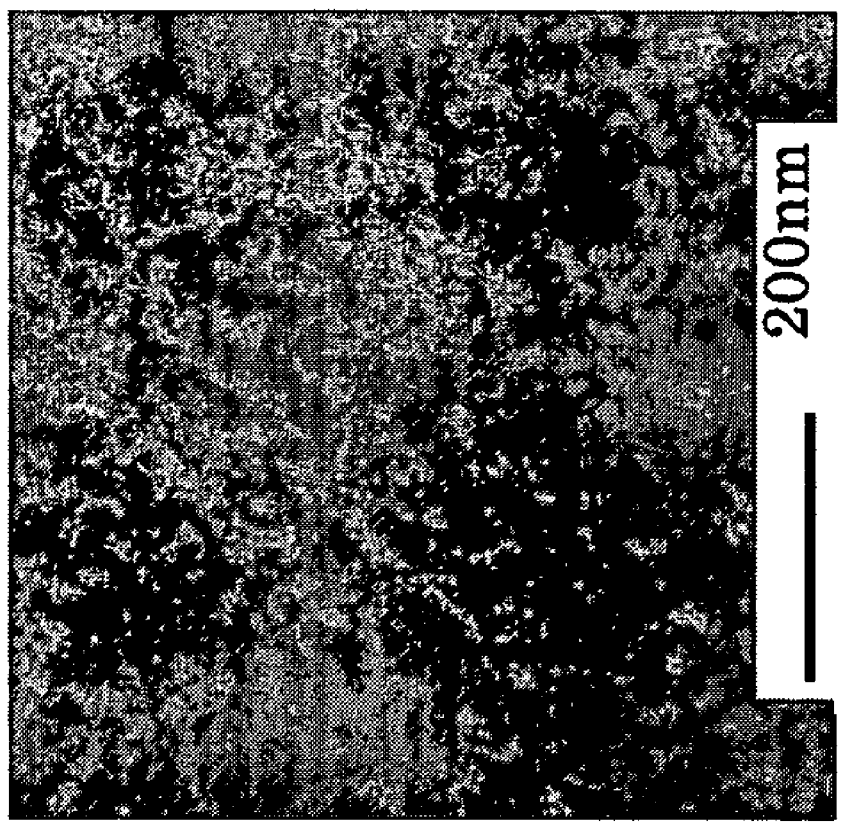
FIG. 11 is a transmission electron micrograph showing an example of a cross section of a nanoporous fiber according to after-mentioned Example 8 of the present invention.
Figure 12:
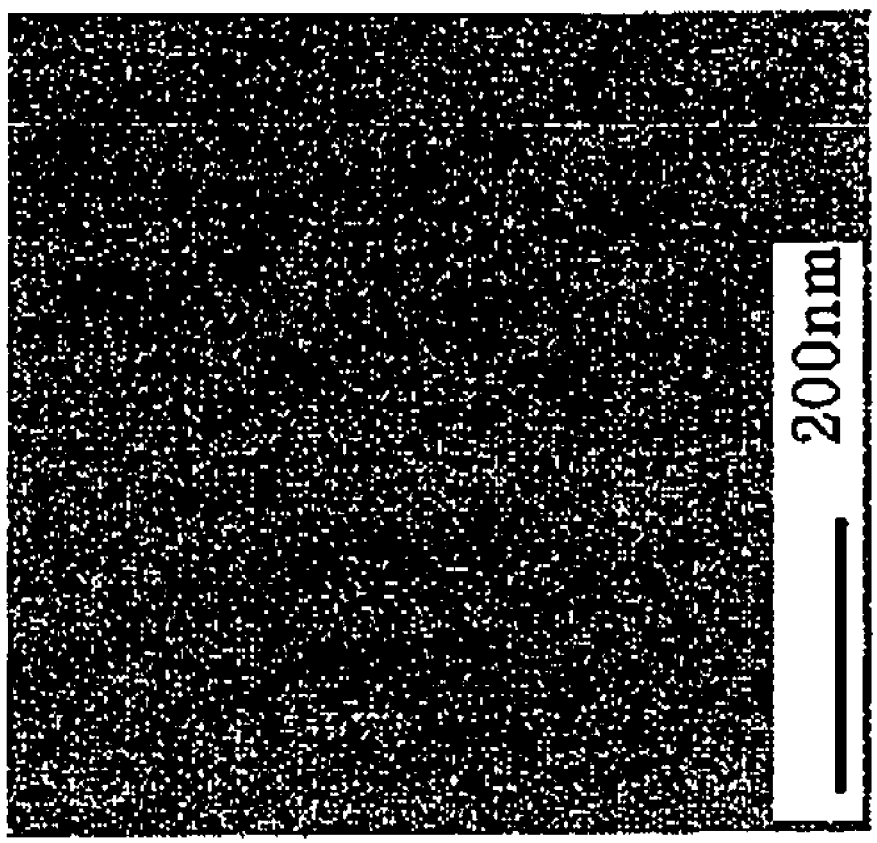
FIG. 12 is a transmission electron micrograph showing an example of a longitudinal section of the nanoporous fiber according to after-mentioned Example 8 of the present invention.

The cross section of the nanoporous fiber was observed under a TEM (FIG. 11) to find that the nanoporous fiber had a finer pattern of dark region and bright regions than the original polymer alloy fiber upon metal staining. The dark region corresponds to a portion with high density of N6, and the bright regions correspond to portions with a low density of N6. The bright regions are considered to correspond to pores. The pores have an average diameter of 10 to 20 nm. These results show that the fiber was free from coarse pores each having a diameter of 50 nm or more. FIG. 11 does not clearly show whether the pores are unconnected pores or connected pores, but the pores are determined as unconnected pores, because the low density portions are arrayed in lines in the observation of a longitudinal section (FIG. 12).

The round braid prepared from the nanoporous N6 fiber was dyed and was found to have excellent color property. The nanoporous N6 fiber had excellent physical properties as shown in Table 3.

Example 9

The N6 and the copolymerized PET were subjected to melt spinning by the procedure of Example 8, except for blending 50% by weight of N6 and 50% by weight of the copolymerized PET. The fiber showed good spinnability without any yarn breaking during continuous spinning for 24 hours. This article was subjected to draw thermal treatment by the procedure of Example 8 and showed good drawability without any yarn breaking.

Figure 13:
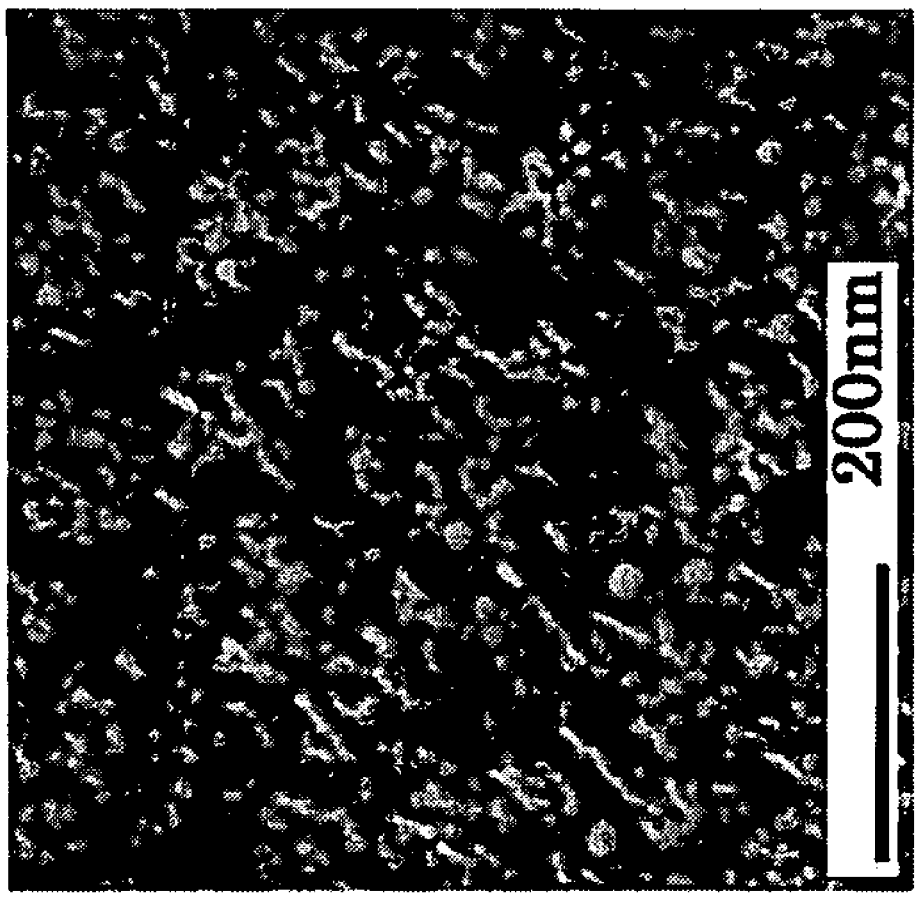
FIG. 13 is a transmission electron micrograph showing an example of a cross section of a polymer alloy fiber according to after-mentioned Example 9 of the present invention.

The cross section of the polymer alloy fiber was observed under a TEM, and the result is shown in FIG. 13. The copolymerized PET constituted beaded islands comprising connected fine islands each having a diameter of about 10 to 20 nm and was free from coarsely aggregated polymer particles. The area ratio of islands each having a diameter of 200 nm or more to the total islands was 0.1% or less, and the area ratio of islands each having a diameter of 100 nm or more was 1% or less. The TEM observation of the longitudinal section of the fiber shows that the islands has a lined structure. The yarn had excellent physical properties as shown in Table 4.

The polymer alloy fiber was subjected to circular knitting by the procedure of Example 8, from which 99% or more of the copolymerized PET was removed by an alkali treatment, to thereby obtain a round braid comprising a nanoporous N6 fiber.

Figure 14:
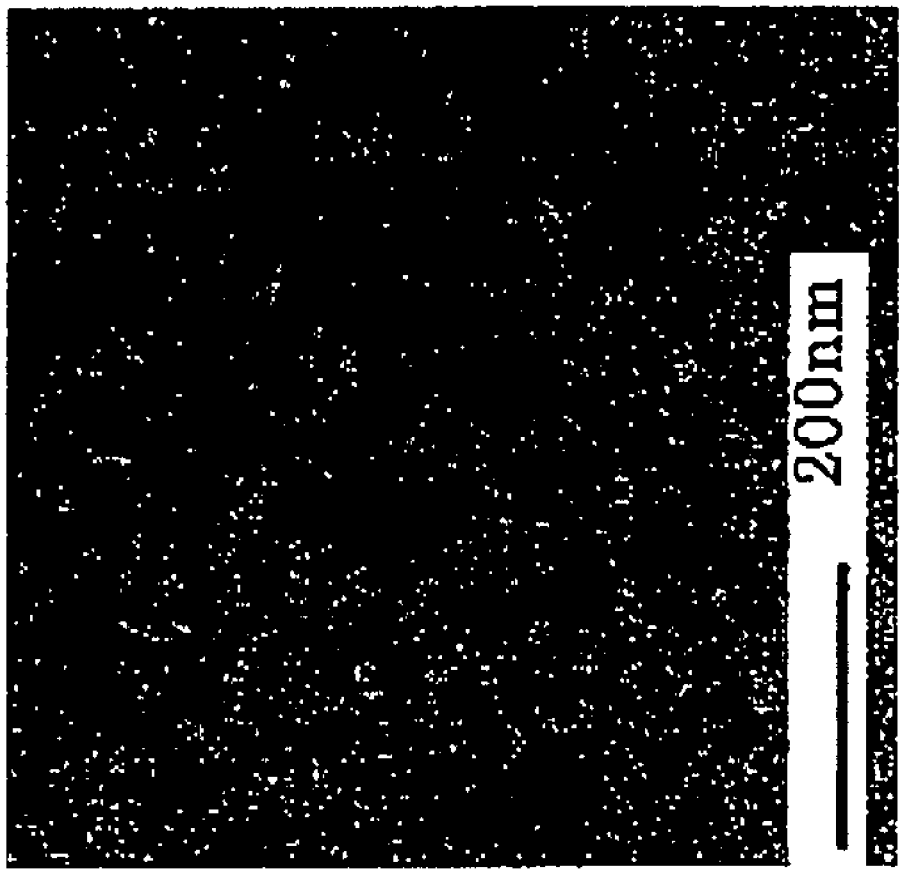
FIG. 14 is a transmission electron micrograph showing an example of a cross section of a nanoporous fiber according to after-mentioned Example 9 of the present invention.
Figure 15:
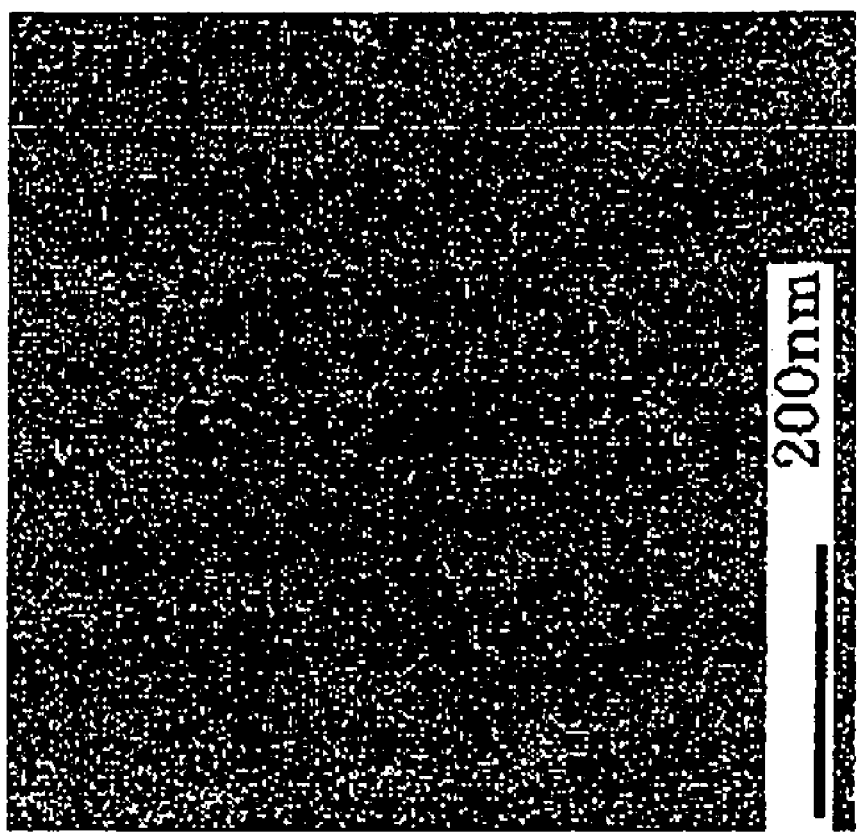
FIG. 15 is a transmission electron micrograph showing an example of a longitudinal section of the nanoporous fiber according to after-mentioned Example 9 of the present invention.

The cross section of the nanoporous N6 fiber observed under a TEM is shown in FIG. 14, showing a fine thick-thin pattern (dark and light pattern) of about 10 to 20 nm and pores each having a diameter of 20 nm or less. The average diameter of pores is estimated from this result as being 10 to 20 nm. The observation of the longitudinal section of the fiber (FIG. 15) shows unclear lines, indicating that the pores are connected with each other to form connected pores. Thus, nanoporous fibers having connected pores can be obtained only by employing the specific combination of polymers, specific kneading procedure and specific blending ratio.

The round braid comprising the nanoporous N6 fiber was dyed and was found to have excellent color property. The nanoporous N6 fiber had excellent physical properties as shown in Table 3.

Example 10

Figure 32:
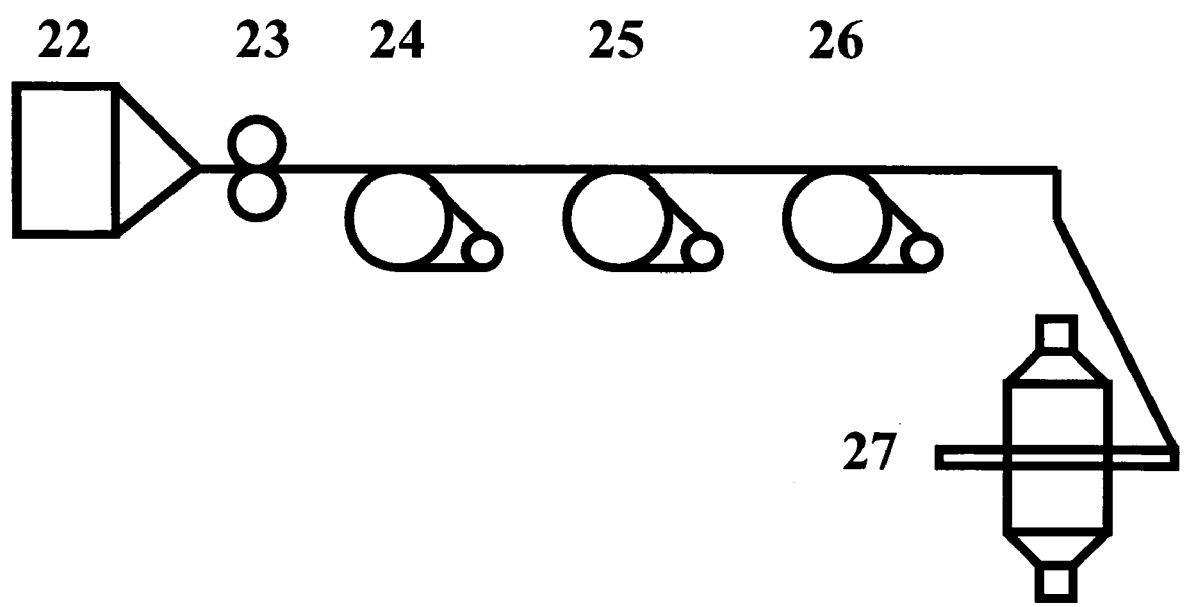
FIG. 32 is a diagram showing an example of a drawing machine.

The polymer alloy prepared according to Example 1 was subjected to melt spinning by the procedure of Example 1, except for changing the discharge rate and the number of spinneret orifices, and setting the spinning rate at 900 meters per minute. The residence time from the melting section 2 to discharge was 12 minutes. The yarn could be satisfactorily spun without any yarn breaking during continuous spinning for 24 hours. The yarn did not cause deformation of the wound package due to swelling with time, which constitutes a problem in regular nylon yarns, and showed good handleability. This article was subjected to draw thermal treatment by the procedure of Example 8, except for setting the draw ratio at 3.2, the temperature of the first hot roller 24 at 70° C. and the temperature of the second hot roller 25 at 130° C. (FIG. 32).

The resulting 70 dtex, 34-filament polymer alloy fiber had excellent properties including a strength of 3.7 cN/dtex, an elongation percentage of 47%, a U % of 1.2% and a thermal shrinkage of 11%.

Figure 16:
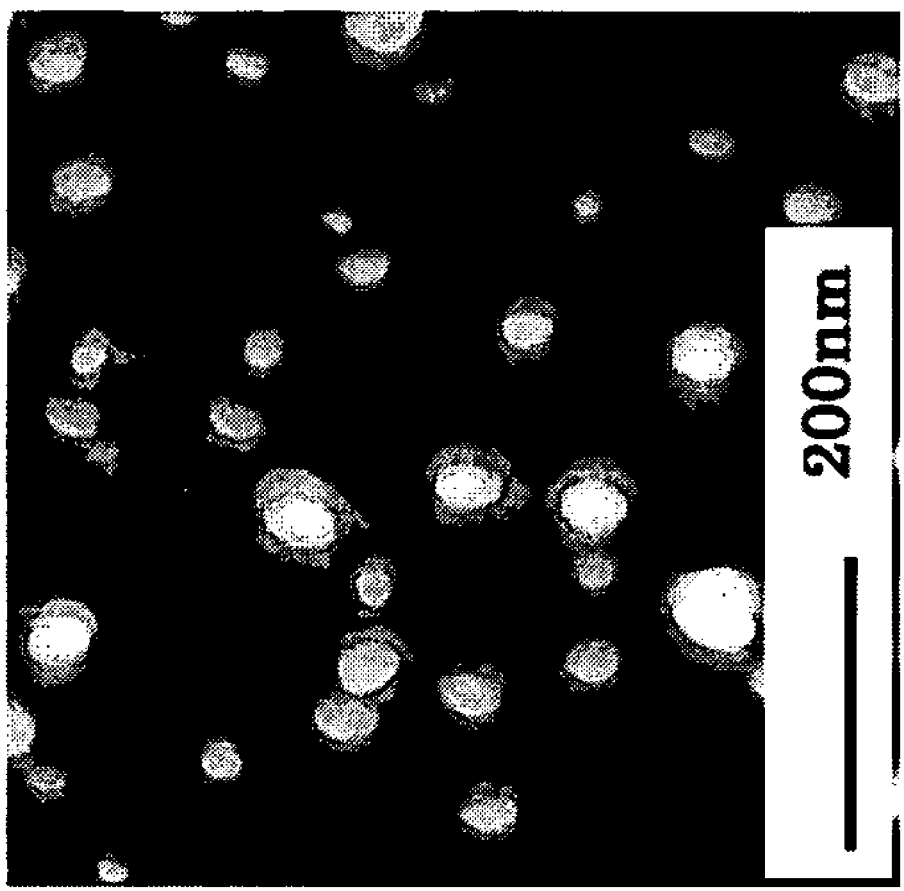
FIG. 16 is a transmission electron micrograph showing an example of a cross section of a polymer alloy fiber according to after-mentioned Example 10 of the present invention.
Figure 17:
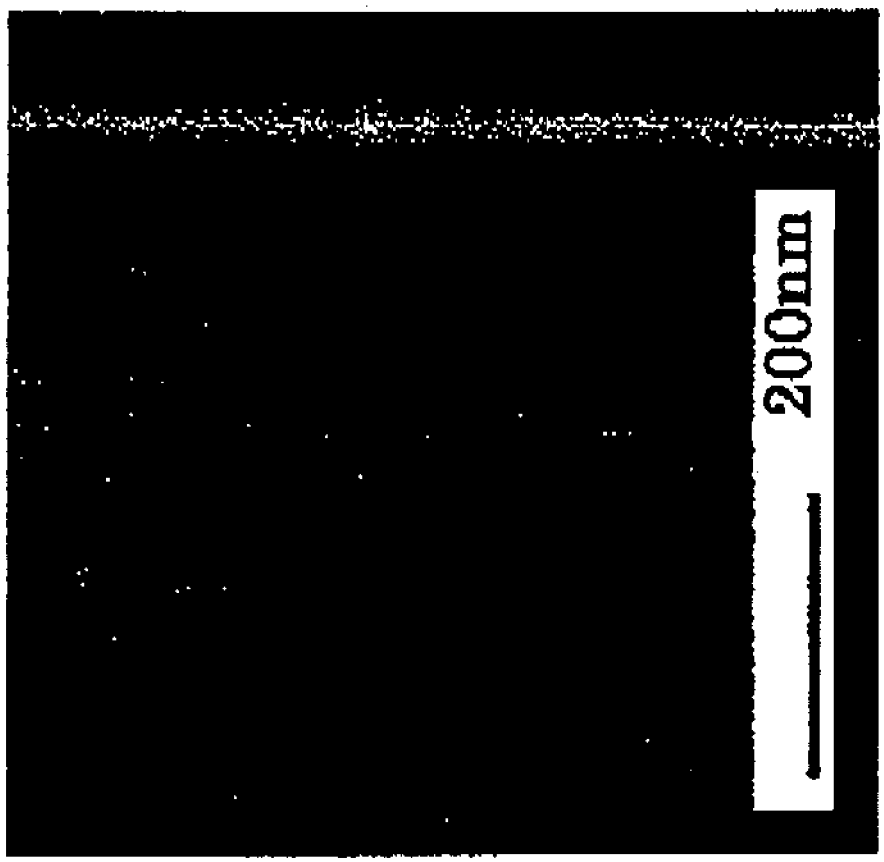
FIG. 17 is a transmission electron micrograph showing an example of a longitudinal section of the polymer alloy fiber according to after-mentioned Example 10 of the present invention.

The cross section of the polymer alloy fiber was observed under a TEM to find that the fiber had an islands-in-sea structure comprising N6 as a sea (dark region) and the copolymerized PET as islands (bright region) (FIG. 16). The islands had an average diameter of 38 nm. These results show that the resulting polymer alloy fiber comprises the copolymerized PET ultrafinely dispersed. The area ratio of islands each having a diameter of 200 nm or more to the total islands was 1.2%. The TEM observation of the longitudinal section of the fiber shows that the islands has a lined structure (FIG. 17). The physical properties of the polymer alloy fiber are shown in Table 4.

A round braid was prepared by using the polymer alloy fiber and immersed in a 3% aqueous sodium hydroxide solution (90° C., liquor ratio of 1:100) for one hour to thereby remove 99% or more of the copolymerized PET from the polymer alloy fiber upon hydrolysis, followed by washing with water and drying.

The side of the nanoporous N6 fiber was observed with an optical microscope, to find that the fiber had a diameter somewhat lower than that of the fiber before the alkali treatment, showing that the fiber shrank in its radius direction as a result of the removal of the islands-part polymer.

Figure 18:
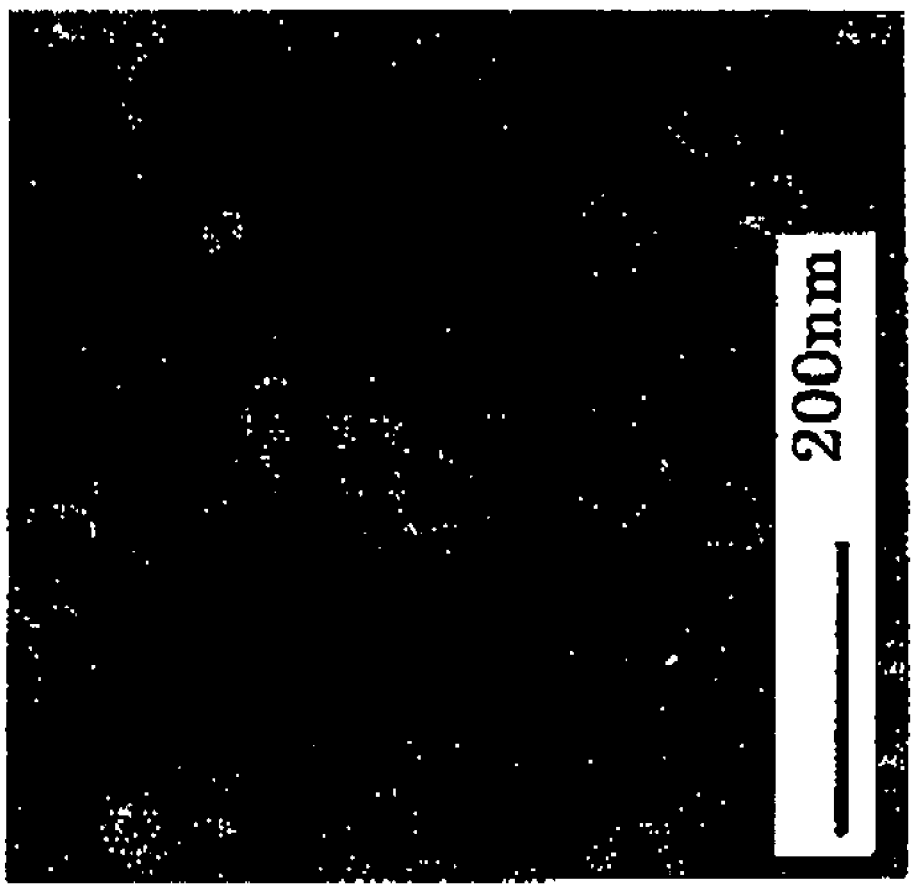
FIG. 18 is a transmission electron micrograph showing an example of a cross section of a nanoporous fiber according to after-mentioned Example 10 of the present invention.
Figure 19:
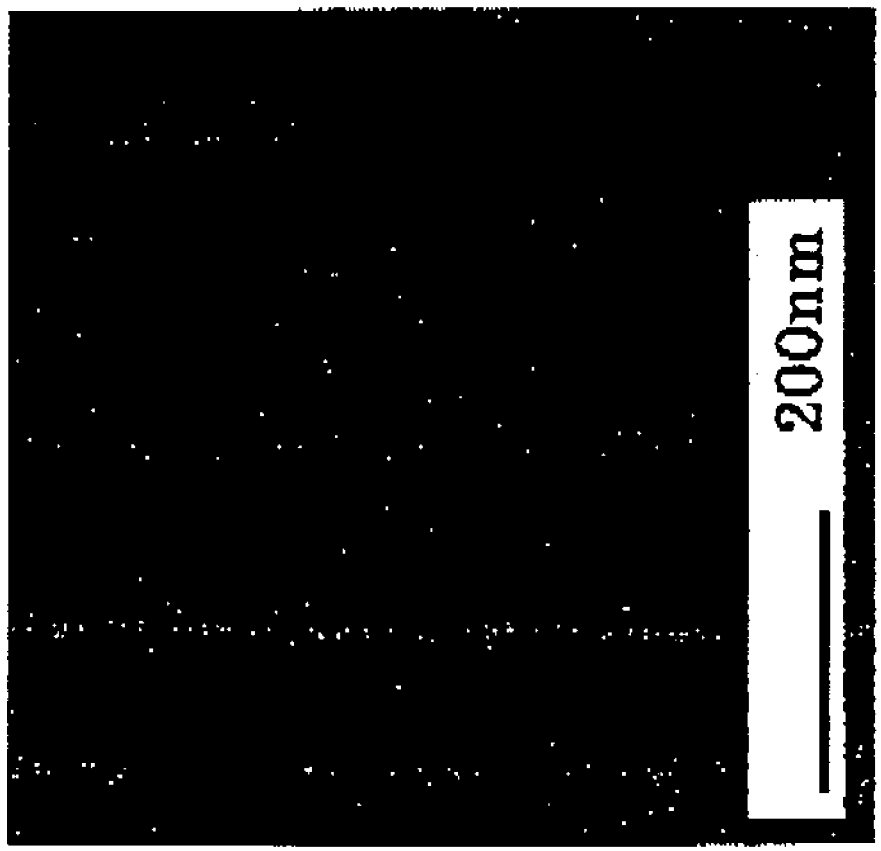
FIG. 19 is a transmission electron micrograph showing an example of a longitudinal section of the nanoporous fiber according to after-mentioned Example 10 of the present invention.

The side of the nanoporous N6 fiber was observed under a SEM to find that the fiber had a smooth surface without unevenness at a magnification of about 2000 times. The cross section of the nanoporous N6 fiber was observed under a TEM (FIG. 18) to find that the fiber had a pattern of dark and bright regions finer than that of the original polymer alloy fiber (FIG. 16) upon metal staining. The dark regions are regions at high density of N6, and bright regions are regions at low density of N6. The bright regions are considered to correspond to pores. These results show that the pores each have a smaller size than the original islands-part polymer as a result of the removal of the islands-part polymer, have an average diameter of 10 to 20 nm and are free from coarse pores each having a diameter of 50 nm or more. The patterns of dark and bright regions in FIG. 18 (the cross section of the fiber) and FIG. 19 (the longitudinal section of the fiber) show that these pores are unconnected pores.

The round braid prepared from the nanoporous N6 fiber was dyed and was found to have excellent color property. The ratio of moisture adsorption (ΔMR) was 6%, showing much higher hygroscopicity than cotton. The nanoporous N6 fiber had a strength of 2.0 cN/dtex and an elongation percentage of 70%, showing that the fiber had sufficient mechanical properties as a fibrous article. The physical properties of the nanoporous N6 fiber are shown in Table 3.

Example 11

The N6 and the copolymerized PET were subjected to melt kneading by the procedure of Example 1, except for blending 40% by weight of N6 and 60% by weight of the copolymerized PET, to thereby obtain master pellets. The pellets had an average weight per pellet of 3 mg and an amount of terminal amino groups of $3.5 \times 10^{-5}$ molar equivalent per gram of N6.

Figure 33:
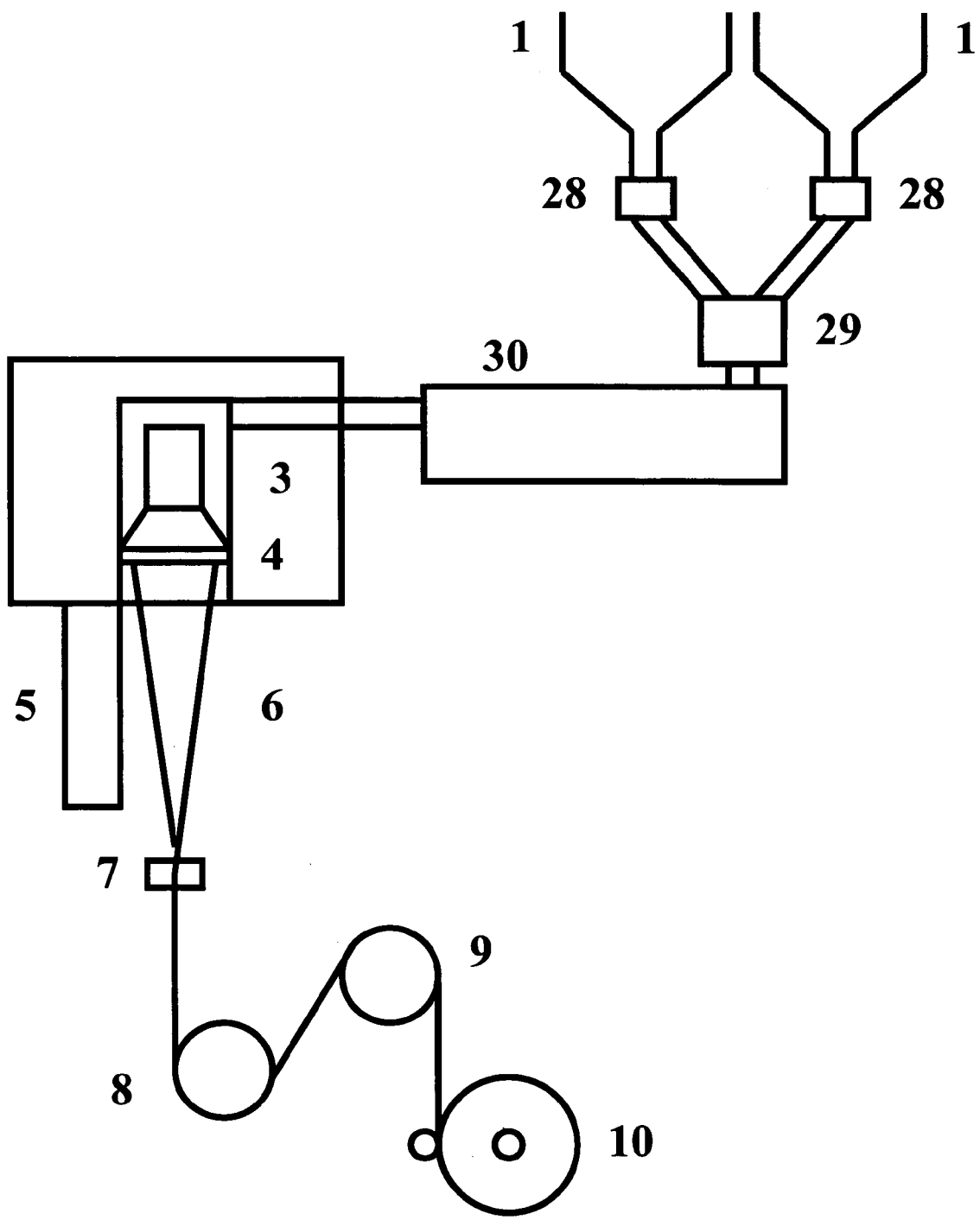
FIG. 33 is a diagram showing an example of a spinning machine.

The master pellets and the virgin N6 pellets (average weight per pellet of 3 mg) used in melt kneading were charged into different hoppers 1, weighed in weighing sections 28, respectively, and fed to a blending tank 29 having a capacity of 7 kg (FIG. 33). The blending ratio of the master pellets to the virgin N6 pellets was 1/3 by weight, and 20 ppm of an antistatic agent (EMULMIN 40 available from Sanyo Chemical Industries, Ltd.) was incorporated for preventing adhesion of pellets to the wall of the blending tank. The pellets were blended in the blending tank, fed to a twin-screw extrusion-kneader 30 and subjected to melt kneading, to thereby obtain a polymer alloy comprising 15% by weight of the copolymerized PET. In this procedure, the length of the kneading section was set at 33% of the effective length of the screws, and the kneading temperature was set at 260° C. The polymer alloy was subjected to melt spinning by the procedure of Example 1, to obtain a highly oriented undrawn yarn. The yarn could be satisfactorily spun without any yarn breaking during continuous spinning for 24 hours. The yarn did not cause deformation of the wound package due to swelling with time, which constitutes a problem in regular nylon yarns, and showed good handleability. The undrawn polymer alloy yarn showed excellent physical properties of a strength of 2.5 cN/dtex, an elongation percentage of 130% and a U % of 1.4%. This article was subjected to draw thermal treatment by the procedure of Example 8, except for setting the draw ratio at 1.5, the temperature of the first hot roller 24 at 90° C. and the temperature of the second hot roller 25 at 130° C. The polymer alloy fiber was of 87 dtex and 24 filaments and had excellent physical properties of a strength of 3.2 cN/dtex, an elongation percentage of 33%, a thermal shrinkage of 8% and a U % of 1.6% (Table 4). The cross section of the polymer alloy fiber was observed under a TEM to find that the fiber had an islands-in-sea structure comprising N6 as a sea (dark region) and the copolymerized PET as islands (bright region). The islands had an average diameter of 45 nm. These results show that the resulting polymer alloy fiber comprises the copolymerized PET ultrafinely dispersed. The area ratio of islands each having a diameter of 200 nm or more to the total islands was 1.6%. The TEM observation of the longitudinal section of the fiber shows that the islands has a lined structure.

This article was knitted into a round braid of 20 G and treated with a 3% by weight aqueous sodium hydroxide solution (95° C., liquor ratio of 1:50) for one hour, to dissolve off and remove 99% or more of the copolymerized PET from the polymer alloy fiber.

The round braid comprising the nanoporous N6 fiber was dyed and was found to have excellent color property but to show slight dyeing speck. The article had a ratio of moisture adsorption ($\Delta$MR) of 5.0% and exhibited much higher hygroscopicity than cotton.

The cross section of the nanoporous N6 fiber was observed under a TEM to find that the fiber had unconnected pores having a diameter of about 20 to 50 nm. The pores had an average diameter of 30 nm, and the area ratio of coarse pores each having a diameter of 50 nm or more was 1.0%. The round braid had a strength of 2.0 cN/dtex and an elongation percentage of 25%, showing that the round braid had sufficient mechanical properties as a fibrous article. The physical properties of the nanoporous N6 fiber are shown in Table 3.

Example 12

The N6 and the copolymerized PET used in melt kneading in Example 1 were charged into different hoppers 1, weighed in weighing sections 28, respectively, and fed to a blending tank 29 having a capacity of 7 kg (FIG. 33). The N6 and the copolymerized PET were used in amounts of 85% by weight and 15% by weight, respectively, and 20 ppm of an antistatic agent (EMULMIN 40 available from Sanyo Chemical Industries, Ltd.) was incorporated for preventing adhesion of pellets to the wall of the blending tank. The pellets were blended in the blending tank, fed to a twin-screw extrusion-kneader 30 and subjected to melt kneading, to thereby obtain a polymer alloy. In this procedure, the length of the kneading section was set at 33% of the effective length of the screws, and the kneading temperature was set at 260° C. The polymer alloy was subjected to melt spinning by the procedure of Example 1, to obtain a highly oriented undrawn yarn. Broken end occurred once during continuous spinning for 24 hours. The yarn did not cause deformation of the wound package due to swelling with time, which constitutes a problem in regular nylon yarns, and showed good handleability. The undrawn polymer alloy yarn showed excellent physical properties of a strength of 2.4 cN/dtex, an elongation percentage of 125% and a U % of 1.6%. The yarn was subjected to draw false-twisting by the procedure of Example 1 but showed somewhat unstable untwisting as compared with Example 1. The resulting 87 dtex 24-filament false-twisted yarn had a strength of 2.4 cN/dtex, an elongation percentage of 21%, a thermal shrinkage of 9%, a U % of 2.2% and a CR of 30% showed some but trivial not-untwisted portions as compared with Example 1 (Table 4). The cross section of the crimped polymer alloy yarn was observed under a TEM to find that the yarn had an islands-in-sea structure comprising N6 as a sea (dark region) and the copolymerized PET as islands (bright region). The islands had an average diameter of 52 nm, showing that the polymer alloy fiber comprised the copolymerized PET ultrafinely dispersed. The area ratio of islands each having a diameter of 200 nm or more to the total islands was 2.0%. The TEM observation of the longitudinal section of the fiber shows that the islands has a lined structure.

This was knitted into a round braid of 20 G and treated with a 3% by weight aqueous sodium hydroxide solution (95° C., liquor ratio of 1:50) for one hour to thereby dissolve off and remove 99% or more of the copolymerized PET from the false-twisted polymer alloy yarn.

The round braid comprising the nanoporous N6 fiber was dyed and was found to have excellent color property but show some dyeing speck. The round braid had a ratio of moisture adsorption ($\Delta$MR) of 5.0% and exhibited much higher hygroscopicity than cotton.

The cross section of the nanoporous N6 fiber was observed under a TEM to find that the fiber had unconnected pores each having a diameter of about 20 to 50 nm. The average of the pores was 35 nm, and the area ratio of coarse pores each having a diameter of 50 nm or more was 1.6%. The fiber had a strength of 1.8 cN/dtex and an elongation percentage of 25%, showing that the fiber had sufficient mechanical properties as a fibrous article. The physical properties of the nanoporous N6 fiber are shown in Table 3.

Example 13

Figure 34:
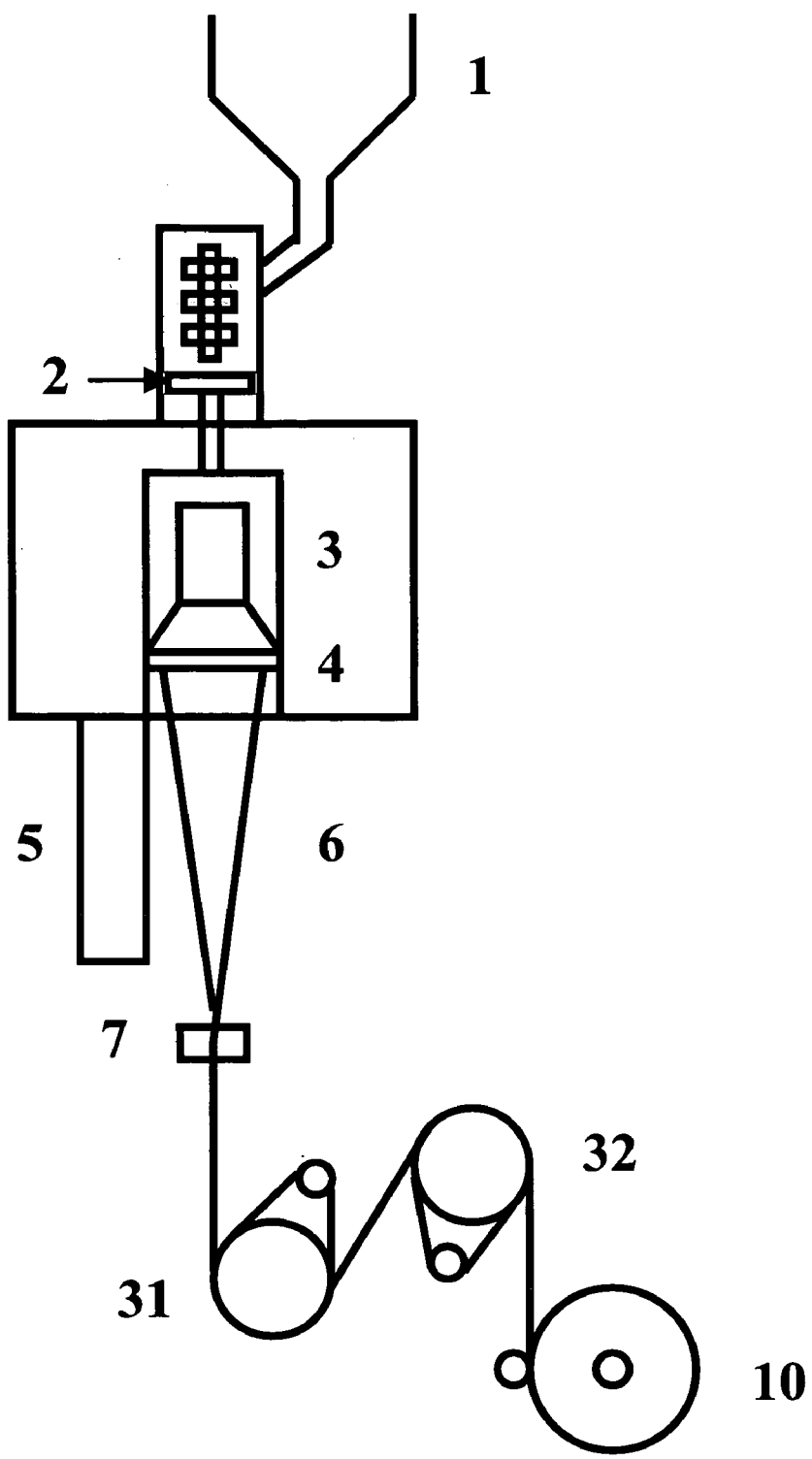
FIG. 34 is a diagram showing an example of a draw false-twist texturing machine.

The melt spinning procedure of Example 10 was carried out to conduct spinning and direct drawing using a device shown in FIG. 34, except for changing the discharge rate per one orifice and the number of spinneret orifices and setting the circumferential speed of a first hot roller 31 at 2000 meters per minute, the temperature of the first hot roller 31 at 40° C., the circumferential speed of a second hot roller 32 at 4500 meters per minute and the temperature of the second hot roller 32 at 150° C. Thus, a 55 dtex 12-filament polymer alloy fiber having a strength of 4.4 cN/dtex, an elongation percentage of 37%, a U % of 1.2% and a thermal shrinkage of 12% was prepared. The fiber showed good spinnability without any yarn breaking during continuous spinning for 24 hours. The resulting polymer alloy fibers were free from coarsely aggregated polymer particles. The area ratio of islands each having a diameter of 200 nm or more was 0.1% or less, and the area ratio of islands each having a diameter of 100 nm or more was 1% or less. The TEM observation of the longitudinal section of the fiber shows that the islands has a lined structure. The yarn had excellent physical properties as shown in Table 4.

The polymer alloy fibers were subjected to circular knitting by the procedure of Example 10, from which 99% or more of the copolymerized PET was removed by an alkali treatment, to thereby obtain a round braid comprising a nanoporous N6 fiber.

The cross section of the nanoporous N6 fiber was observed under a TEM to find that the fiber had dark and bright regions as a result of metal staining finer than the original polymer alloy fiber, showing that the pores had sizes smaller than the original islands-part polymer as a result of the removal of the islands-part polymer, and that the average diameter of the pores was 10 to 20 nm and were free from coarse pores each having a diameter of 50 nm or more. The TEM observation shows that these pores are unconnected pores. The round braid comprising the nanoporous N6 fiber was dyed and was found to have excellent color property. The nanoporous N6 fiber had excellent physical properties as shown in Table 3.

Comparative Example 1

Melt spinning was carried out by the procedure of Example 1, except for kneading the materials by simple chip blending (dry blending) with the use of a device shown in FIG. 28 instead of the twin-screw extrusion-kneader. As a result, the polymers showed poor spinnability, could not be stably discharged during spinning and often invited yarn breakings during spinning. Thus, a yarn could not be stably wound. Accordingly, the spinning rate was changed to 900 meters per minute, which failed to wound a yarn stably. However, the resulting nominal undrawn yarn was subjected to draw thermal treatment at a draw ratio of 3.2, a temperature of the first hot roller 24 of 70° C. and a temperature of the second hot roller 25 of 130° C., to obtain a polymer alloy fiber. The cross section of the polymer alloy fiber was observed under a TEM to find that uneven blending was significant, some coarsely aggregated polymer particles were observed, and the area ratio of islands each having a diameter of 200 nm or more to the total islands was 10% (Table 4). A round braid was prepared from this and was subjected to an alkali treatment by the procedure of Example 6 to obtain a porous N6 fiber. This fiber, however, had a large area ratio of coarse pores each having a diameter of 200 nm or more of 2.0%, scattered a large quantity of light, appeared whitish and exhibited poor color property (Table 3).

The above-prepared polymer alloy fiber was subjected to false twisting using a spinner pin as a rotator 15, at a temperature of a heater 13 of 165° C. and a draw ratio of 1.01, which invited unstable untwisting and frequent yarn breakings. The resulting nominal false-twisted yarn had a markedly large amount of not-untwisted portions and exhibited poor quality.

Comparative Example 2

Figure 20:
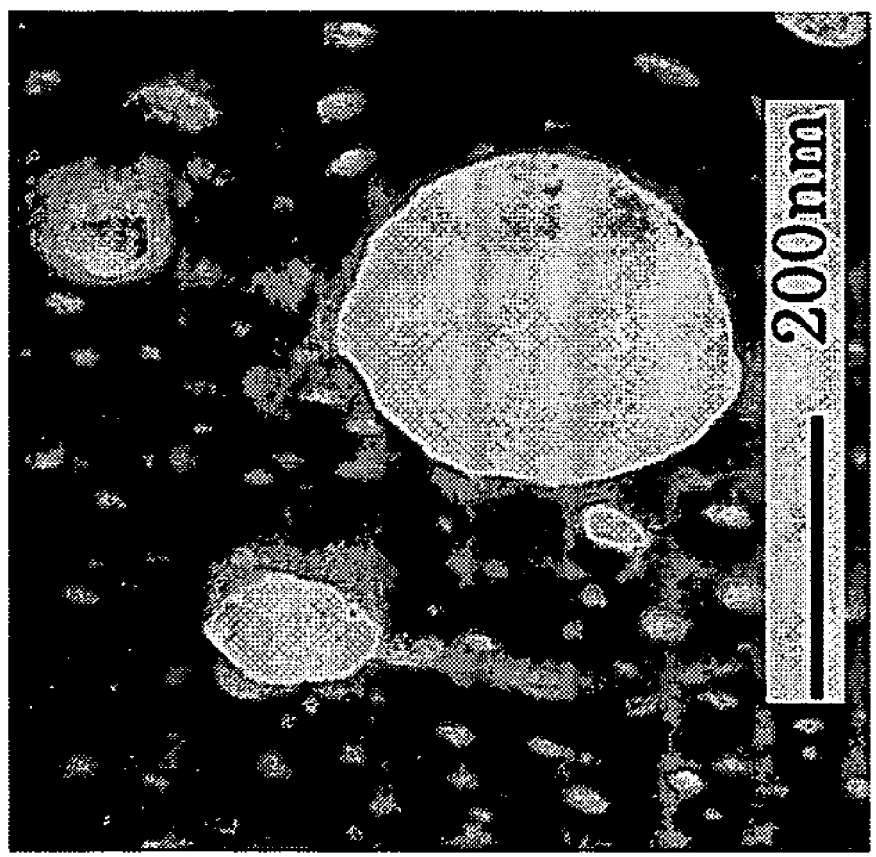
FIG. 20 is a transmission electron micrograph showing an example of a cross section of polymer alloy pellets according to after-mentioned Comparative Example 2 in the present invention.

The materials were subjected to melt kneading by the procedure of Example 1, except for setting the length of the kneading section at 10% of the effective length of the screws, to obtain polymer alloy chips. The chips were subjected to TEM observation to find that the copolymerized PET was dispersed unevenly, in which some particles were dispersed with a diameter of about 30 nm but may others were dispersed with a diameter of 100 nm or more (FIG. 20). The area ratio of coarsely dispersed polymer particles each having a diameter in terms of circle of 100 nm or more was 50% or more to the total dispersed polymer in a cross section of the pellet.

The polymer alloy pellets were subjected to melt spinning by the procedure of Example 1, but showed poor spinnability and invited frequent yarn breakings during spinning, and a yarn could not be stably wound. Accordingly, the spinning rate was changed to 900 meters per minute, which failed to wound a yarn stably. The resulting nominal undrawn yarn was subjected to draw thermal treatment by the procedure of Comparative Example 1, to obtain a polymer alloy fiber. The cross section of the polymer alloy fiber was observed under a TEM to find that the fiber showed significant uneven blending, had some coarsely aggregated polymer particles, in which the area ratio of islands each having a diameter of 200 nm or more to the total islands was 8% (Table 4). A round braid was prepared from this and was subjected to an alkali treatment by the procedure of Comparative Example 1, to obtain a porous N6 fiber. The resulting porous fiber, however, had a large area ratio of coarse pores each having a diameter of 200 nm or more of 1.9%, scattered a large quantity of light, appeared whitish and exhibited poor color property (Table 3).

The resulting polymer alloy fiber was subjected to false twisting by the procedure of Comparative Example 1, but invited unstable untwisting and frequent yarn breakings. The resulting nominal false-twisted yarn had a markedly large amount of not-untwisted portions and exhibited poor appearance quality.

TABLE 3

|  | Average pore diameter (nm) | Area ratio 1 (%) | Area ratio 2 (%) | Strength (cN/dtex) | ΔMR (%) | Color property | Adsorbing rate (%) | Percentage of water retention (%) |
| --- | --- | --- | --- | --- | --- | --- | --- | --- |
| Example 8 | 20 or less | 0 | 0 | 2.1 | 5.7 | Excellent | 60 | 83 |
| Example 9 | 20 or less | 0 | 0 | 2.0 | 3.6 | Excellent | 62 | 84 |
| Example 10 | 20 or less | 0 | 0 | 2.0 | 6.0 | Excellent | 60 | 83 |
| Example 11 | 30 | 0 | 1.0 | 2.0 | 5.0 | Good | 58 | 80 |
| Example 12 | 35 | 0 | 1.6 | 1.8 | 5.0 | Good | 55 | 80 |
| Example 13 | 20 or less | 0 | 0 | 3.4 | 5.8 | Excellent | 60 | 80 |
| Comparative Example 1 | — | 2.0 | — | 1.3 | 4.3 | Failure | — | — |
| Comparative Example 2 | — | 1.9 | — | 1.3 | 4.2 | Failure | — | — |

Average pore diameter: Average pore diameter estimated based on TEM observation
Area ratio 1: Area ratio of pores having a diameter of 200 nm or more to the total fiber
Area ratio 2: Area ratio of pores having a diameter of 50 nm or more to the total fiber
Adsorbing rate: Ammonia adsorbing rate

TABLE 4

| | Kneading procedure | Area ratio (%) | Average diameter of islands (nm) | Spinnability | Strength (cN/dtex) | U % (%) | Thermal shrinkage (%) |
|---|---|---|---|---|---|---|---|
| Example 8 | Static | 0.1 or less | 20 (thick) | Good | 3.5 | 1.5 | 12 |
| Example 9 | Static | 0.1 or less | 15 | Good | 3.2 | 1.5 | 12 |
| Example 10 | EXT | 1.2 | 38 | Good | 3.7 | 1.2 | 11 |
| Example 11 | Blending tank → EXT | 1.6 | 45 | Good | 3.2 | 1.6 | 8 |
| Example 12 | Blending tank → EXT | 2.0 | 52 | Fair | 2.4 | 2.2 | 9 |
| Example 13 | EXT | 0.1 or less | 26 | Good | 4.4 | 1.2 | 12 |
| Comparative Example 1 | Chip blending | 10 | 130 | Failure | 2.8 | 8.2 | 11 |
| Comparative Example 2 | EXT | 8 | 120 | Failure | 2.8 | 8.0 | 11 |

Area ratio: Area ratio of pores having a diameter of 200 nm or more to the total islands
Static: Static mixer (having a number of splits of 104 × 10$^4$)
EXT: twin-screw extrusion-kneader
Blending tank → EXT: Twin-screw extrusion-kneader after chip blending a small amount of materials in a blending tank
Chip blending: Dry blending of pellets

Example 14

N6 and the copolymerized PET were subjected to melt kneading, melt spinning, and draw thermal treatment by the procedure of Example 10, except for using a high-viscosity N6 having a melt viscosity of 1540 poises (280° C. at a rate of shear of 2432 sec$^{-1}$) and containing terminal amino groups in an amount of 5.0×10$^{-5}$ molar equivalent per gram, setting the blending ratio of N6 to the copolymerized PET at 1.1, and changing the discharge rate per one orifice and the number of spinneret orifices, to thereby obtain 105 dtex, 96-filament polymer alloy fibers. They showed good spinnability and were free from yarn breaking during continuous spinning for 24 hours. The resulting polymer alloy fibers were free from coarsely aggregated polymer particles, in which the area ratio of islands each having a diameter of 200 nm or more was 0.1% or less, and the area ratio of islands each having a diameter of 100 nm or more was 1% or less. The yarn had excellent physical properties as shown in Table 6. The longitudinal section of the fiber was observed under a TEM, to find that the islands had a lined structure.

The polymer alloy fibers were subjected to circular knitting, from which 99% or more of the copolymerized PET was removed by an alkali treatment by the procedure of Example 10, to thereby obtain a round braid comprising a nanoporous N6 fiber.

The nonporous N6 fiber was observed with an optical microscope and an SEM, respectively, to find that the fiber shrank in its radius direction as a result of the removal of the islands-part polymer, and the fiber had a smooth surface without unevenness at a magnification of about 2000 times. The cross section of the nanoporous N6 fiber was observed under a TEM to find that the fiber had dark and bright regions as a result of metal staining finer than the original polymer alloy fiber, showing that the pores had sizes smaller than the original islands-part polymer as a result of the removal of the islands-part polymer, and that the average diameter of the pores was 10 to 20 nm and were free from coarse pores each having a diameter of 50 nm or more. The pores were unconnected pores.

The round braid comprising the nanoporous N6 fiber was dyed and was found to have excellent color property. The nanoporous N6 fiber had excellent physical properties as shown in Table 5.

Example 15

Figure 21:
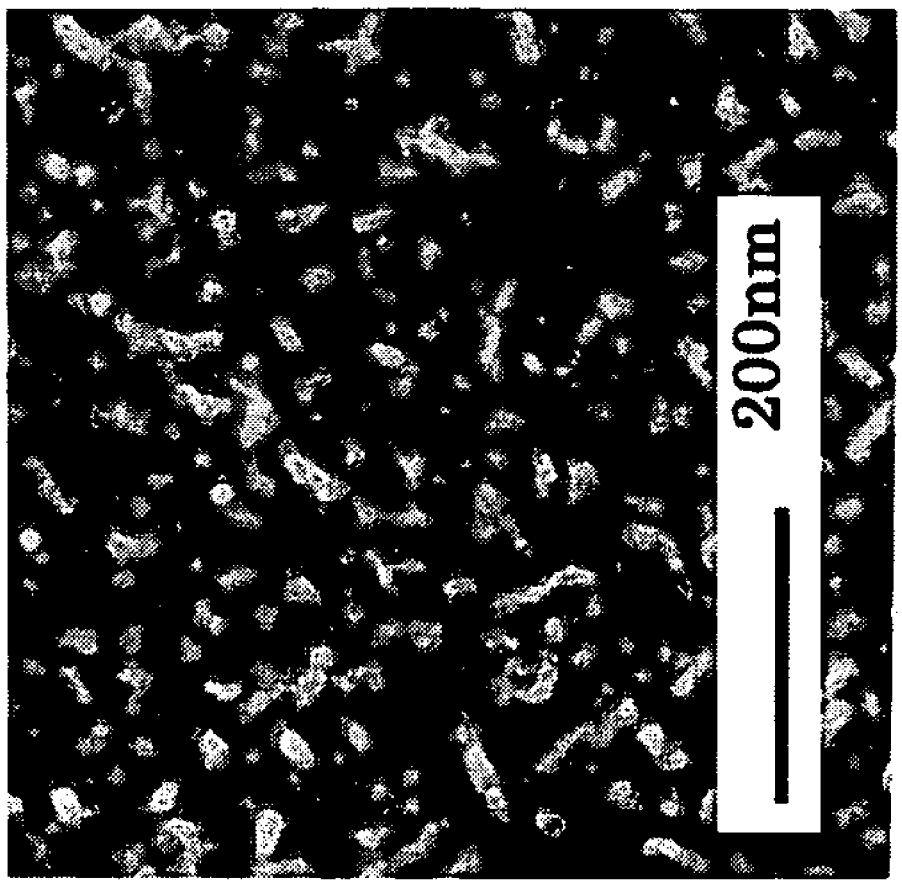
FIG. 21 is a transmission electron micrograph showing an example of a cross section of a polymer alloy fiber according to after-mentioned Example 15 of the present invention.

The N6 used in Example 10 (50% by weight) and a PET copolymerized with 12% by mole of 5-sodiosulfoisophthalic acid and 26% by mole of isophthalic acid (50% by weight) were kneaded in a twin-screw extrusion-kneader at 245° C., to thereby obtain polymer alloy chips. The polymer alloy was subjected to melt spinning by the procedure of Example 3, except for setting the spinning temperature at 250° C. and the spinneret diameter at 0.6 mm and changing the discharge rate per one orifice, and the resulting undrawn yarn was wound at a spinning rate of 800 meters per minute. This was subjected to draw thermal treatment at a draw ratio of 3.4, a temperature of the first hot roller 24 of 90° C. and a temperature of the second hot roller 25 of 130° C., to thereby obtain a 85 dtex, 36-filament polymer alloy yarn. The yarn could be satisfactorily spun without any yarn breaking during continuous spinning for 24 hours. The cross section of the polymer alloy fiber was observed under a TEM, and the result is shown in FIG. 21. The copolymerized PET constituted islands in the form of layers having a minor axis of about 10 to 30 nm and a major axis of about 50 to 100 nm and was free from coarsely aggregated polymer particle. The area ratio of islands each having a diameter of 200 nm or more to the total islands was 0.1% or less, and the area ratio of islands each having a diameter of 100 nm or more was 1% or less. The TEM observation of the longitudinal section of the fiber shows that the islands has a lined structure. The yarn had excellent physical properties as shown in Table 6.

The polymer alloy fiber was subjected to circular knitting by the procedure of Example 10 and treated with a 3% by weight aqueous sodium hydroxide solution (90° C., liquor ratio of 1:50) for one hour to dissolve off and remove 99% or more of the copolymerized PET, to thereby obtain a round braid comprising a nanoporous N6 fiber. The fiber significantly shrank in its radius direction with a shrinkage in radius direction of about 22% and a shrinkage in terms of cross sectional area of about 40%. The side of the constitutional fiber of the nylon 6 yarn after removing the copolymerized PET was observed with an SEM (2000 times) and was found neither streaky grooves nor voids from which the copolymerized PET had been removed.

Figure 22:
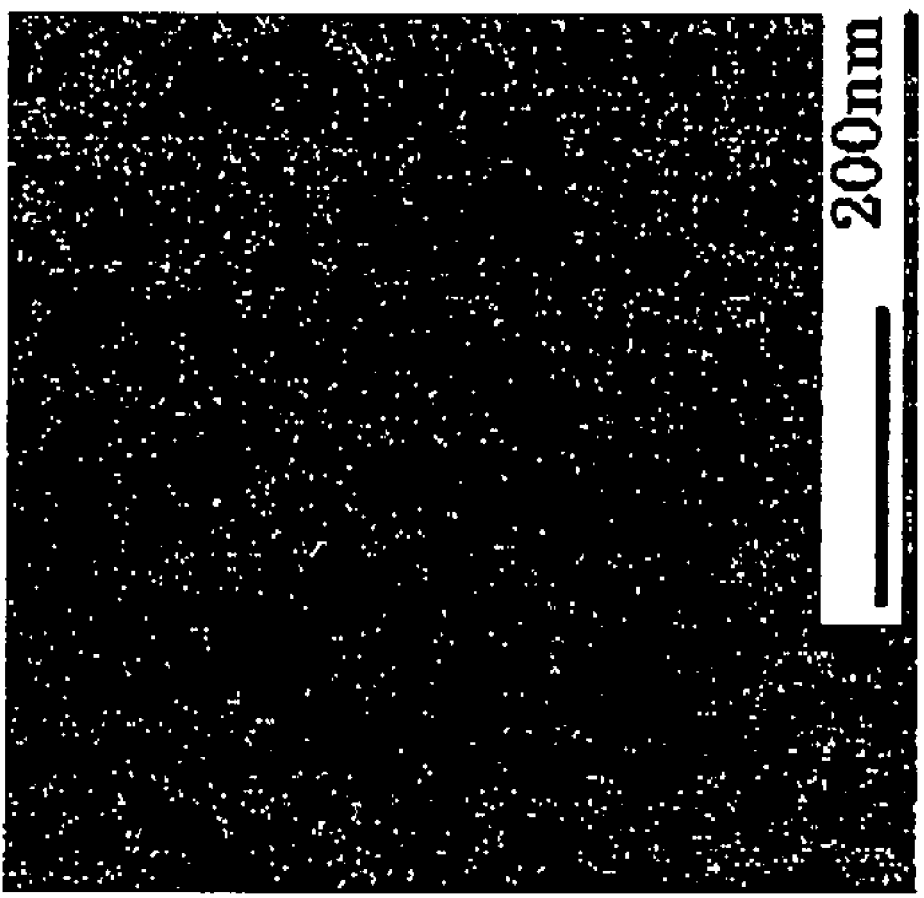
FIG. 22 is a transmission electron micrograph showing an example of a cross section of a nanoporous fiber according to after-mentioned Example 15 of the present invention.

The cross section of the nanoporous N6 fiber was observed under a TEM, and the result is shown in FIG. 22, showing that the average diameter of the pores was 10 to 20 nm and were free from coarse pores each having a diameter of 50 nm or more. These pores were considered to be connected with each other to form connected pores.

The round braid prepared from the nanoporous N6 fiber was dyed and was found to have excellent color property. The water swelling of the nanoporous N6 fiber was determined to find that the yarn had a high percentage of swelling in its longitudinal direction of 11.1%. The article showed substantially no decrease in percentage of swelling in a longitudinal direction of the yarn even in a third measurement and exhibited satisfactory reversibility and durability. The water swelling of the nanoporous N6 fiber was determined again after heat treating the round braid at 160° C. for 10 minutes. The fiber showed a somewhat decreased percentage of swelling in the longitudinal direction of the yarn of 7.3% as compared with that before thermal treatment, which is, however, significantly larger than that of regular N6 fibers, 3%. This indicates that the percentage of swelling in a longitudinal direction of the yarn can be controlled by a thermal treatment, which facilitates the designing of fabrics. The nanoporous N6 fiber had excellent physical properties as shown in Table 5.

Example 16

Figure 23:
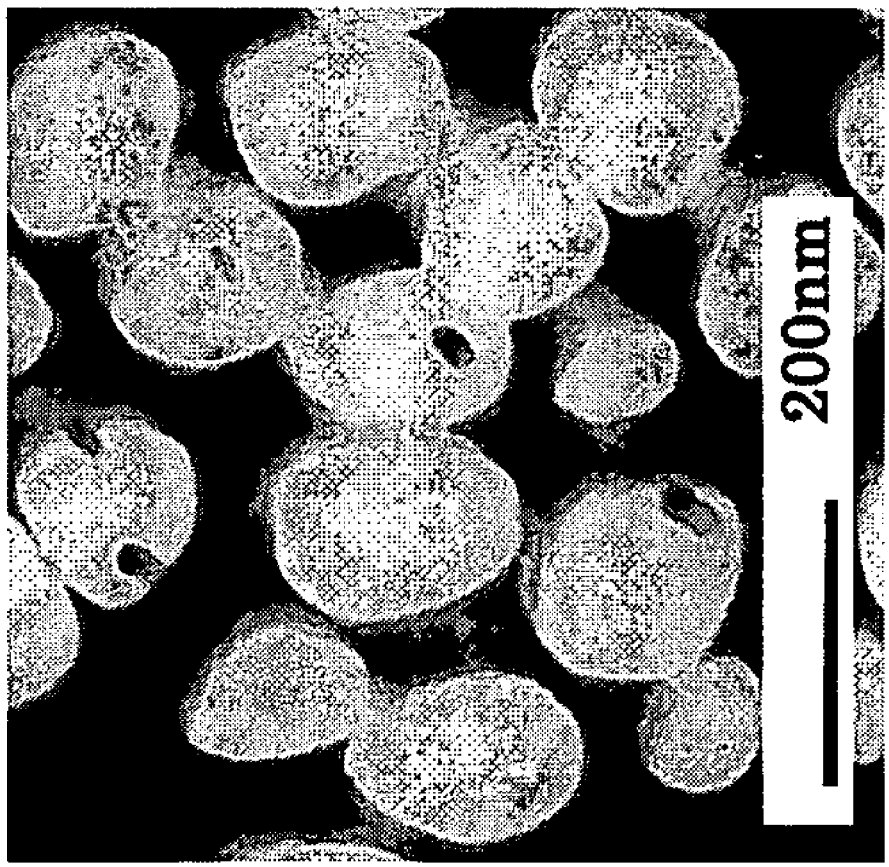
FIG. 23 is a transmission electron micrograph showing an example of a cross section of a polymer alloy fiber according to after-mentioned Example 16 of the present invention.

The melt spinning, draw thermal treatment procedure of Example 10 was repeated, except for using, as the copolymerized PET, a copolymerized PET having a melting point of 225° C., containing 0.05% by weight of titanium oxide and being copolymerized with 7% by mole of isophthalic acid and 4% by mole of an ethylene oxide adduct of bisphenol A, for using 50% by weight of N6 and 50% by weight of the copolymerized PET, and setting the spinneret diameter at 0.7 mm. The spinning was somewhat unstable as compared that in Example 10, but it was trivial, and yarn breaking occurred twice during continuous spinning for 24 hours. The cross section of the polymer alloy fiber was observed under a TEM, and the result is shown in FIG. 23. The fiber had little coarsely aggregated polymer particles, but the average diameter of islands was 143 nm, and the area ratio of islands each having a diameter of 200 nm or more to the total islands was 5%. The TEM observation of the longitudinal section of the fiber shows that the islands has a lined structure. The physical properties of the yarn are shown in Table 6.

The polymer alloy fiber was subjected to circular knitting by the procedure of Example 10, from which 99% or more of the copolymerized PET was removed by an alkali treatment, to thereby obtain a round braid comprising a nanoporous N6 fiber.

Figure 24:
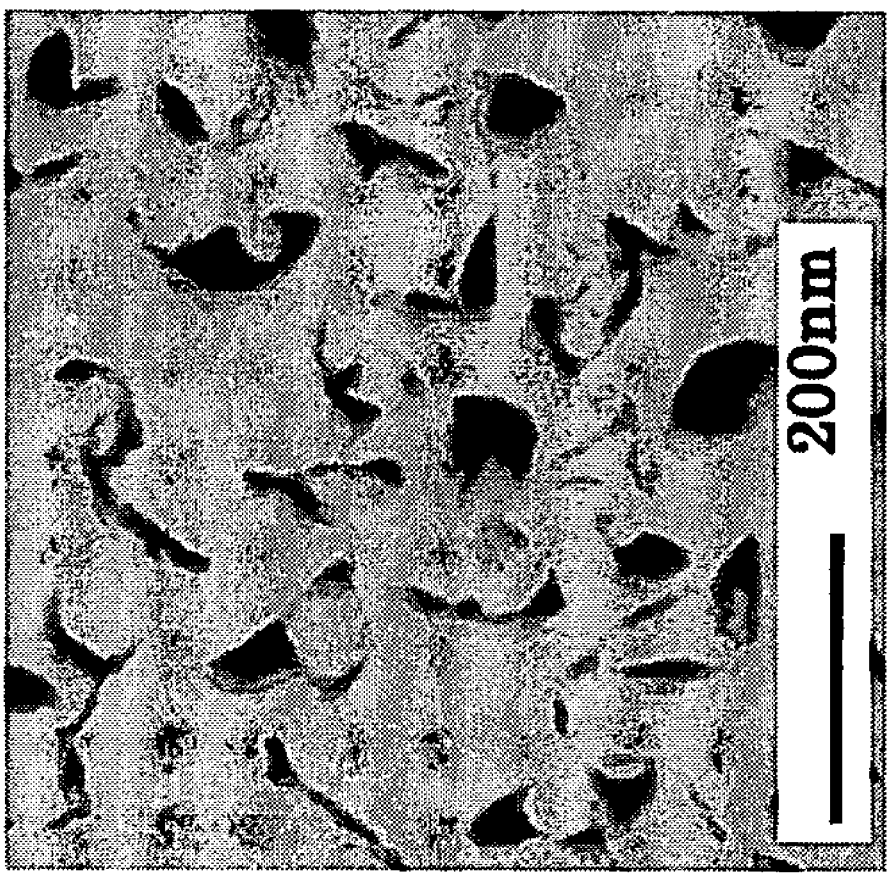
FIG. 24 is a transmission electron micrograph showing an example of a cross section of a nanoporous fiber according to after-mentioned Example 16 of the present invention.

The nanoporous N6 fiber was observed with an optical microscope to find that the fiber shrank in its radius direction as a result of the removal of the islands-part polymer, as in Example 10. The cross section of the nanoporous N6 fiber was observed under a TEM, and the result is shown in FIG. 24. Holes from which the islands-part polymer had been removed were crushed to form pores having a width of about 10 to 30 nm and a length of about 100 nm including some coarse pores each having a diameter of 50 to 100 nm. However, the area ratio of coarse pores each having a diameter of 200 nm or more was 0.5%. The color property of this article was determined to find that the article had color property at usable level for clothing, although it was inferior to that in Example 10. The pores of the fiber were unconnected pores.

Example 17

The melt kneading procedure of Example 1 was repeated, except for using, instead of the copolymerized PET, a polyalkylene oxide derivative, "Paogen PP-15" available from Daiichi Kogyo Seiyaku Co., Ltd., serving as a polymer soluble in hot water and setting the temperature at 240° C. The resulting polymer alloy chip had b* of 4.5. The kneaded product was subjected to melt spinning, draw thermal treatment by the procedure of Example 10, except for changing the discharge rate per one orifice and the number of spinneret orifices and setting a spinning rate at 4000 meters per minute and a draw ratio at 1.2, to thereby obtain a 55 dtex, 68-filament polymer alloy fiber. The yarn could be satisfactorily spun without any yarn breaking during continuous spinning for 24 hours. The cross section of the polymer alloy fiber was observed under a TEM to find that the fiber was free from coarsely aggregated polymer particles, and the area ratio of islands each having a diameter of 200 nm or more to the total islands was 1.3%. The islands-part polymer was dispersed as lines. The yarn had excellent physical properties as shown in Table 6.

The polymer alloy fiber was subjected to circular knitting by the procedure of Example 10 and treated with hot water at 100° C. for one hour to remove 99% or more of the polymer soluble in hot water, to thereby obtain a round braid comprising a nanoporous N6 fiber.

The cross section of the nanoporous N6 fiber was observed under a TEM, to find that the pores were unconnected pores, had an average diameter of 30 nm and were free from coarse pores each having a diameter of 50 nm or more. The pores of this fiber were unconnected pores.

The round braid prepared from the nanoporous N6 fiber was dyed and was found to have excellent color property. The nanoporous N6 fiber had excellent physical properties as shown in Table 5.

Example 18

The melt kneading procedure of Example 1 was repeated, except for using, instead of the copolymerized PET, a poly (L-lactic acid) having an optical purity of 99.5% or more, a weight-average molecular weight of $15 \times 10^4$, a melt viscosity of 857 poises (240° C., 2432 sec$^{-1}$) and a melting point of 170° C. and setting the kneading temperature at 220° C. The weight-average molecular weight of the polylactic acid was determined in the following manner. A solution of a sample in chloroform was mixed with THF (tetrahydrofuran) to obtain a specimen solution. The specimen solution was subjected to measurement at 25° C. using a gel permeation chromatograph (GPC) Waters 2690 available from Waters, and the weight-average molecular weight in terms of polystyrene was determined. The N6 used in Example 1 had a melt viscosity of 570 poises at 240° C., 2432 sec$^{-1}$. The kneaded product was subjected to melt spinning by the procedure of Example 1, except for changing the discharge rate per one orifice and the number of spinneret orifices and setting the spinning rate at 3500 meters per minute, to thereby obtain a highly oriented undrawn yarn of 105 dtex, 36 filaments having a strength of 3.1 cN/dtex, an elongation percentage of 107% and a U % of 1.2%. The yarn could be satisfactorily spun without any yarn breaking during continuous spinning for 24 hours. This was subjected to draw false-twisting by the procedure of Example 1, except for setting the draw ratio at 1.4 to thereby obtain a 76 dtex, 36-filament false-twisted yarn having a strength of 4.0 cN/dtex, an elongation percentage of 29%, a U % of 1.3% and a CR of 35%. In this procedure, the temperature of the heater was set at 160° C. in consideration of the melting point of the poly(L-lactic acid). Thus, the resulting false-twisted yarn was substantially free from not-untwisted portions, had excellent appearance quality and exhibited good processability in draw false-twisting. The cross section of the fiber of the crimped polymer alloy yarn was observed under a TEM to find that the fiber was free from coarsely aggregated polymer particles, the area ratio of islands-part polymer particles having a diameter of 200 nm or more to the total islands parts was 0.1% or less, and the an average diameter of the islands-part polymer was 80 nm. The yarn had excellent physical properties as shown in Table 6.

The crimped polymer alloy yarn was subjected to circular knitting and to an alkali treatment by the procedure of Example 1 to remove 99% or more of the poly(L-lactic acid), to thereby obtain a round braid comprising a nanoporous N6 fiber. The round braid prepared from the nanoporous N6 fiber was dyed and was found to have excellent color property.

The cross section of the nanoporous N6 fiber sampled from the round braid was observed under a TEM, to find that holes from which the islands-part polymer had been removed constituted pores having a diameter of about 30 nm without coarse pores having a diameter of 50 nm or more. The resulting nanoporous fiber had a strength higher than that in Example 1. This is probably because sulfo groups contained in the copolymerized PET used in Example 1 may form a pseudo-crosslinking structure and inhibit the formation of fiber structure of N6, but PLA used herein less invites such adverse effects.

Comparative Example 3

An N6 having a relative viscosity of 2.8, a melt viscosity of 1260 poises (280° C. at a rate of shear of 2432 sec$^{-1}$) (50% by weight) and a polyethylene terephthalate copolymerized with 2.5% by mole of 5-sodiosulfoisophthalic acid and 3.5% by mole of an ethylene oxide adduct of bisphenol A (50% by weight) were subjected to simple chip blending, and the blend was melted at 290° C., discharged from a spinneret having a round orifice with a diameter of 0.6 mm and subjected to melt spinning using a device shown in FIG. 28 at a spinning rate of 1200 meters per minute. However, the polymers could not be stably discharged during spinning, the spinnability was poor and yarn breakings often occurred during spinning. Thus, a yarn could not be stably wound. The resulting nominal undrawn yarn was drawn using a hot plate at 120° C. at a draw ratio of 2.7. This yielded a 85 dtex, 24-filament polymer alloy fiber. The cross section of the fiber was observed under a TEM to find that the fiber showed significant uneven blending and contained some coarsely aggregated polymer particle, and the area ratio of islands each having a diameter of 200 nm or more to the total islands was 10%.

An alkali treatment was carried out to dissolve off and remove 99% or more of the copolymerized PET. The diameter of the fiber did not substantially change in this procedure. The color property of this fiber was determined to find that the area ratio of coarse pores each having a diameter of 200 nm or more was as large as 5.0%, the fiber thereby scattered a large quantity of light, appeared whitish and exhibited poor color property.

Comparative Example 4

The N6 used in Comparative Example 3 (70% by weight) and a polyethylene terephthalate having an intrinsic viscosity of 0.60 and being copolymerized with 4.5% by mole of 5-sodiosulfoisophthalic acid and 8.5% by weight of a polyethylene glycol having a molecular weight of 4000 (30% by weight) were subjected to simple chip blending, and the blend was melted at 280° C., discharged from a spinneret having round orifices with a diameter of 0.6 mm and subjected to melt spinning using a device shown in FIG. 28 at a spinning rate of 1000 meters per minute. However, the polymers could not be stably discharged during spinning, the spinnability was poor and yarn breakings often occurred during spinning. Thus, a yarn could not be stably wound. The resulting nominal undrawn yarn was subjected to draw thermal treatment at a draw ratio of 3.35, a temperature of the first hot roller 24 of 90° C. and a temperature of the second hot roller 25 of 130° C. This yielded a 85 dtex, 24-filament polymer alloy fiber. The cross section of the fiber was observed under a TEM to find that the fiber showed significant uneven blending and contained some coarsely aggregated polymer particles, and the area ratio of islands each having a diameter of 200 nm or more to the total islands was 8%.

By an alkali treatment, 90% or more of the copolymerized PET was dissolved off from the fiber. The diameter of the fiber did not substantially change during this procedure. The color property of the article was determined, to find that the fiber scattered a large quantity of light, appeared whitish and exhibited poor color property, since the area ratio of coarse pores each having a diameter of 200 nm or more was as large as 2.4%.

Comparative Example 5

A total of 77% by weight of the N6 used in Comparative Example 3, 20% by weight of a homo-PET, and 3% by weight of a block polyether polyamide as a compatibilizer containing 45% by weight of a polyethylene glycol segment and 55% by weight of a poly-ε-caprolactam segment were subjected to simple chip blending, and the blend was subjected to melt spinning by the procedure of Example 1, except for using a device shown in FIG. 28. However, the polymers could not be stably discharged during spinning, the spinnability was poor and yarn breakings often occurred during spinning. Thus, a yarn could not be stably wound. The resulting nominal undrawn yarn was subjected to draw thermal treatment by the procedure of Example 1 to obtain a 77 dtex, 24-filament polymer alloy fiber. The cross section of the fiber was observed under a TEM to find that the fiber showed significant uneven blending and contained some coarsely aggregated polymer particles, and the area ratio of islands each having a diameter of 200 nm or more to the total islands was 14%.

Then, 99% or more of the PET was dissolved off and removed by an alkali treatment. The diameter of the fiber did not substantially change during this procedure, in contrast to Example 10. The color property of the article was determined, to find that the fiber scattered a large quantity of light, appeared whitish and exhibited poor color property, since the area ratio of coarse pores each having a diameter of 200 nm or more was as large as 4.6%.

Comparative Example 6

The N6 and the copolymerized PET were subjected to melt spinning by the procedure of Comparative Example 4, except for using 25% by weight of N6 and 75% by weight of the copolymerized PET. However, the polymers could not be stably discharged during spinning, the spinnability was poor and yarn breakings often occurred during spinning. Thus, a yarn could not be stably wound. The resulting nominal undrawn yarn was drawn using a hot plate at 120° C. at a draw ratio of 2.7, to obtain a 85 dtex, 24-filament polymer alloy fiber. The cross section of the fiber was observed under a TEM to find that N6 lower soluble in an alkali constituted islands, and the copolymerized PET easily soluble in an alkaline solution constituted a sea, in contrast to Comparative Example 4. The fiber showed significant uneven blending and contained some coarsely aggregated polymer particles, and the area ratio of islands each having a diameter of 200 nm or more to the total islands was 10%.

The article was subjected to alkali treatment by the procedure of Example 10 to remove the sea part copolymerized PET, to thereby obtain a fiber comprising ultrafine N6 fibers firmly bonded. The resulting fiber, however, could not be handled in practice and its strength could not be determined.

The polymer alloy fiber was treated with formic acid to dissolve off the islands parts N6. However, the copolymerized PET became markedly fragile, the resulting fiber fell into pieces and could not be handled in practice. The polymer alloy fiber did not substantially yield a porous fiber and could not achieve the objects of the present invention.

Comparative Example 7

A copolymerized PET having an intrinsic viscosity of 0.60 and being copolymerized with ethylene naphthalate in an amount of 10% by mole to the total acid component, and 70% by weight of a copolymerized PET copolymerized with a polyether imide ("ULTEM"-1000 available from General Electric Company) were kneaded using a twin screw extrusion-kneader having a diameter of 30 mm at 320° C. The resulting polymer alloy chip was fully dried and was subjected to melt spinning at a number of spinneret orifices of 6, a discharge rate per single orifice of 0.6 g per minute, a spinning temperature of 315° C. and a spinning rate of 500 meters per minute. The spinning temperature was excessively higher than the melting point of the sea part copolymerized PET, which invited unstable spinning and poor spinnability with ten yarn breakings during spinning for twelve hours. The resulting nominal undrawn yarn was drawn at a temperature of a preheating roller of 90° C., a temperature of a hot plate of 120° C. and a draw ratio of 3.0, resulted in frequent yarn breakings. The resulting drawn yarn had a strength as low as 1.3 cN/dtex. This is probably because the kneading temperature and the spinning temperature were excessively high for the copolymerized PET serving as a major component, and the polymer was deteriorated due to thermal decomposition. This article showed a very insufficient U % of 16%.

A plain fabric was prepared by using the copolymerized PET alloy fiber as a warp and a weft, which caused frequent yarn breakings and fluffing and resulted in a woven fabric exhibiting very poor processability and inferior appearance quality. The woven fabric was treated with a 6% by weight aqueous sodium hydroxide solution at 90° C. for 2 hours, to obtain a spongy fiber. This fiber, however, had a markedly low strength of 0.3 cN/dtex. This is probably because the copolymerized PET underwent thermal degradation and, in addition, fell into pieces due to the long-term treatment with a high concentration alkali.

As is described above, yarns having a high strength and exhibiting less yarn unevenness cannot be obtained satisfactorily unless suitable kneading and spinning conditions for the used polymers are set. In addition, a small different in solubility between the higher soluble polymer and the lower soluble polymer invites low strength.

Thus, practically usable fibers can be obtained only by optimizing the kneading, spinning and dissolving conditions for individual polymers.

TABLE 5

|  | Average pore diameter (nm) | Area ratio of coarse pores 1 (%) | Area ratio of coarse pores 2 (%) | Strength (cN/dtex) | ΔMR (%) | Color property |
|---|---|---|---|---|---|---|
| Example 14 | 20 or less | 0 | 0 | 2.5 | 5.8 | Excellent |
| Example 15 | 20 or less | 0 | 0 | 2.0 | 4.8 | Excellent |
| Example 16 | 45 | 0.5 | — | 2.0 | 5.1 | Good |
| Example 17 | 30 | 0 | 0 | 2.0 | 5.3 | Excellent |
| Example 18 | 30 | 0 | 0 | 3.3 | 5.0 | Excellent |
| Comparative Example 3 | — | 5.0 | — | 1.4 | 2.4 | Failure |
| Comparative Example 4 | — | 2.4 | — | 1.3 | 2.3 | Failure |
| Comparative Example 5 | — | 4.6 | — | 1.3 | 2.3 | Failure |
| Comparative Example 6 | — | — | — | — | — | — |

Average pore diameter: Average pore diameter estimated based on TEM observation
Area ratio of coarse pores 1: Area ratio of pores having a diameter of 200 nm or more to the total fiber
Area ratio of coarse pores 2: Area ratio of pores having a diameter of 50 nm or more to the total fiber

TABLE 6

|  | Sea-part polymer Type | Sea-part polymer wt % | Islands-part polymer | Ratio in viscosity between sea and islands | Kneading procedure | Area ratio (%) | Average diameter of islands (nm) | Spinnability | Strength (cN/dtex) | U % (%) | Thermal shrinkage (%) |
|---|---|---|---|---|---|---|---|---|---|---|---|
| Example 14 | N6 | 80 | PET1 | 1.1 | EXT | 0.1 or less | 18 | Good | 4.1 | 1.2 | 12 |
| Example 15 | N6 | 50 | PET2 | 0.2 | EXT | 0.1 or less | 25 | Good | 3.1 | 1.8 | 12 |
| Example 16 | N6 | 50 | PET3 | 0.3 | EXT | 5 | 143 | Fair | 3.3 | 2.5 | 10 |
| Example 17 | N6 | 80 | PAO | 0.3 | EXT | 1.3 | 80 | Good | 3.5 | 1.5 | 12 |
| Example 18 | N6 | 80 | PLA | 0.7 | EXT | 0.1 or less | 80 | Good | 4.0 | 1.3 | 12 |
| Comparative Example 3 | N6 | 50 | PET4 | 0.9 | chip | 10 | 150 | Failure | — | 10 | — |
| Comparative Example 4 | N6 | 70 | PET5 | 0.9 | chip | 8 | 125 | Failure | — | 9.1 | — |

TABLE 6-continued

| | Sea-part polymer | | Islands-part | Ratio in viscosity between sea and islands | Kneading procedure | Area ratio (%) | Average diameter of islands (nm) | Spinnability | Strength (cN/dtex) | U % (%) | Thermal shrinkage (%) |
|---|---|---|---|---|---|---|---|---|---|---|---|
| | Type | wt % | polymer | | | | | | | | |
| Comparative Example 5 | N6 | 77 | PET6 | 0.9 | chip | 14 | 80 | Failure | 2.7 | 9.3 | — |
| Comparative Example 6 | PET4 | 75 | N6 | 1.1 | chip | 10 | — | Failure | — | 11 | — |

Area ratio: Area ratio of coarsely aggregated polymer particles having a diameter of 200 nm or more to the total islands
PET1: PET copolymerized with 5% by mole of 5-sodiosulfoisophthalic acid
PET2: PET copolymerized with 12% by mole of 5-sodiosulfoisophthalic acid and 26% by mole of isophthalic acid
PET3: PET copolymerized with 7% by mole of isophthalic acid and 4% by mole of an ethylene oxide adduct of bisphenol A
PET4: PET copolymerized with 2.5% by mole of 5-sodiosulfoisophthalic acid and 3.5% by mole of an ethylene oxide adduct of bisphenol A
PET5: PET copolymerized with 4.5% by mole of 5-sodiosulfoisophthalic acid and 8.5% by weight of PEG 4000
PET6: Homopolyethylene terephthalate
PAO: Polyalkylene oxide modified product (polymer soluble in hot water)
EXT: Twin-screw extrusion-kneader
Chip: Chip blending Example 19

The melt spinning and draw thermal treatment procedure of Example 8 was repeated, except for using N66 instead of N6, setting the spinning temperature at 280° C., and using 80% by weight of N66 and 20% by weight of the copolymerized PET. The yarn could be satisfactorily spun without any yarn breaking during continuous spinning for 24 hours. The cross section of the polymer alloy fiber was observed under a TEM, to find that the fiber was free from coarsely aggregated polymer particles, the area ratio of islands each having a diameter of 200 nm or more to the total islands was 0.1% or less, and the area ratio of islands each having a diameter of 100 nm or more was 1% or less. The TEM observation of the longitudinal section of the fiber shows that the islands has a lined structure. The yarn had excellent physical properties as shown in Table 8.

The polymer alloy fiber was subjected to circular knitting and alkali treatment by the procedure of Example 10, to remove 99% or more of the copolymerized PET, to thereby obtain a round braid comprising a nanoporous N66 fiber.

The cross section of the nanoporous N66 fiber was observed under a TEM, to find that the pores were unconnected pores, the average diameter of the pores was 10 to 20 nm and were free from coarse pores each having a diameter of 50 nm or more.

The round braid comprising the nanoporous N66 fiber was dyed and was found to have excellent color property. The nanoporous N66 fiber had excellent physical properties as shown in Table 7.

Example 20

Figure 25:
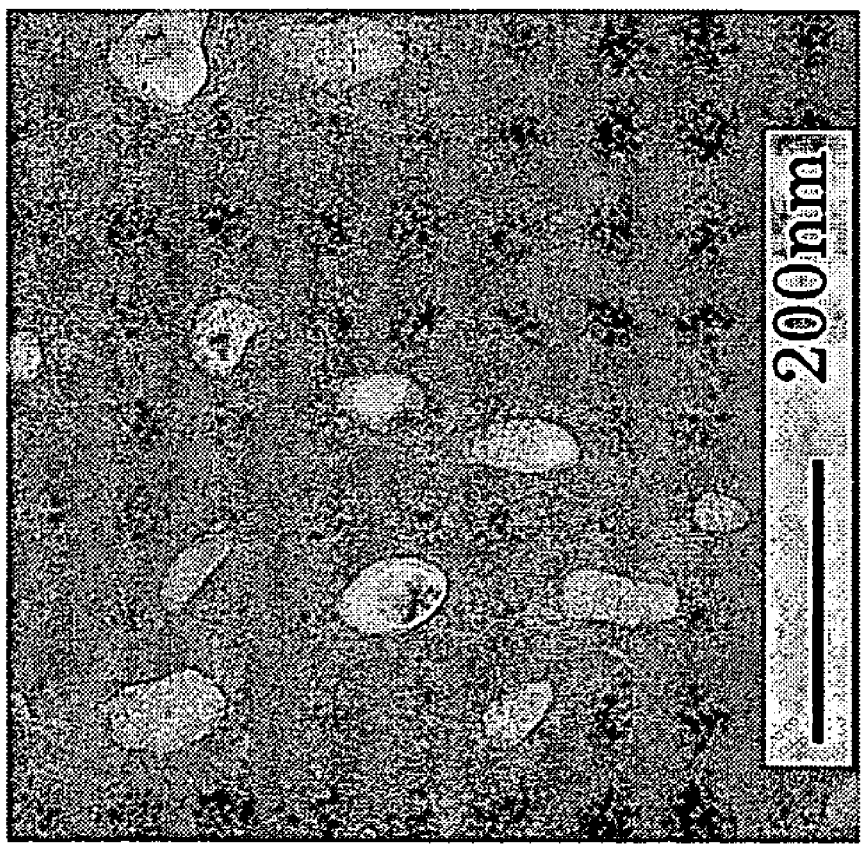
FIG. 25 is a transmission electron micrograph showing an example of a cross section of a polymer alloy fiber according to after-mentioned Example 19 of the present invention.

A total of 80% by weight of a homopolyethylene terephthalate having a melting point of 255° C., an intrinsic viscosity of 0.63 and a melt viscosity of 830 poises (280° C., 2432 sec$^{-1}$) and 20% by weight of the polymer soluble in hot water used in Example 17 were subjected to melt kneading at 275° C. using a twin-screw extrusion-kneader by the procedure of Example 1, to thereby obtain polymer alloy pellets having b* of 3.2. The kneaded product was subjected to melt spinning by the procedure of Example 10, except for setting the temperature of the melting section 2 at 280° C. and the spinning temperature at 280° C. and changing the discharge rate per orifice and the number of spinneret orifices. The fiber showed good spinnability and did not cause yarn breaking during continuous spinning for 24 hours. The article was then subjected to draw thermal treatment by the procedure of Example 10, except for setting the temperature of the first hot roller 24 at 90° C., to obtain a 90 dtex, 36-filament polymer alloy fiber having a strength of 3.3 cN/dtex, an elongation percentage of 40%, a U % of 1.5% and a thermal shrinkage of 7%. The cross section of the polymer alloy fiber was observed under a TEM (FIG. 25), to find that the fiber was free from coarsely aggregated polymer particles, the area ratio of islands each having a diameter of 200 nm or more to the total islands was 0.1% or less, and the area ratio of islands each having a diameter of 100 nm or more was 0.1% or less. The dark region corresponds to the PET, and the bright regions correspond to the polymer soluble in hot water. The TEM observation of the longitudinal section of the fiber shows that the islands has a lined structure. The yarn had excellent physical properties as shown in Table 8.

The polymer alloy fiber was subjected to circular knitting by the procedure of Example 8 and treated with hot water at 100° C. for one hour to remove 99% or more of the polymer soluble in hot water, to thereby obtain a round braid comprising a nanoporous PET fiber.

Figure 26:
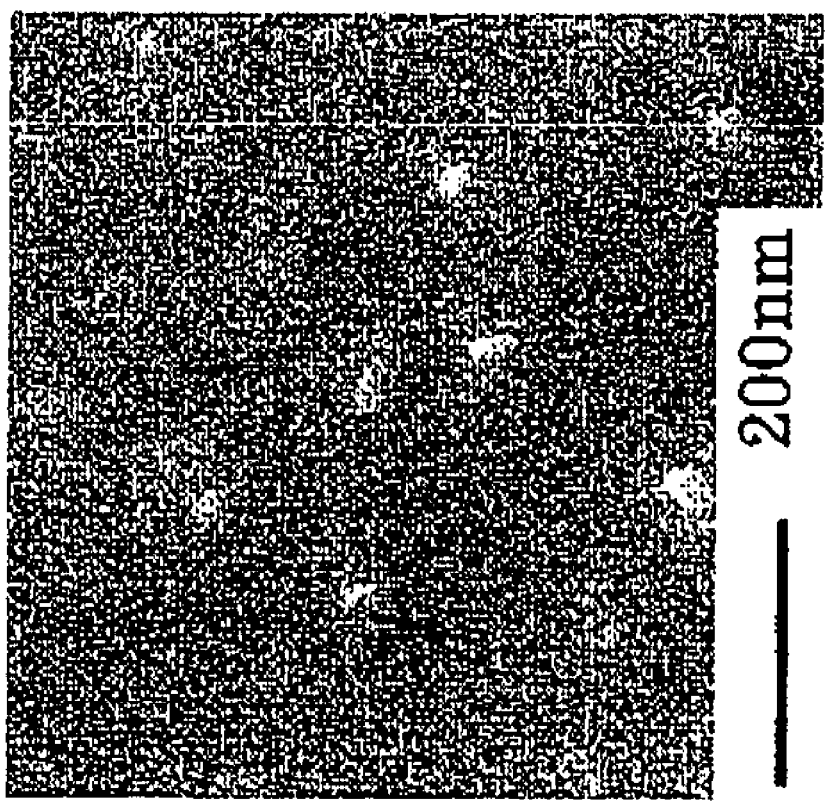
FIG. 26 is a transmission electron micrograph showing an example of a cross section of a nanoporous fiber according to after-mentioned Example 19 of the present invention.

The cross section of the nanoporous PET fiber was observed under a TEM (FIG. 26), to find that the average diameter of the pores was 20 nm and were free from coarse pores each having a diameter of 50 nm or more. In the figure, the dark region corresponds to the PET, and the bright regions correspond to pores, and the pores are unconnected pores. The physical properties of the nanoporous fiber are shown in Table 7.

The round braid comprising the nanoporous PET fiber was dyed and was found to have excellent color property.

Example 21

The melt kneading procedure of Example 20 was repeated, except for changing the temperature at 255° C. and using, instead of the homopolyethylene terephthalate, a copolymerized PET being copolymerized with 8% by weight of PEG 1000 and 7% by mole of isophthalic acid and having a melting point of 235° C., an intrinsic viscosity of 0.65 and a melt viscosity of 920 poises (280° C., 2432 sec$^{-1}$)). The resulting polymer alloy pellets had b* of 3.8. The pellets were subjected to melt spinning by the procedure of Example 19, except for setting the temperature of the melting section 2 at 255° C., the spinning temperature at 255° C., and using a spinneret having orifices with a Y-shaped profile. The pellets showed good spinnability and did not cause yarn breaking during continuous spinning for 24 hours. The kneaded product was subjected to draw thermal treatment by the procedure of Example 20 to thereby obtain a polymer alloy fiber having a trefoil profile. The cross section of the polymer alloy fiber was observed under a TEM, to find that the fiber was free from coarsely aggregated polymer particles, the area ratio of islands each having a diameter of 200 nm or more to the total islands was 0.1% or less, and the area ratio of islands each having a diameter of 100 nm or more was 1% or less. The TEM observation of the longitudinal section of the fiber shows that the islands has a lined structure. The yarn had excellent physical properties as shown in Table 8.

The polymer alloy fiber was subjected to circular knitting by the procedure of Example 20 and treated with hot water at 100° C. for one hour to remove 99% or more of the polymer soluble in hot water, to thereby obtain a round braid comprising a nanoporous PET fiber.

The cross section of the nanoporous PET fiber was observed under a TEM, to find that the average diameter of the pores was 20 nm and were free from coarse pores each having a diameter of 50 nm or more. The TEM observation shows that the pores are unconnected pores. The physical properties of the nanoporous fiber are shown in Table 7.

The round braid comprising the nanoporous PET fiber was dyed and was found to have excellent color property.

Examples 22 and 23

Materials were subjected to melt kneading, melt spinning and draw thermal treatment by the procedure of Example 20, except for using, instead of the copolymerized PET, a polytrimethylene terephthalate (PTT) having a melting point of 220° C. and a melt viscosity of 1290 poises (280° C., 2432 sec$^{-1}$) or a polybutylene terephthalate (PBT) having a melting point of 220° C. and a melt viscosity of 550 poises (280° C., 2432 sec$^{1}$). The cross sections of the polymer alloy fibers were observed under a TEM, to find that the fibers were free from coarsely aggregated polymer particles, the area ratio of islands each having a diameter of 200 nm or more to the total islands was 0.1% or less, and the area ratio of islands each having a diameter of 100 nm or more was 1% or less. The TEM observation of the longitudinal sections of the fibers shows that the islands has a lined structure. The yarns had excellent physical properties as shown in Table 8.

The polymer alloy fibers were subjected to circular knitting by the procedure of Example 20 and treated with hot water at 100° C. for one hour to remove 99% or more of the polymer soluble in hot water, to thereby obtain round braid each comprising a nanoporous polyester fiber.

The cross sections of the nanoporous polyester fibers were observed under a TEM, to find that the average diameter of the pores was 20 nm and were free from coarse pores each having a diameter of 50 nm or more. The TEM observation shows that the pores are unconnected pores. The physical properties of the nanoporous fibers are shown in Table 7.

The round braids comprising the nanoporous polyester fibers were dyed and were found to have excellent color property.

Example 24

Materials were subjected to melt kneading by the procedure of Example 20, except for using, instead of the PET, the polylactic acid (PLA) used in Example 18 and setting the melting temperature at 220° C. The kneaded product was subjected to melt spinning by the procedure of Example 20, except for setting the temperature of the melting section 2 at 220° C. and the spinning temperature at 220° C. In this procedure, the article could be spun satisfactorily without any yarn breaking during continuous spinning for 24 hours. The resulting article was subjected to drawing and thermal treatment by the procedure of Example 10, except for setting the temperature of the first hot roller 16 at 90° C. The cross section of the polymer alloy fiber was observed under a TEM, to find that the fiber was free from coarsely aggregated polymer particles, the area ratio of islands each having a diameter of 200 nm or more to the total islands was 0.1% or less, and the area ratio of islands each having a diameter of 100 nm or more was 1% or less. The TEM observation of the longitudinal section of the fiber shows that the islands has a lined structure. The yarn had excellent physical properties as shown in Table 8.

The polymer alloy fiber was subjected to circular knitting by the procedure of Example 20 and treated with hot water at 100° C. for one hour to remove 99% or more of the polymer soluble in hot water, to thereby obtain a round braid comprising a nanoporous PLA fiber.

The cross section of the nanoporous PLA fiber was observed under a TEM, to find that the pores were unconnected pores, have an average diameter of 20 nm and were free from coarse pores each having a diameter of 50 nm or more. The physical properties of the nanoporous fiber are shown in Table 7.

The round braid comprising the nanoporous PLA fiber was dyed and was found to have excellent color property. Regular PLAs do not satisfactorily take up dyes, but the nonporous PLA fiber exhibits an improved uptake of dyes and shows higher color property than regular PLA fibers. In addition, the nanoporous PLA fiber has an increased surface area and thereby shows an increased rate of biodegradation as compared with regular PLA fibers and is optimal for medical applications in which rapid bioabsorptivity is required.

Examples 25 and 26

Materials were subjected to melt kneading, melt spinning, draw thermal treatment by the procedure of Example 20, except for using, instead of the PLA, a polypropylene (PP) or a polymethyl methacrylate (hereinafter may be referred to as "PMMA"). The cross sections of the resulting polymer alloy fibers were observed under a TEM, to find that the fibers were free from coarsely aggregated polymer particles, and the area ratios of islands each having a diameter of 200 nm or more to the total islands were 1.2% and 0.8%, respectively. The TEM observation of the longitudinal section of the fiber shows that the islands has a lined structure. The yarn had excellent physical properties as shown in Table 8.

The polymer alloy fiber was subjected to circular knitting by the procedure of Example 20 and treated with hot water at 100° C. for one hour to remove 99% or more of the polymer soluble in hot water, to thereby obtain round braids comprising a nanoporous PP fiber or a nanoporous PMMA fiber. The pores in these fibers were connected pores. The physical properties of the nanoporous fibers are shown in Table 7.

Example 27

Materials were subjected to melt kneading by the procedure of Example 20, except for using, instead of the PET, a polymethylpentene (hereinafter may be referred to as "PMP") and setting the melting temperature at 255° C. The kneaded product was subjected to melt spinning by the procedure of Example 20, except for setting the temperature of the melting section 2 at 255° C. and the spinning temperature at 255° C. In this procedure, the article could be spun satisfactorily without any yarn breaking during continuous spinning for 24 hours. The resulting article was subjected to drawing and thermal treatment by the procedure of Example 10, except for setting the temperature of the first hot roller 24 at 90° C. The cross section of the polymer alloy fiber was observed under a TEM, to find that the fiber was free from coarsely aggregated polymer particles, and the area ratio of islands each having a diameter of 200 nm or more to the total islands was 1.0%. The TEM observation of the longitudinal section of the fiber shows that the islands has a lined structure. The yarn had excellent physical properties as shown in Table 8.

The polymer alloy fiber was subjected to circular knitting by the procedure of Example 20 and treated with hot water at 100° C. for one hour to remove 99% or more of the polymer soluble in hot water, to thereby obtain a round braid comprising a nanoporous PMP fiber.

The cross section of the nanoporous PMP fiber was observed under a TEM, to find that the pores were unconnected pores, had an average diameter of 35 nm, and the area ratio of coarse pores each having a diameter of 50 nm or more to the total pores was 0.6%. The physical properties of the nanoporous fiber are shown in Table 7.

Example 28

Materials were subjected to melt kneading by the procedure of Example 20, except for using, instead of the PET and the polymer soluble in hot water, a polyphenylene sulfide (hereinafter may be referred to as "PPS") and the N6 used in Example 1, respectively, using PPS in an amount of 90% by weight, and setting the temperature at 305° C. The kneaded product was subjected to melt spinning by the procedure of Example 20, except for setting the temperature of the melting section 2 at 305° C. and the spinning temperature at 305° C. and changing the discharge rate per one orifice and the number of spinneret orifices. Broken end occurred twice during continuous spinning for 24 hours. The resulting article was subjected to drawing and thermal treatment by the procedure of Example 10, except for setting the temperature of the first hot roller 24 at 90° C., to obtain a 150 dtex, 48-filament polymer alloy fiber. The cross section of the polymer alloy fiber was observed under a TEM, to find that the fiber was free from coarsely aggregated polymer particles, and the area ratio of islands each having a diameter of 200 nm or more to the total islands was 1.5%. The TEM observation of the longitudinal section of the fiber shows that the islands has a lined structure. The yarn had excellent physical properties as shown in Table 8.

The polymer alloy fiber was subjected to circular knitting by the procedure of Example 20 and treated with formic acid for 2 hours to remove 99% or more of the N6, to thereby obtain a round braid comprising a nanoporous PPS fiber. The pores were unconnected pores. The physical properties of the nanoporous fiber are shown in Table 7.

TABLE 7

| | Average pore diameter (nm) | Area ratio of coarse pores 1 (%) | Area ratio of coarse pores 2 (%) | Strength (cN/dtex) | Color property |
|---|---|---|---|---|---|
| Example 19 | 20 or less | 0 | 0 | 2.2 | Excellent |
| Example 20 | 20 | 0 | 0 | 2.0 | Excellent |
| Example 21 | 20 | 0 | 0 | 2.0 | Excellent |
| Example 22 | 20 | 0 | 0 | 2.0 | Excellent |
| Example 23 | 20 | 0 | 0 | 2.0 | Excellent |
| Example 24 | 20 | 0 | 0 | 2.0 | Excellent |
| Example 25 | 38 | 0 | 0.8 | 1.8 | — |
| Example 26 | 32 | 0 | 0.6 | 1.5 | — |
| Example 27 | 35 | 0 | 0.6 | 1.7 | — |
| Example 28 | 50 | 1.4 | — | 3.6 | — |

Average pore diameter: Average pore diameter estimated based on TEM observation
Area ratio of coarse pores 1: Area ratio of pores having a diameter of 200 nm or more to the total fiber
Area ratio of coarse pores 2: Area ratio of pores having a diameter of 50 nm or more to the total fiber

TABLE 8

| | Sea-part polymer Type | wt % | Islands-part polymer | Ratio in viscosity between sea and islands | Kneading procedure | Area ratio (%) | Average diameter of islands (nm) | Spinnability | Strength (cN/dtex) | U % (%) | Thermal shrinkage (%) |
|---|---|---|---|---|---|---|---|---|---|---|---|
| Example 19 | N66 | 80 | PET1 | 0.9 | Static | 0.1 or less | 33 | Good | 4.1 | 1.2 | 13 |
| Example 20 | PET7 | 80 | PAO | 0.9 | EXT | 0.1 or less | 40 | Good | 3.3 | 1.5 | 7 |
| Example 21 | PET8 | 80 | PAO | 1.0 | EXT | 0.1 or less | 38 | Good | 3.4 | 1.5 | 9 |
| Example 22 | PTT | 80 | PAO | 1.4 | EXT | 0.1 or less | 34 | Good | 3.1 | 1.7 | 10 |
| Example 23 | PBT | 80 | PAO | 0.6 | EXT | 0.1 or less | 45 | Good | 3.1 | 1.8 | 9 |
| Example 24 | PLA | 80 | PAO | 0.6 | EXT | 0.1 or less | 35 | Good | 2.9 | 1.8 | 9 |
| Example 25 | PP | 80 | PAO | 1.0 | EXT | 1.2 | 40 | Good | 2.7 | 2.2 | 6 |
| Example 26 | PMMA | 80 | PAO | 1.0 | EXT | 0.8 | 35 | Good | 2.5 | 2.4 | — |
| Example 27 | PMP | 80 | PAO | 1.0 | EXT | 1.0 | 38 | Good | 2.6 | 2.3 | 9 |
| Example 28 | PPS | 90 | N6 | 1.0 | EXT | 1.5 | 52 | Fair | 5.3 | 2.1 | — |

Area ratio: Area ratio of coarsely aggregated polymer particles having a diameter of 200 nm or more to the total islands
PET7: Homopolyethylene terephthalate ($\eta$ = 0.63)
PET8: PET copolymerized with 8% by weight of PEG 1000 and 7% by mole of isophthalic acid
PAO: Polyalkylene oxide modified product (polymer soluble in hot water)
EXT: Twin-screw extrusion-kneader
Static: Static mixer (104 × $10^4$ splits)

Example 29

Materials were subjected to melt spinning and draw false-twisting by the procedure of Example 1, except for changing the number of spinneret orifices and the discharge rate, to thereby obtain a 95 dtex, 68-filament false-twisted yarn of N6/copolymerized PET alloy. This yarn had excellent physical properties of a strength of 2.7 cN/dtex, an elongation percentage of 22%, a thermal shrinkage of 8%, a U % of 1.0% and a CR of 38%, and was free from not-untwisted portions and had good crimping quality. The cross section of the crimped polymer alloy yarn was observed under a TEM to find that the yarn had an islands-in-sea structure comprising N6 as a sea (dark region) and the copolymerized PET as islands (bright region). The islands had an average diameter of 25 nm, showing that the polymer alloy fiber comprised the copolymerized PET ultrafinely dispersed. The area ratio of islands each having a diameter of 200 nm or more to the total islands was 0.1% or less, and the area ratio of islands each having a diameter of 100 nm or more was 0.9%. The islands were dispersed as lines. A polyurethane fiber yarn "LYCRA" (registered trademark) available from OPELONTEX CO., LTD. was covered with this as a sheath yarn. The covered yarn was formed into a knit fabric for tights and was subjected to alkali treatment by the procedure of Example 1, to thereby obtain a knit fabric for tights comprising a nanoporous N6 fiber. The knit fabric for tights had a METSUKE (mass per unit area) of 100 g/m$^2$ and contained 95% by weight of the nanoporous N6 fiber and 5% by weight of the polyurethane fiber yarn. This was subjected to treatment with silicone and fabric massaging. The knit fabric for tights was sawn to obtain tights. The TEM observation of the nanoporous N6 fiber sampled from the tights shows that the fiber was free from coarse pores having a diameter of 50 nm or more, and the average diameter of the pores was 25 nm. The pores were unconnected pores. The yarn strength was 2.5 cN/dtex. The tights had good color property and a high ΔMR of 5.6%, exhibited a delicate touch and fresh hands like a skin and felt good to wear. The combination use of the polyurethane fiber yarn imparts high stretchability and improves dimensional stability of the tights upon washing.

Example 30

"LYCRA" was covered by the procedure of Example 28 with the polymer alloy fiber prepared according to Example 6. The resulting yarn was formed into a short panty. The TEM observation of the nanoporous N6 fiber sampled from the short panty shows that the fiber was free from coarse pores having a diameter of 50 nm or more, and the average diameter of the pores was 25 nm. The pores were unconnected pores. The yarn strength was 2.5 cN/dtex. The short panty had good color property and a high ΔMR of 5.6%, exhibited a delicate touch and fresh hands like a skin and felt good to wear. The short panty had an ammonia adsorbing rate of 55%. The combination use of the polyurethane fiber yarn imparts high stretchability and improves dimensional stability of the short panty upon washing.

Example 31

Materials were subjected to melt spinning by the procedure of Example 1, except for changing the discharge rate per orifice and the number of orifices, to obtain a 400 dtex, 96-filament fiber of a N6/copolymerized PET polymer alloy. The polymer alloy fiber had a strength of 2.5 cN/dtex, an elongation percentage of 100% and a U % of 1.2%. The cross section of the highly oriented undrawn polymer alloy yarn was observed under a TEM, to find that the fiber was free from coarsely aggregated polymer particles, the area ratio of islands each having a diameter of 200 nm or more to the total islands was 0.1% or less, the area ratio of islands each having a diameter of 100 nm or more to the total islands was 1% or less, and the islands had an average diameter of 33 nm. This article was subjected to draw false-twisting using a device shown in FIG. 29 by the procedure of Example 6, to obtain a 333 dtex, 96-filament false-twisted yarn. The resulting false-twisted yarn had a strength of 3.0 cN/dtex, an elongation percentage of 30%, a U % of 1.5% and a CR of 33%. The cross section of the fiber of the crimped polymer alloy yarn was observed under a TEM, to find that the fiber was free from coarsely aggregated polymer particles, the area ratio of islands each having a diameter of 200 nm or more to the total islands was 0.1% or less, and the area ratio of islands each having a diameter of 100 nm or more was 0.1% or less. The islands had an average diameter of 27 nm and had a lined structure.

The false-twisted yarn was subjected to soft twisting of 300 turns per meter and used as warp and weft in an S-twist/Z-twist two ply yarn to thereby obtain a 2/2 twill woven fabric. The twill woven fabric was subjected to an alkali treatment by the procedure of Example 6, to thereby obtain a drapery fabric comprising a nanoporous N6 fiber and having a METSUKE (mass per unit area) of 150 g/m$^2$. The TEM observation of the nanoporous N6 fiber sampled from the drapery fabric shows that the fiber was free from coarse pores having a diameter of 50 nm or more, and the average diameter of the pores was 25 nm. The pores were unconnected pores. The yarn strength was 2.5 cN/dtex.

The resulting curtain had good color property and a high ratio of moisture adsorption (ΔMR) of 5.5%, indicating sufficient hygroscopicity. A curtain was prepared from this fabric and was hanged in a six-mat tatami room. The curtain served to make a fresh indoor environment by preventing dewing due to its high hygroscopicity and adsorbing malodor gases. Thus, the nanoporous fibers of the present invention are suitable for products for interior with better responsibility to environments than that of conventional equivalents. The curtain was washed and dewatered in a washing net using a domestic washer but did not lose its shape, showing that the curtain had good dimensional stability in spite of its high hygroscopicity and high water adsorptivity, in contrast to rayon curtains.

Example 32

Materials were subjected to melt spinning by the procedure of Example 10, except for changing the discharge rate per orifice and the number of orifices and using Y-shaped discharge orifices. The spun yarn was wound at a rate of 900 meters per minute, subjected to two-step drawing at a draw ratio in the first step of 1.3 and a total draw ratio of 3.5, crimped by using jet nozzles and wound as a 500 dtex, 90-filament bulked yarn having 9 crimps per 25 mm. The bulked yarn had a strength of 5.0 cN/dtex and an elongation percentage of 25%. The cross section of the fiber of the crimped polymer alloy yarn was observed under a TEM, to find that the fiber was free from coarsely aggregated polymer particles, the area ratio of islands each having a diameter of 200 nm or more to the total islands was 0.1% or less, and the area ratio of islands each having a diameter of 100 nm or more was 1% or less. The islands had an average diameter of 30 nm and had a lined structure.

Two plies of the resulting bulked yarn were doubled and subjected to first twisting (200 T/m), and two plies of the first-twisted yarn were secondarily twisted (200 T/m), subjected to twist setting by dry heating at 170° C. and tufted into a cut-pile carpet according to a conventional procedure.

The tufting herein was carried out according to a regular level cut by controlling the stitch so as to have a gauge of 1/10 and a METSUKE (mass per unit area) of 1500 g/m$^2$. The tufted article was then subjected to backing. In the tufting, a woven base fabric using a blended yarn of an acrylic fiber and a polyester fiber was used as the base fabric. Only the cut-pile portion was subjected to alkali treatment, to allow the cut-pile portion to be a nanoporous N6 fiber. This was observed under a TEM and was found to be free from coarse pores having a diameter of 50 nm or more, in which the average diameter of the pores was 30 nm. The pores were unconnected pores. The cut pile drawn therefrom had a strength of 2.0 cN/dtex. The cut-pile portion had good color property and a high ΔMR of 5.3%, i.e., sufficient hygroscopicity and could yield a fresh indoor environment as the curtain according to Example 31.

Example 33

Materials were spun by the procedure of Example 10, except for changing the spinneret and the discharge rate per orifice, the resulting yarn was wound by the first take-up roller 8, doubled and received by a bunker. The yarns in the bunker were subjected to gathering to obtain a tow of 15×10$^4$ dtex. The tow was drawn in a water tank at 90° C. at a draw ratio of 3.2. The drawn tow was passed through a crimper, to which an oil was fed, and was cut. The resulting cut fiber had a single yarn fineness of 4 dtex, number of crimp of 10 per 25 mm and a fiber length of 51 mm. The cut fiber had a strength of 3.3 cN/dtex and an elongation percentage of 40%. The cross section of the fiber was observed under a TEM, to find that the fiber was free from coarsely aggregated polymer particles, the area ratio of islands each having a diameter of 200 nm or more to the total islands was 0.1% or less, the area ratio of islands each having a diameter of 100 nm or more was 1% or less. The islands had an average diameter of 33 nm and had a lined structure.

The cut fiber was separated using a carding machine and was formed into a web using a cross lap weaver. The article was then subjected to needle punching (1500/cm$^2$) to obtain a fiber entangled nonwoven fabric of 150 g/m$^2$. The nonwoven fabric was subjected to alkali treatment by the procedure of Example 10, to thereby obtain a nonwoven fabric comprising a nanoporous N6 fiber. The nanoporous fiber sampled from the nonwoven fabric was observed under a TEM and was found that the fiber was free from coarse pores having a diameter of 50 nm or more, and the average diameter of the pores was 30 nm. The pores were unconnected pores. The cut fiber itself was subjected to alkali treatment and was converted into a nanoporous fiber. The resulting nanoporous fiber had a strength of 2 cN/dtex. The nonwoven fabric had good color property and high hygroscopicity in terms of ΔMR of 5.8%.

Example 34

The cut fiber comprising the polymer alloy prepared according to Example 33 was spun to obtain a spun polymer alloy yarn. By using this as a warp and weft, a plain fabric having a METSUKE (mass per unit area) of 150 g/m$^2$ was prepared. The plain fabric was subjected to alkali treatment by the procedure of Example 10, to obtain a fabric comprising a nanoporous N6 fiber. The TEM observation of the nanoporous fiber sampled from the fabric shows that the fiber was free from coarse pores having a diameter of 50 nm or more, and the average diameter of the pores was 30 nm. The pores were unconnected pores. The spun yarn of the nanoporous fiber sampled from the fabric had a strength of 2.0 cN/dtex. The fabric had good color property, exhibited sufficient hygroscopicity in terms of ΔMR of 5.8% and good color property.

Example 35

A nonwoven fabric comprising a polymer alloy fiber and having a METSUKE (mass per unit area) of 35 g/m$^2$ was prepared by spinning in the same manner as in Example 25, taking a yarn by an air sucker, separating fibers and collecting on a net, and subjecting the collected yarn to calendar rolling. The fiber taken by the air sucker had a single yarn fineness of 2 dtex. The spinning rate determined based on the fineness was 4500 meters per minute. The cross section of the polymer alloy fiber sampled from the nonwoven fabric was observed under a TEM, to find that the fiber was free from coarsely aggregated polymer particles, the area ratio of islands each having a diameter of 200 nm or more to the total islands was 0.1% or less, and the area ratio of islands each having a diameter of 100 nm or more was 1% or less. The islands had an average diameter of 31 nm and had a lined structure.

The nonwoven fabric was subjected to treatment with hot water to thereby obtain a nonwoven fabric comprising a nanoporous PP fiber and having excellent water adsorptivity. The nanoporous fiber was sampled from the nonwoven fabric and was observed under a TEM to find that the fiber was free from coarse pores having a diameter of 50 nm or more had unconnected pores as pores having an average diameter of 30 nm. As is described above, the nanoporous fibers of the present invention are optimal for yielding unprecedented high-performance nonwoven fabrics.

Example 36

Figure 27:
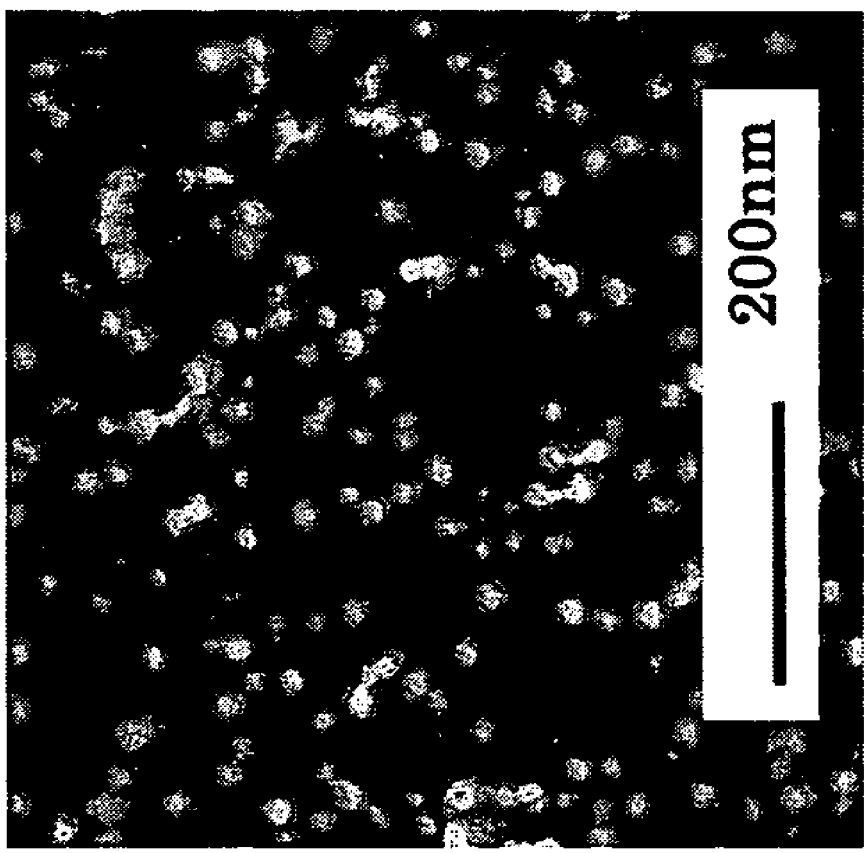
FIG. 27 is a transmission electron micrograph showing an example of a cross section of a polymer alloy fiber according to after-mentioned Example 35 of the present invention.

Materials were subjected to melt spinning by the procedure of Example 1, except for changing the discharge rate and the number of spinneret orifices. Thus, 10 kg of a highly oriented undrawn yarn was wound. The yarn comprised a polymer alloy of 90 dtex, 68 filaments having a strength of 2.7 cN/dtex, an elongation percentage of 100% and a U % of 1.3%. The cross section of the polymer alloy fiber was observed under a TEM to find that a copolymerized PET was homogeneously dispersed with size on the order of nanometers as particles having an average diameter of 20 nm, the area ratio of coarse islands each having a diameter of 200 nm or more was 0.1% or less, and the area ratio of islands each having a diameter of 100 nm or more was 1% or less (FIG. 27). The observation of the longitudinal section shows that the copolymerized PET had a lined structure.

The package had a good shape without saddle or yarns dropping at a side of a cheese package. The package showed less water swelling than articles comprising regular nylon fibers, and was free from package deformation with time and had good dimensional stability. A highly oriented undrawn yarn comprising a regular nylon undergoes water swelling during winding, cannot be stably wound and fails to obtain a package comprising a highly oriented undrawn yarn and having an elongation percentage of 70% to 200%. The nylon yarn cannot be subjected to combined false twisting as in PET. In contrast, the nylon polymer alloy fibers of the present invention can stably yield a wound highly oriented undrawn yarn having an elongation percentage of 70% to 200% and can thereby be subjected to various yarn processing.

Comparative Example 8

The N6 used in Example 1 alone was subjected to melt spinning by the procedure of Example 36. However, the resulting yarn swelled as a result of water adsorption and elongated during winding, which invited unstable winding and frequent burst of yarn.

Example 37

The highly oriented undrawn yarn prepared according to Example 36 and a 70 dtex, 34-filament regular drawn N6 yarn being prepared separately and having a strength of 6 cN/dtex and an elongation percentage of 45% were subjected to combined false-twisting at a draw ratio of 1.02 and a heater temperature of 165° C. The resulting combined false-twisted yarn having a CR of 25% was subjected to the procedure of Example 1 to form a round braid, and the round braid was subjected to alkali treatment.

The nanoporous N6 fiber was sampled from the resulting round braid was observed under a TEM to find that the fiber was free from coarse pores having a diameter of 50 nm or more, and the average diameter of the pores was 10 to 20 nm, the yarn strength was 2.5 cN/dtex, and the pores were unconnected pores. The fabric had good color property and sufficient hygroscopicity in terms of ΔMR of 4.5% and showed excellent hands with a soft and delicate touch. Thus, fabrics having excellent hands and being optimum for clothing can be obtained by the combination use of the polymer alloy fiber of the present invention and other fibers.

In particular, conventional nylons do not yield highly oriented undrawn yarns having a high elongation to fail to provide further improved hands. In contrast, fabrics having excellent hands can be easily obtained according to the present invention, as is shown in this example.

Example 38

The polymer alloy fiber prepared according to Example 13 and a 70 dtex, 96-filament regular N6 fiber were subjected to air yarn mixing using an interlacing nozzle. A plain fabric having a METSUKE (mass per unit area) of 150 g/m² was prepared by using the resulting yarn as warp and weft, and subjected to alkali treatment by the procedure of Example 10 and thereby yielded a fabric comprising a nanoporous N6 fiber and a regular N6.

The nanoporous N6 fiber was observed under a TEM to find that the fiber was free from coarse pores having a diameter of 50 nm or more, the average diameter of the pores was 10 to 20 nm, the yarn strength was 3.3 cN/dtex, and the pores were unconnected pores. The fabric had good color property and sufficient hygroscopicity in terms of ΔMR of 4%. The fabric had excellent hands with a soft and delicate touch.

Example 39

A 2/2 twill woven fabric having a METSUKE (mass per unit area) of 150 g/m² by using the crimped polymer alloy yarn prepared according to Example 1 as a warp and a 72 dtex, 27-filament viscose rayon as a weft. The fabric was then subjected to alkali treatment by the procedure of Example 1.

The nanoporous N6 fiber was sampled from the resulting fabric and was observed under a TEM to find that the fiber was free from coarse pores having a diameter of 50 nm or more, the average diameter of the pores was 20 nm or less, and the yarn strength was 2.5 cN/dtex. The pores were unconnected pores. The fabric had good color property and sufficient hygroscopicity in terms of ΔMR of 7%. The fabric had excellent hands with a soft and delicate touch. Thus, the fabrics comprising the nanoporous fiber of the present invention in combination with other fibers have further improved hands and/or hygroscopicity and are optimum for fabrics for use in high-grade clothing.

Example 40

The polymer alloy cut fiber prepared according to Example 33 and cotton were subjected to spinning of mixed cut fibers in a weight ratio of 50%/50% to obtain a blended yarn containing a polymer alloy fiber. A plain fabric was prepared by the procedure of Example 34, except for using the blended yarn, and was subjected to alkali treatment by the procedure of Example 1. The fabric had good color property and sufficient hygroscopicity in terms of ΔMR of 4.8%.

The spun yarn comprising a nanoporous N6 fiber sampled from the fabric had a strength of 2.0 cN/dtex. The nanoporous N6 fiber was sampled and was observed under a TEM to find that the fiber was free from coarse pores having a diameter of 50 nm or more, and the average diameter of the pores was 30 nm. The pores were unconnected pores.

Example 41

The fabric comprising the nanoporous PET fiber prepared according to Example 20 was allowed to adsorb triphenyl phosphate serving as a flame retardant ("REOFOS TPP" available from Ajinomoto Fine-Tech Co., Inc.) at 20% owf (based on the weight of the fabric), a liquor ratio of 1:40, a temperature of 130° C. for one hour. The resulting article was washed with water, subjected to soaping with an aqueous sodium carbonate solution at 80° C. and subjected to domestic cleaning ten times. The resulting fabric had a coverage of 7% by weight and showed good self-extinguishing in a flammability test. Thus, the nanoporous fibers of the present invention can take functional materials therein to form a "capsulated structure", serve to improve washing resistance and are optimum as raw yarns which are good for treating with functional materials.

Comparative Example 9

A regular PET fabric was subjected to flame retardation by the procedure of Example 41. The resulting fabric had a coverage of 1% by weight after cleaning ten times and showed no self-extinguishing in a flammability test.

Example 42

The fabric comprising the nanoporous PET fiber prepared according to Example 20 was allowed to adsorb a moisture absorbent "SR1000" (10% water dispersion) available from Takamatsu Oil & Fat Co., Ltd. at 20% owf of the moisture absorbent in terms of solid content, a liquor ratio of 1:20, a temperature of 130° C. for one hour. The resulting PET fabric showed a degree of uptake of 12% or more and had excellent hygroscopicity in terms of ΔMR of 4% or more, which is equivalent to or higher than cotton. Thus, the nanoporous fibers of the present invention easily take functional materials therein to form a "capsulated structure", serve to improve the degree of uptake of the functional materials and are optimum as raw yarns which are good for treating with functional materials.

Comparative Example 10

A regular PET fabric was subjected to moisturizing by the procedure of Example 42. The resulting fabric, however, had a degree of uptake of the moisture absorbent of about 0% and exhibited no hygroscopicity.

Example 43

The fabric comprising the nanoporous PET fiber prepared according to Example 20 was allowed to adsorb a squalane. Such a squalane is a naturally-occurring oil component extracted from shark liver and serves as a substance having skin-care functions by the action of moisturizing. The treatment was carried out by dispersing a mixture containing 60% of the squalane and 40% of an emulsifier in water in a concentration of 7.5 grams per liter and dipping the fabric therein at a liquor ratio of 1:40, a temperature of 130° C. for 60 minutes. After the treatment, the fabric was washed at 80° C. for 2 hours. The coverage of the squalane was 21% by weight to the resulting fabric. The fabric after domestic cleaning 20 times had a coverage of the squalane of 12% by weight to the fabric and exhibited sufficient washing (laundry) durability.

The round braid comprising the nanoporous PET fiber bearing the squalane was formed into socks. Ten subjects suffering from dry ankle were subjected to a wearing test for one week. As a result, eight subjects were mitigated in dry skin. This is probably because the squalane trapped by the pores was gradually extracted by the action of the sweat of the subject and was brought into contact with the skin.

Comparative Example 11

A regular PET fabric was subjected to exhaustion (uptake) by the procedure of Example 43. The coverage after washing was 21% by weight to the fabric, but that after domestic cleaning ten times was 0% by weight, showing no washing resistance.

Example 44

The fabric comprising the nanoporous N6 fiber prepared according to Example 10 was immersed in de-ionized water and was mixed with 1,2-bis(trimethoxysilyl)ethane, followed by stirring for 3 hours. After standing still at room temperature for 14 hours, the article was stirred for further 13 hours, left stand for 14 hours and stirred for further 7 hours for polymerizing silica. The round braid was washed with de-ionized water and was air-dried. This procedure yielded N6/silica composite material in the form of a fabric prepared by using the pores of the N6 nanofiber as a template. This material was an excellent material having sufficient rigidity and flexibility and was a hybrid material having excellent flame retardancy. The composite material contained 30% by weight of silica.

Thus, the nanoporous fibers of the present invention can be easily formed into hybrid materials by adsorbing a polymerizable monomer or oligomer and polymerizing the monomer or oligomer and are optimum as precursors for advanced materials including organic materials having functions of inorganic substances (e.g., flame retardancy or catalytic activity) or inorganic materials having flexibility.

Example 45

The tights comprising the nanoporous N6 fiber prepared according to Example 29 was immersed in "New Policain Liquid" available from TAIHO Pharmaceutical Co., Ltd. and was dried. This yielded tights that can release an agent for dermatophytosis by the action of the sweat. Patients with dermatophytosis were allowed to wear the tights one per day. This treatment was continued for one month to find that the symptom was remedied because of sustained-released agent for dermatophytosis. Thus, the nanoporous fibers of the present invention are capable of medicinally efficacious components and are suitable as medical devices.

Example 46

The fabric comprising the nanoporous N6 fiber prepared according to Example 1 was immersed in a 3% aqueous diethylenetriamine solution at 50° C. for one minute to allow the nanoporous N6 fiber to support diethylenetriamine. The acetaldehyde adsorbing capability of the resulting article was determined in the same way as that for ammonia. As a result, the article showed excellent elimination capability, since the concentration was decreased from 30 ppm to 1 ppm within 10 minutes. Thus, the nanoporous fibers of the present invention are capable of supporting adsorbents and are suitable as industrial materials typically for chemical filters and air filters.

Example 47

A highly oriented undrawn yarn was prepared by melting the polymer alloy prepared according to Example 1 as a core component, and the N6 used in Example 1 as a sheath component respectively at 270° C., spinning at a temperature of 275° C. to obtain core-in-sheath multi-component fiber and taking the yarn at a rate of 3800 meters per minute. This was subjected to draw false-twisting by the procedure of Example 1. The compounding ratio of the polymer alloy was 80% by weight. The resulting crimped yarn comprising the core-in-sheath conjugated fiber was of 150 dtex and 76 filaments and had a strength of 4.1 cN/dtex, an elongation percentage of 27%, a U % of 1.0%, a thermal shrinkage of 10% and a CR of 45%. The islands parts copolymerized PET in the polymer alloy as the core component had an average diameter of 26 nm and were homogeneously dispersed with size on the order of nanometers. The area ratio of coarse islands each having a diameter of 200 nm or more to the total islands was 0.1% or less, and the area ratio of coarse islands each having a diameter of 100 nm or more to the total islands was 1% or less. The islands-part polymer was dispersed as lines. The crimped yarn comprising the core-in-sheath conjugated fiber was subjected to circular knitting by the procedure of Example 1 and was subjected to alkali treatment, to thereby obtain a round braid comprising a nanoporous N6 fiber.

The nanoporous fiber was sampled from the round braid and was observed under a TEM to find that the fiber was free from coarse pores having a diameter of 50 nm or more, and the average diameter of the pores was 20 nm. The area ratio of nanopores was 77% of a cross section of the fiber. The nanoporous fiber had a yarn strength of 3.3 cN/dtex, higher than that in Example 1, and exhibited superior wear resistance. The pores were unconnected pores. The fabric exhibited higher color property than that in Example 1 and had sufficient hygroscopicity in terms of ΔMR of 4.8%.

Example 48

The core-in-sheath multi-component fiber spinning and draw false-twisting procedures of Example 47 were carried out, except for interchanging the core component and the sheath component and setting the compounding ratio of the polymer alloy at 50% by weight, to obtain a crimped yarn comprising a core-in-sheath conjugated fiber of 150 dtex, 76 filaments having a strength of 4.1 cN/dtex, an elongation percentage of 27%, a U % of 1.0%, a thermal shrinkage of 10% and a CR of 45%. The islands of the copolymerized PET in the polymer alloy as the sheath component had an average diameter of 26 nm and were homogeneously dispersed with size on the order of nanometers. The area ratio of coarse islands each having a diameter of 200 nm or more to the total islands was 0.1% or less, and the area ratio of coarse islands each having a diameter of 100 nm or more to the total islands was 1% or less. The islands-part polymer was dispersed as lines. The crimped yarn comprising the core-in-sheath conjugated fiber was subjected to circular knitting and alkali treatment by the procedure of Example 47, to thereby obtain a round braid comprising a nanoporous N6 fiber. The nanoporous fiber sampled from the round braid was observed under a TEM to find that the fiber was free from coarse pores having a diameter of 50 nm or more, and the average diameter of the pores was 20 nm. The area ratio of nanopores to the cross section of the fiber was 45%. The nanoporous fiber had a higher strength of 3.5 cN/dtex than that in Example 1. The pores were unconnected pores. The fabric had good color property and sufficient hygroscopicity in terms of ΔMR of 4%.

Example 49

The multi-component fiber spinning procedure of Example 48 was carried out, except for using the high-viscosity N6 used in Example 14 as the N6 alone side, and the polymer alloy prepared in Example 1 as the polymer alloy side, to obtain a side-by-side yarn at a compounding ratio of 50% by weight/50% by weight. The high-viscosity N6 had a viscosity as large as 2 times or more that of the polymer alloy. The resulting undrawn yarn was subjected to drawing at a draw ratio of 1.2 and thermal treatment by the procedure of Example 10, to obtain a 110 dtex, 34-filament crimped side-by-side yarn having a strength of 4.1 cN/dtex, an elongation percentage of 27%, a U % of 1.2%, a thermal shrinkage of 10%, number of crimp of 20 per 25 mm. The islands of the copolymerized PET in the polymer alloy as the outside component of the crimp had an average diameter of 26 nm and were homogeneously dispersed with size on the order of nanometers. The area ratio of coarse islands each having a diameter of 200 nm or more to the total islands was 0.1% or less, and the area ratio of coarse islands each having a diameter of 100 nm or more to the total islands was 1% or less. The islands-part polymer was dispersed as lines. The resulting crimped side-by-side yarn was subjected to circular knitting and alkali treatment by the procedure of Example 48, to thereby obtain a round braid comprising a nanoporous N6 fiber. The nanoporous fiber was sampled from the round braid and was observed under a TEM to find that the fiber was free from coarse pores having a diameter of 50 nm or more, and the average diameter of the pores was 20 nm. The area ratio of nanopores to the cross section of the fiber was 44%. The yarn had a high strength of 3.5 cN/dtex. The pores were unconnected pores. The fabric had good color property and sufficient hygroscopicity in terms of ΔMR of 4%. The fabric showed further higher bulkiness after water adsorption.

Example 50

The multi-component fiber spinning and draw thermal treatment procedures of Example 49 were carried out, except for using the low-viscosity N6 used in Example 1 as the N6 alone side and the polymer alloy prepared in Example 14 as the polymer alloy side, to thereby obtain a 110 dtex, 34-filament crimped side-by-side yarn having a yarn strength of 4.0 cN/dtex, an elongation percentage of 25%, a U % of 1.2%, a thermal shrinkage of 10% and a number of crimp of 18 per 25 mm.

The islands of the copolymerized PET in the polymer alloy as the inside component of the crimp were dispersed with an average diameter of 18 nm, and the area ratio of coarse islands each having a diameter of 100 nm or more to the total islands was 0.1% or less. The resulting crimped side-by-side yarn was subjected to circular knitting and alkali treatment by the procedure of Example 49, to thereby obtain a round braid comprising a nanoporous N6 fiber.

The nanoporous fiber was sampled from the round braid and was observed under a TEM to find that the fiber was free from coarse pores each having a diameter of 50 nm or more, and the average diameter of the pores was 20 nm. The area ratio of nanopores to the cross section of the fiber was 45%. The nanoporous fiber had satisfactory bulkiness and a high yarn strength of 3.4 cN/dtex. The pores were unconnected pores. The fabric exhibited good color property and had sufficient hygroscopicity in terms of ΔMR of 4%. The fabric exhibited further improved air permeability after water adsorption, since crimps elongated and stitches were enlarged.

Example 51

The round braid comprising the polymer alloy fiber prepared in Example 10 was treated with a 2% aqueous sodium hydroxide solution (95° C., liquor ratio of 1:40) for twenty minutes to decompose and dissolve out 50% of the copolymerized PET in the polymer alloy fiber with a weight loss as the fiber of 10%. The dissolution proceeded in the form of a rind from the fiber surface layer, and the area ratio of nanopores to the cross section of the fiber was 50%. This portion was observed under a TEM to find that the pores were unconnected pores having an average diameter of 20 nm, and there was no coarse pores each having a diameter of 50 nm or more.

The round braid had a ΔMR of 4.0% and an ammonia adsorbing rate of 50%, showing excellent hygroscopicity and/or adsorptivity, and exhibited a sufficient percentage of water retention of 60%. The nanoporous fiber also showed reversible water swelling but a higher dimensional stability under wet conditions in terms of a percentage of swelling of 4% than that in Example 10. The fiber had a higher yarn strength of 3 cN/dtex than in Example 10.

Example 52

A high-density plain fabric having a METSUKE of 170 g/m² was prepared by using the crimped polymer alloy yarn prepared in Example 1 as a warp and weft. The article was subjected to alkali treatment by the procedure of Example 1, to obtain a plain fabric comprising a nanoporous N6 fiber. The shape and physical properties of the nanoporous fiber sampled from the plain fabric were determined and were found to be similar to those in Example 1. The article was buffed to fibrillate the surface layer of the nanoporous fiber and to form a multitude of fibrils having a diameter of about 0.01 to 1 μm which covered the surface of the woven fabric. The resulting fabric had a soft touch and feeling like spun, exhibited water repellency although it had not been coated and was suitable as a sporting fabric.

Comparative Example 12

A high-density plain fabric was prepared and was subjected to buffing by the procedure of Example 51, except for using a false-twisted regular N6 yarn (77 dtex, 34 filaments). The resulting fabric, however, was not sufficiently fibrillated and failed to provide fibrils covering the surface of the woven fabric and to obtain a soft and "spun feel" touch. The fabric was further buffed to proceed fibrillation but resulted in breakage.

Example 53

A five-ply back satin of 180 g/m² was prepared by using the crimped polymer alloy yarn prepared in Example 1 as a weft and a regular N6 fiber (44 dtex, 12 filaments) as a warp. The article was subjected to alkali treatment by the procedure of Example 1, to obtain a back satin woven fabric comprising a nanoporous N6 fiber. The shape and physical properties of the nanoporous fiber sampled from the fabric were determined and were found to be similar to those in Example 1. The article was buffed to fibrillate the surface layer of the nanoporous fiber and to form a multitude of fibrils having a diameter of about 0.01 to 1 μm which covered the surface of the woven fabric. The fibrils were further separated by water punching. The resulting fabric was suitable as a fabric for wiping cloths.

Example 54

The nonwoven fabric comprising the nanoporous N6 fiber prepared in Example 33 was buffed to obtain a multitude of fibrils having a diameter of about 0.01 to 1 μm, which covered the surface of the nonwoven fabric. The resulting fabric had a surface touch near to the skin, unlike conventional nylon nonwoven fabrics.

Example 55

The nonwoven fabric comprising the nanoporous PP fiber prepared in Example 35 was buffed to obtain a multitude of fibrils having a diameter of about 0.01 to 1 μm, which covered the surface of the nonwoven fabric. This article was more suitable as a filter than conventional PP spun bond nonwoven fabrics.

INDUSTRIAL APPLICABILITY

The porous fibers according to the present invention serve to dramatically the liquid adsorptivity and/or adsorptivity which they inherently have, as intact or as fibrous structures such as yarns, cut fibers, felts, packages or fibrous articles using the fibers. They can have a variety of functions using the nanoporous structure, are promising in various fields and are very epoch making.

More specifically, the fibers easily take a variety of functional materials in the nanopores and are easily processed to have the functions, as compared with conventional fibers.

The fibers can bear or support, for example, any of moisture absorbents, flame retardants, water repellents, humectants, cold insulators, heat insulators and lubricating agents in the form of, but not limited to, fine particles. In addition, agents for promoting health and beauty care, such as polyphenols, amino acids, proteins, capsaicin and vitamins, as well as agents for dermatosis such as dermatophytosis and medicaments such as disinfectants, anti-inflammatory agents and analgesics.

Further, polyamines, photocatalytic nanoparticles and other agents for adsorbing and/or decomposing harmful substances can be imparted to the fibers. If desired, hybrid materials can be arbitrarily obtained therefrom by allowing the fibers to adsorb or absorb organic or inorganic monomers capable of forming polymers and polymerizing the monomers.

The fibers can have selective adsorptivity and/or catalytic activity by activating the walls of the pores by chemical processing using their high specific surface areas.

The fibers can have any of various functions as mentioned above with adjustable performance according to necessity, can yield comfortable products for use in clothing such as panty hose, tights, inner wears, shirts, blousons, trousers and coats and can also be used in clothing materials such as cups and pads; interior decoration such as curtains, carpets, mats and furniture; livingwares such as wiping cloths; industrial materials such as abrasive cloths; and vehicle interior decoration.

The fibers, if adsorbing any functional molecule or agent, can also be used as most advanced materials typically in the fields of environment, medical or information technology (IT), such as fibrous structures as health-cosmetic-related goods, base fabrics for medicaments and medical devices, as well as electrodes of fuel cells.

The invention claimed is:

1. A porous fiber containing pores each having a diameter of 100 nm or less, wherein the area ratio of pores each having a diameter of 200 nm or more to the total cross section of the fiber is 1.5% or less, and wherein the pores are unconnected pores.

2. The porous fiber according to claim 1, wherein the area ratio of pores each having a diameter of 50 nm or more to the total cross section of the fiber is 0.1% or less.

3. The porous fiber according to claim 1, wherein the pores have an average diameter of 5 to 30 nm.

4. The porous fiber according to claim 1, wherein the porous fiber is partially fibrillated to have fibrils each having a diameter of 0.001 to 5 mm.

5. The porous fiber according to claim 1, wherein the porous fiber is crimped.

6. The porous fiber according to claim 1, wherein the porous fiber has a strength of 1.5 cN/dtex or more.

7. The porous fiber according to claim 1, comprising 80% by weight or more of a polyester or polyamide.

8. The porous fiber according to claim 1, wherein the porous fiber has a ratio of moisture adsorption (DMR) of 4% or more.

9. The porous fiber according to claim 1, wherein nanopores are unevenly distributed at cross section of a fiber, and wherein the area ratio of the nanopores to the total cross section of the fiber is 30% or more.

10. A yarn or cut fiber comprising the porous fiber according to claim 1 in combination with one or more other fibers.

11. A fibrous article at least partially comprising the porous fiber according to claim 1.

12. A fibrous article comprising the porous fiber according to claim 1 in combination with one or more other fibers.

13. The fibrous article according to claim 11, which is a woven fabric, a knitted fabric or a nonwoven fabric.

14. The fibrous article according to claim 11, which is selected from clothing, products for interior, livingwares and industrial materials.

15. The fibrous article according to claim 11, comprising one or more functional materials.

16. The porous fiber according to claim 1, wherein the porous fiber comprises a polymer selected from the group consisting of polyesters, polyolefins and polyphenylene sulfides.

\* \* \* \* \*